Dec. 31, 1935.  E. H. BINNS ET AL  2,026,413
METHOD AND MACHINE FOR MAKING FLEXIBLE CLOSURES
Filed Nov. 21, 1930  27 Sheets-Sheet 2
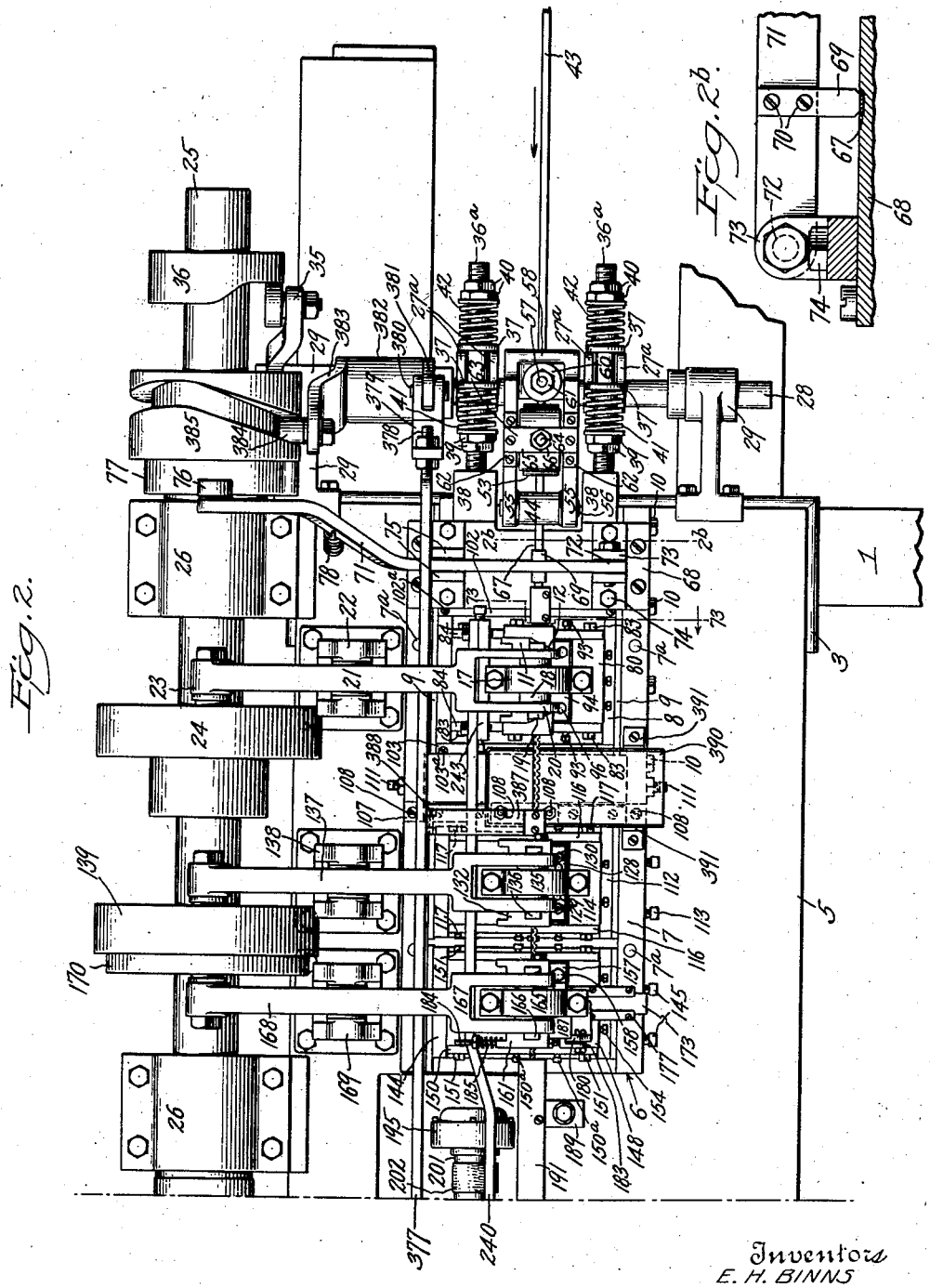
Inventors
E. H. BINNS
W. A. DE HART
By their Attorneys
WITNESS

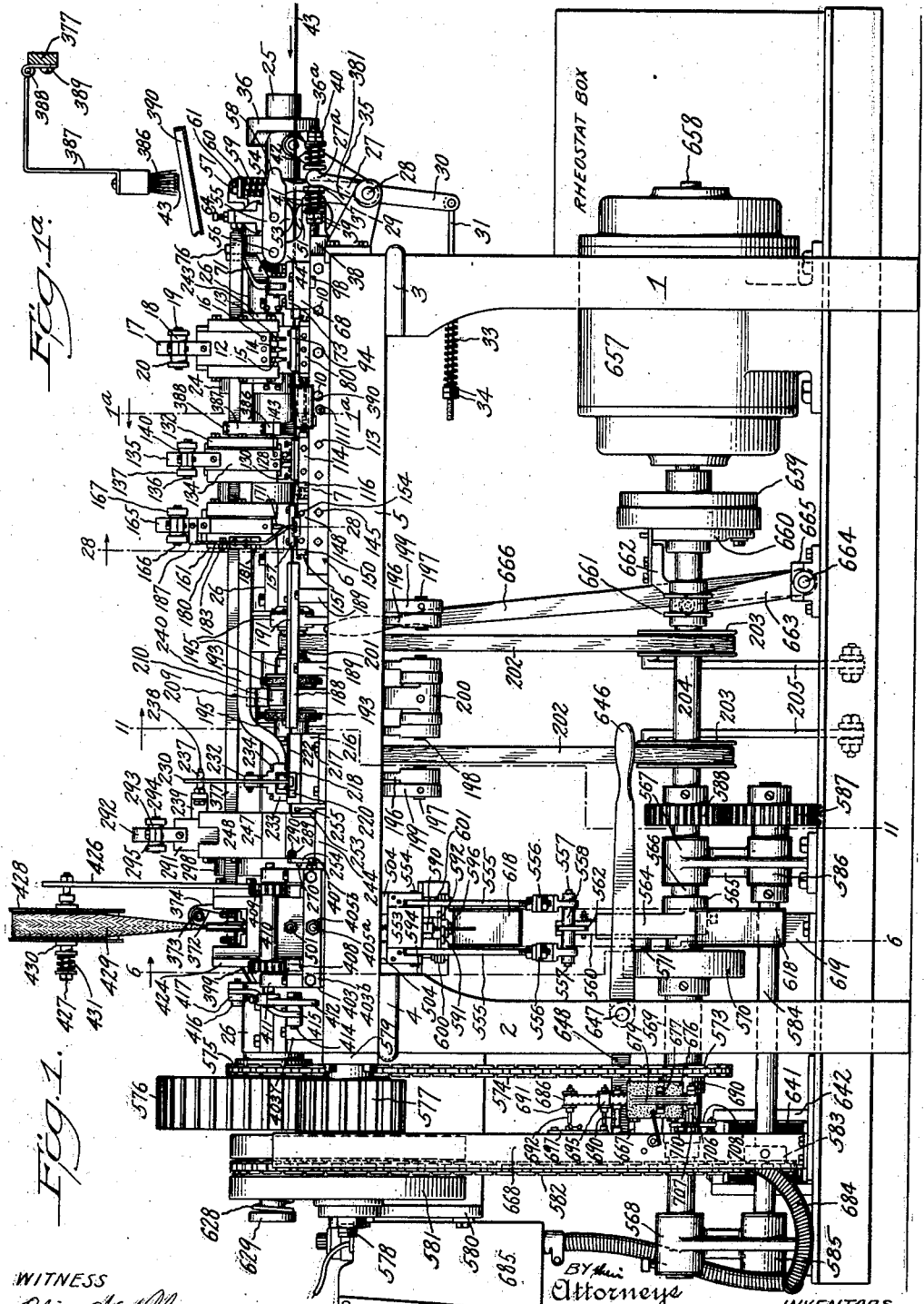

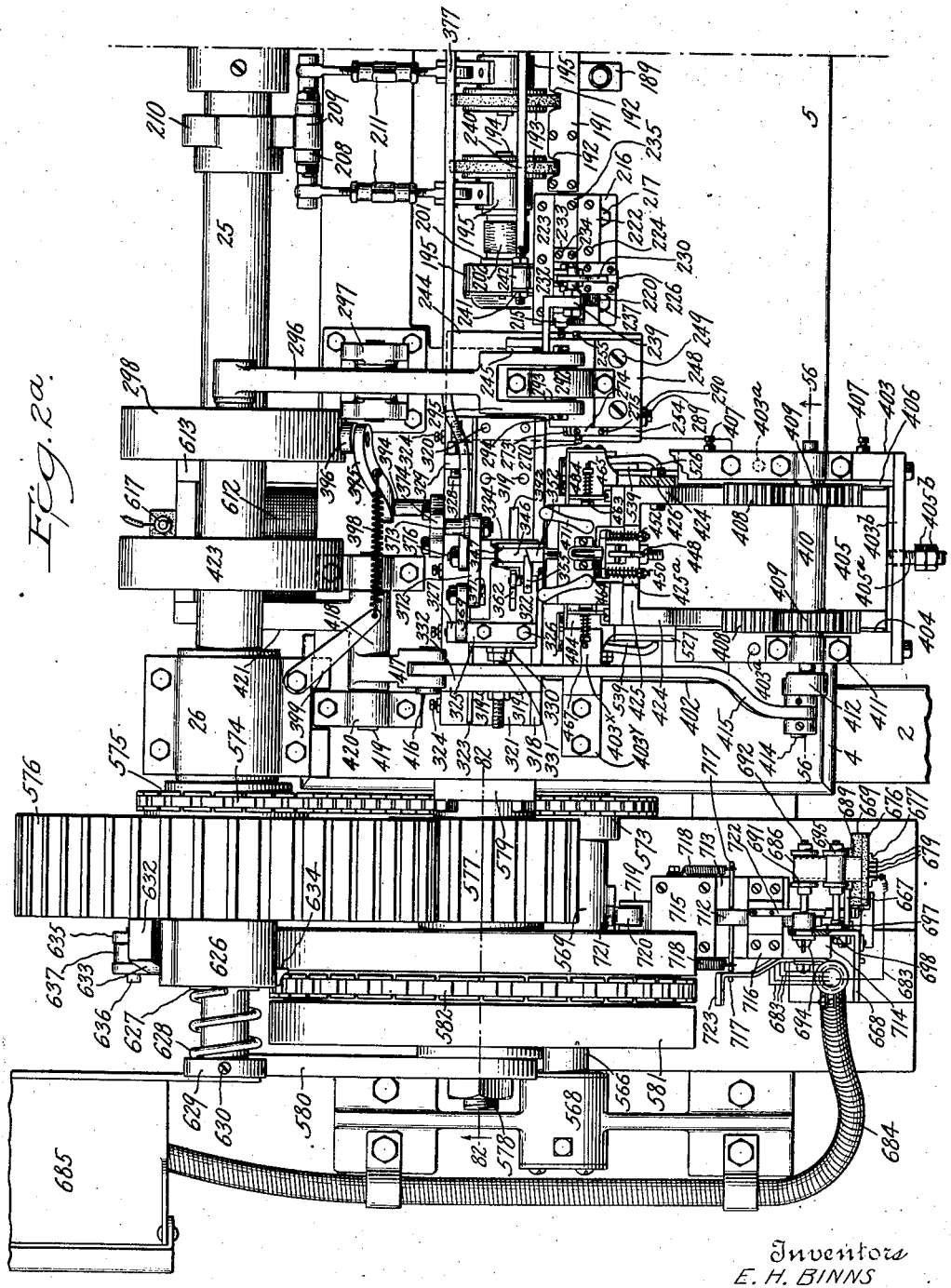

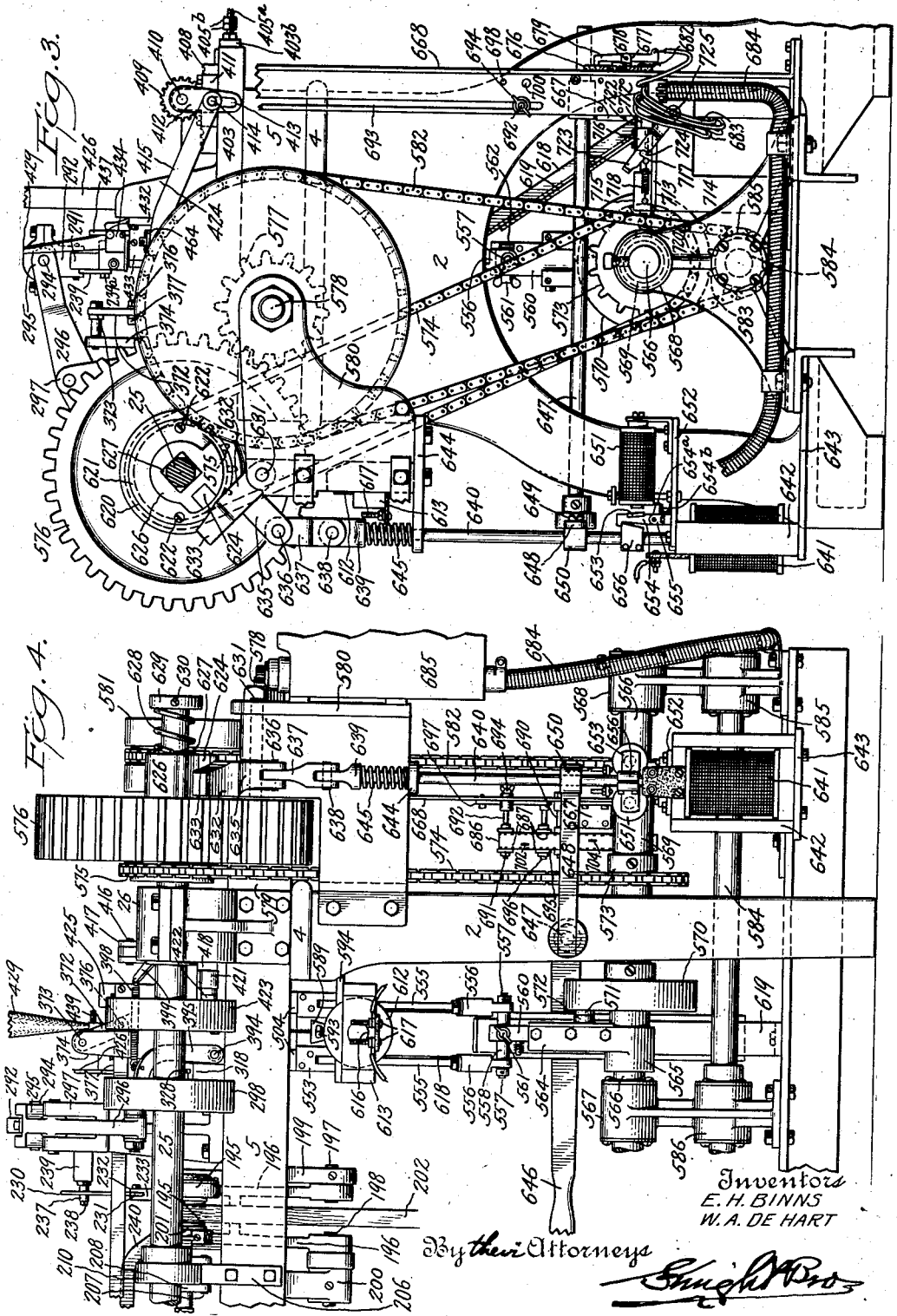

Dec. 31, 1935. E. H. BINNS ET AL 2,026,413
METHOD AND MACHINE FOR MAKING FLEXIBLE CLOSURES
Filed Nov. 21, 1930 27 Sheets-Sheet 5
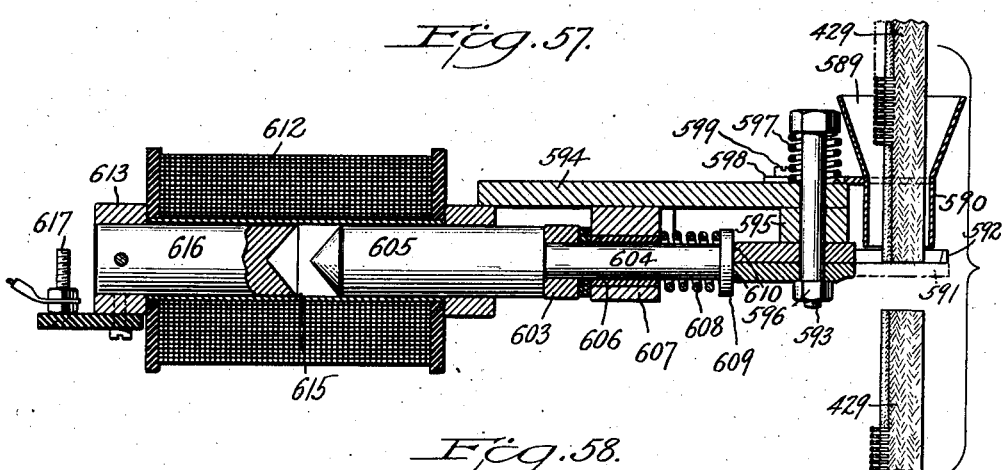
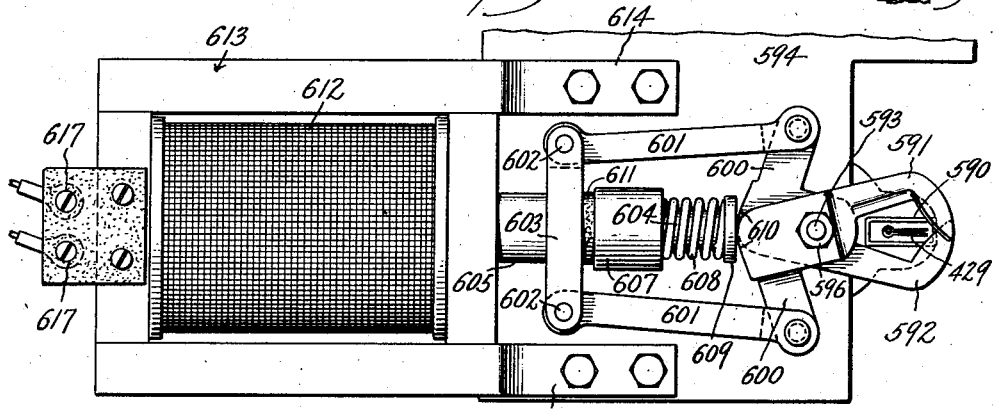
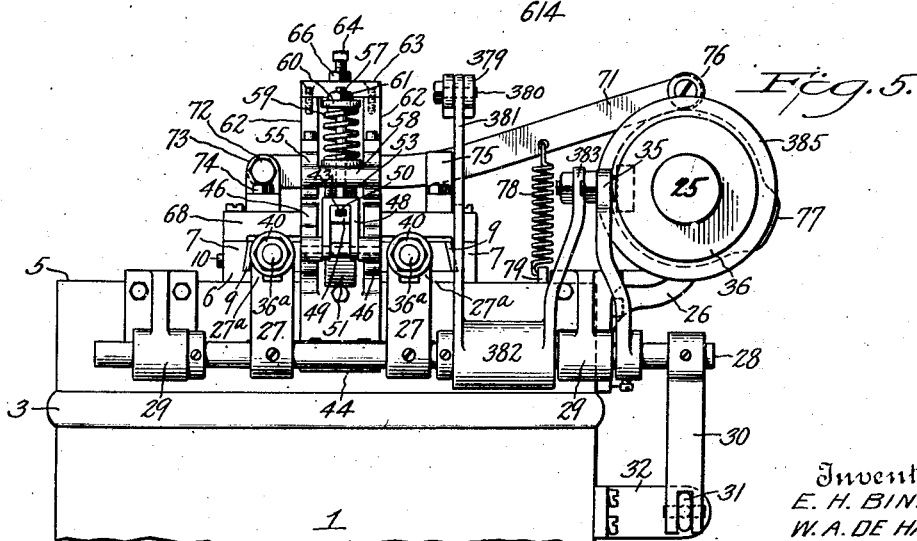
Inventors
E. H. BINNS
W. A. DE HART
By their Attorneys

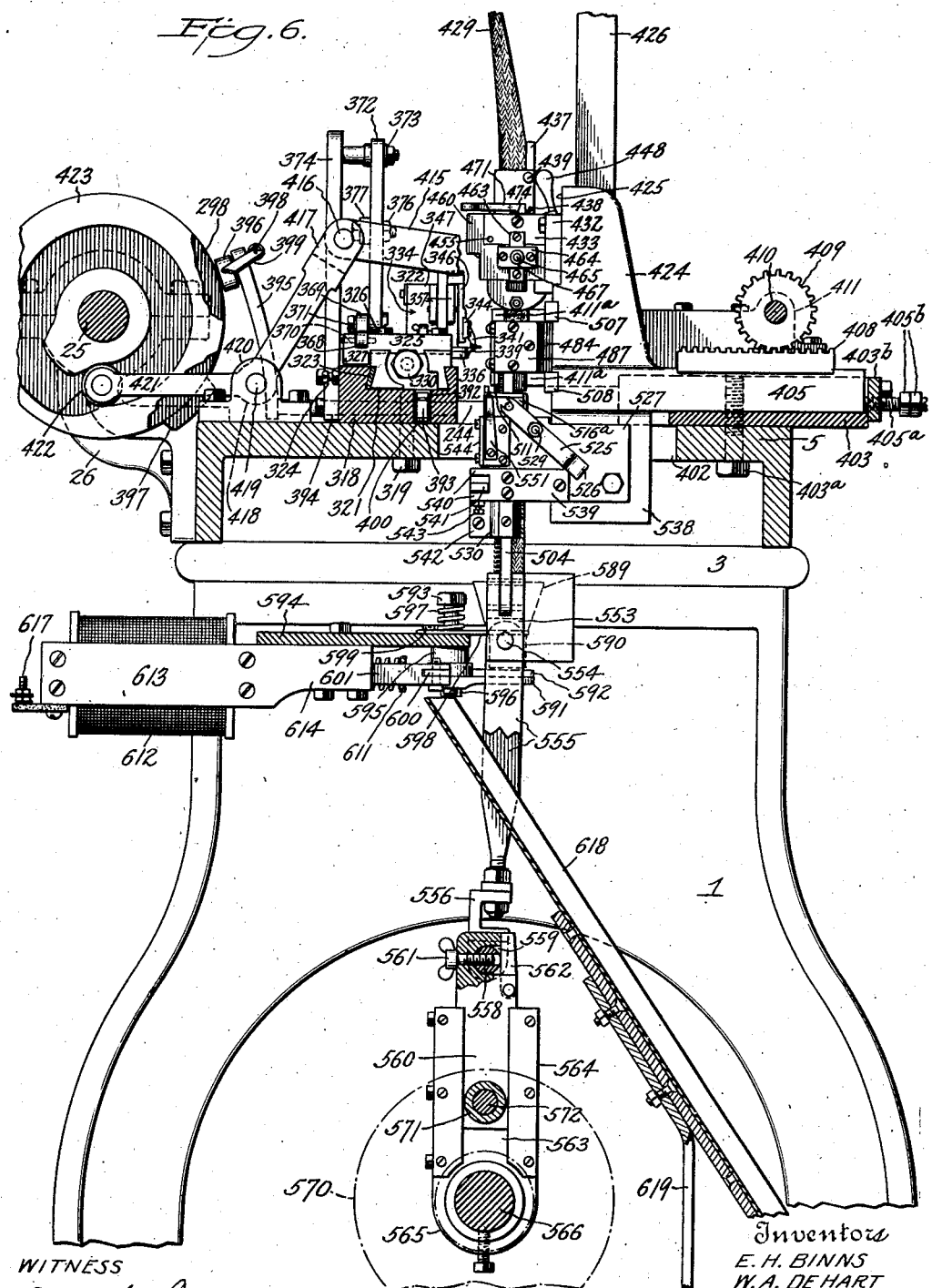

Dec. 31, 1935. E. H. BINNS ET AL 2,026,413
METHOD AND MACHINE FOR MAKING FLEXIBLE CLOSURES
Filed Nov. 21, 1930  27 Sheets-Sheet 7
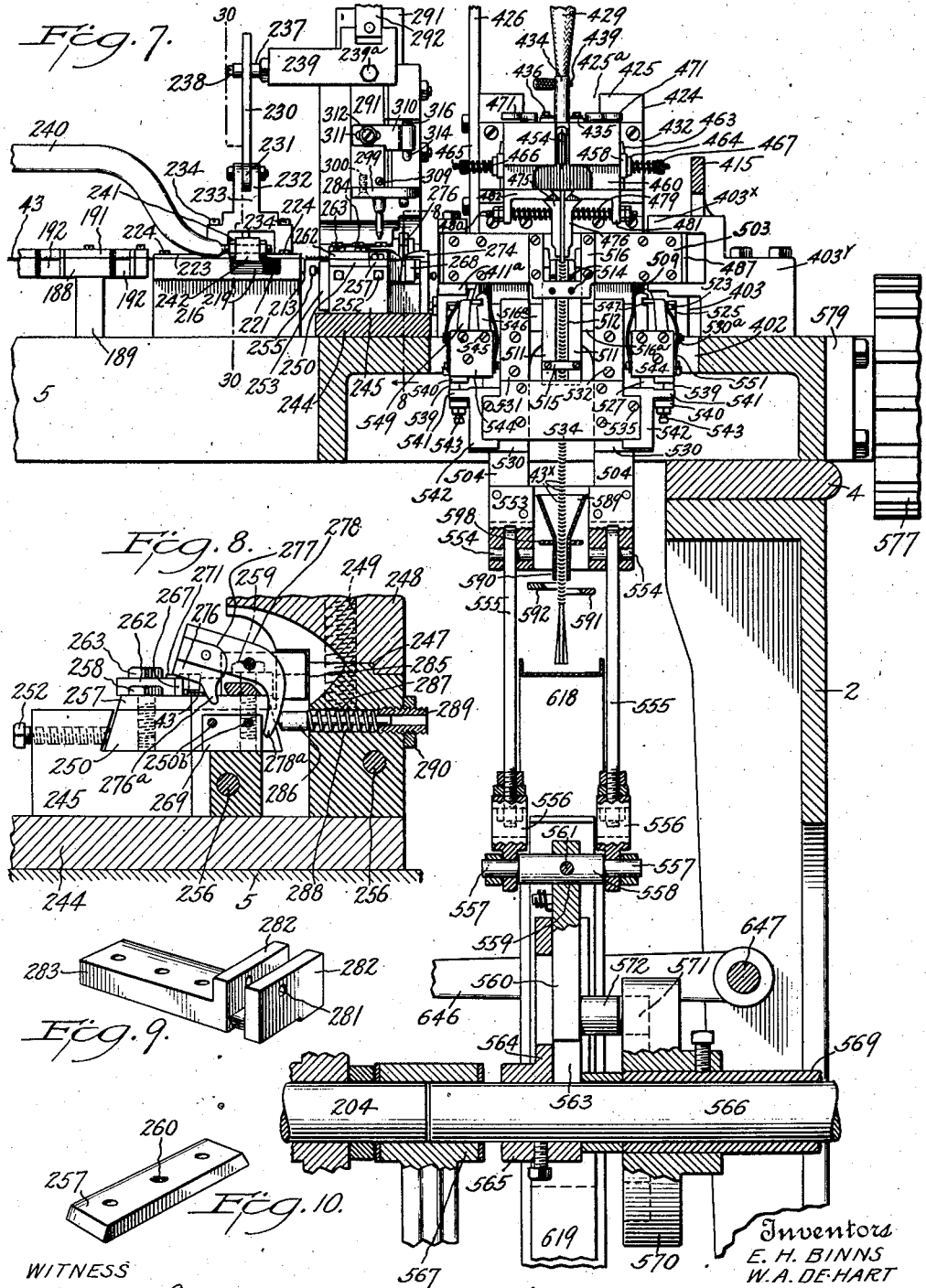

Dec. 31, 1935.  E. H. BINNS ET AL  2,026,413
METHOD AND MACHINE FOR MAKING FLEXIBLE CLOSURES
Filed Nov. 21, 1930   27 Sheets-Sheet 8

Fig. 11.

WITNESS
Oliver W. Holmes

INVENTORS
E. H. BINNS
W. A. DE HART
BY
ATTORNEYS

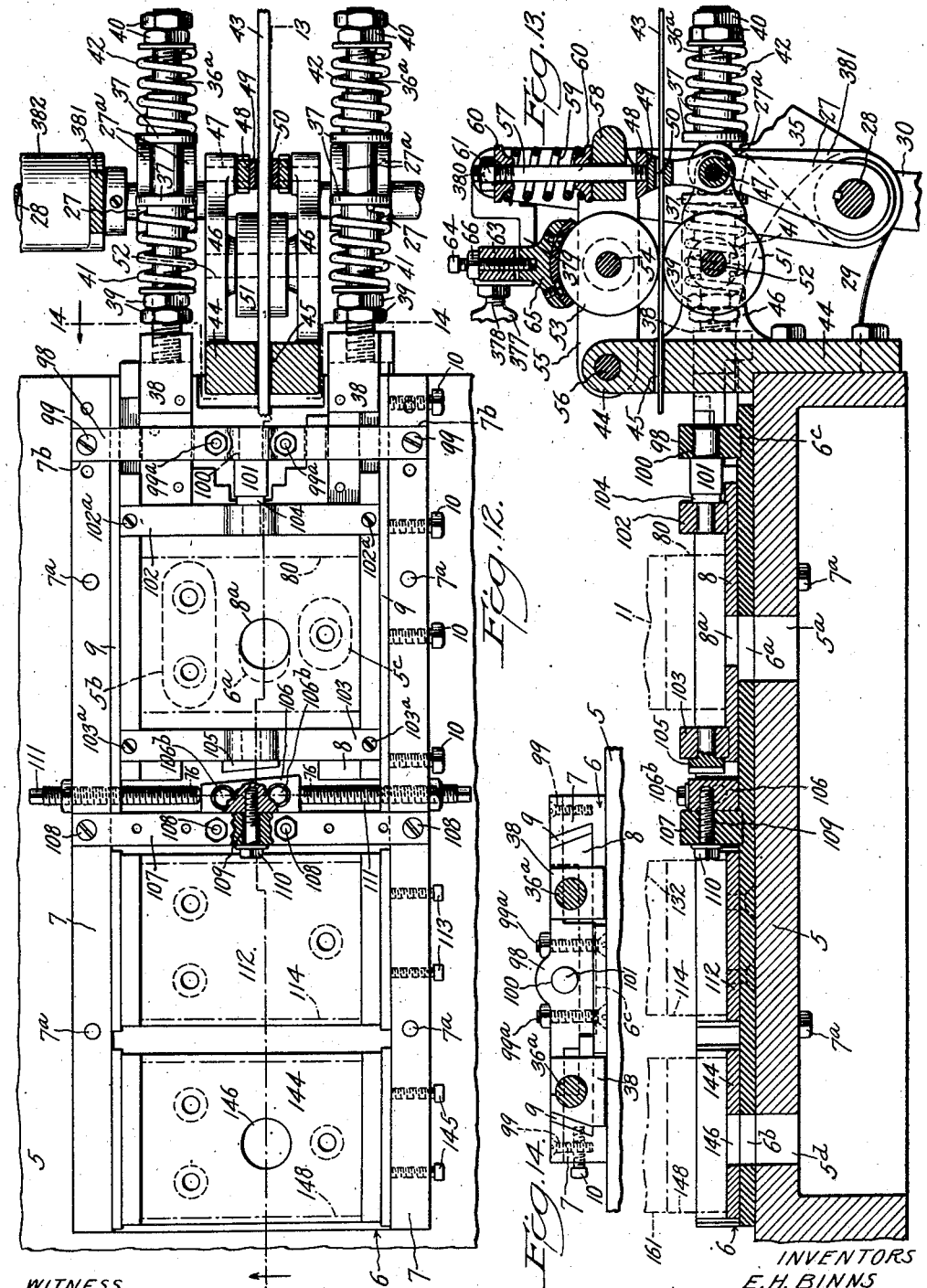

Dec. 31, 1935.  E. H. BINNS ET AL  2,026,413
METHOD AND MACHINE FOR MAKING FLEXIBLE CLOSURES
Filed Nov. 21, 1930  27 Sheets-Sheet 10
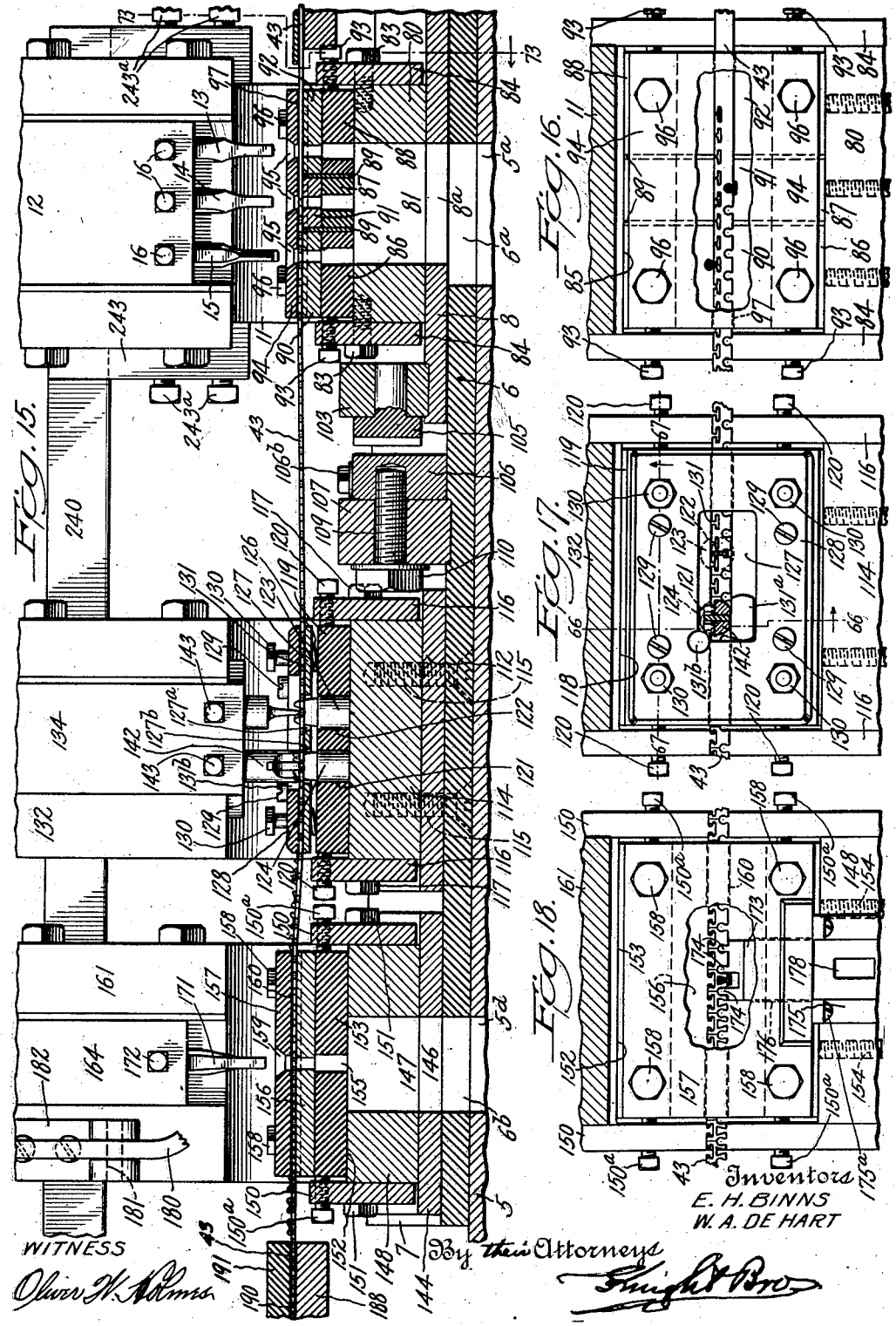
Inventors
E. H. BINNS
W. A. DE HART
By their Attorneys

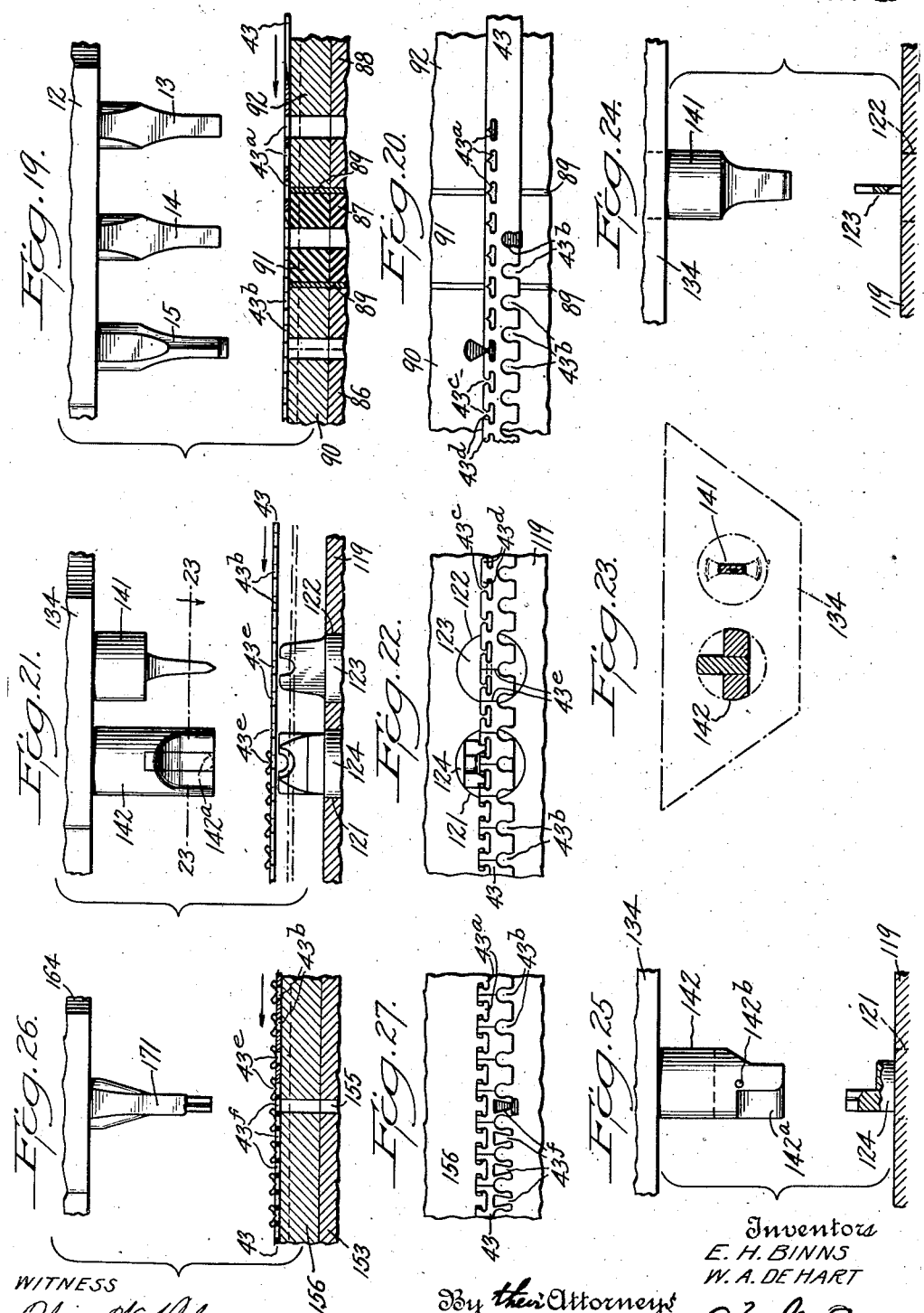

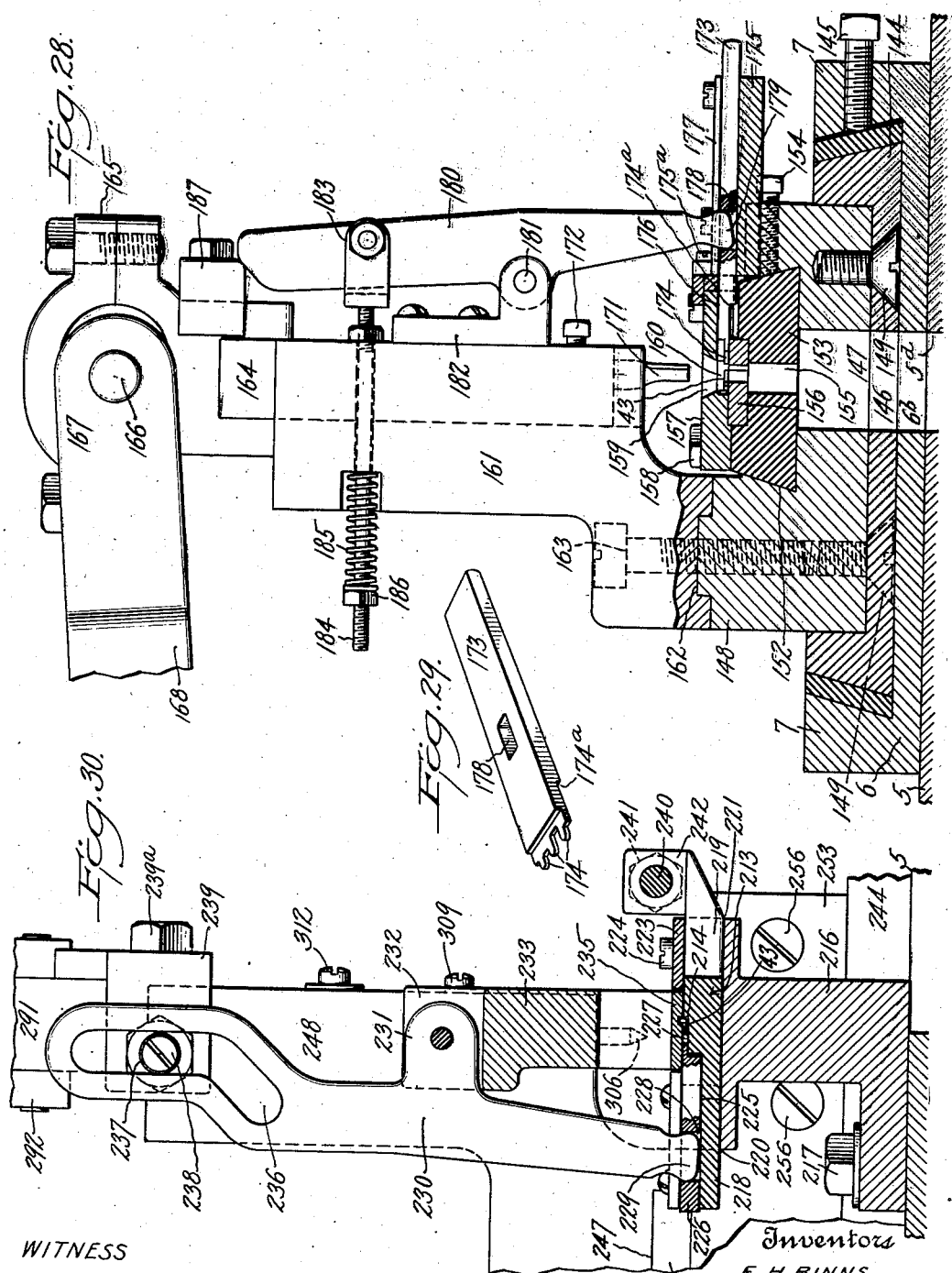

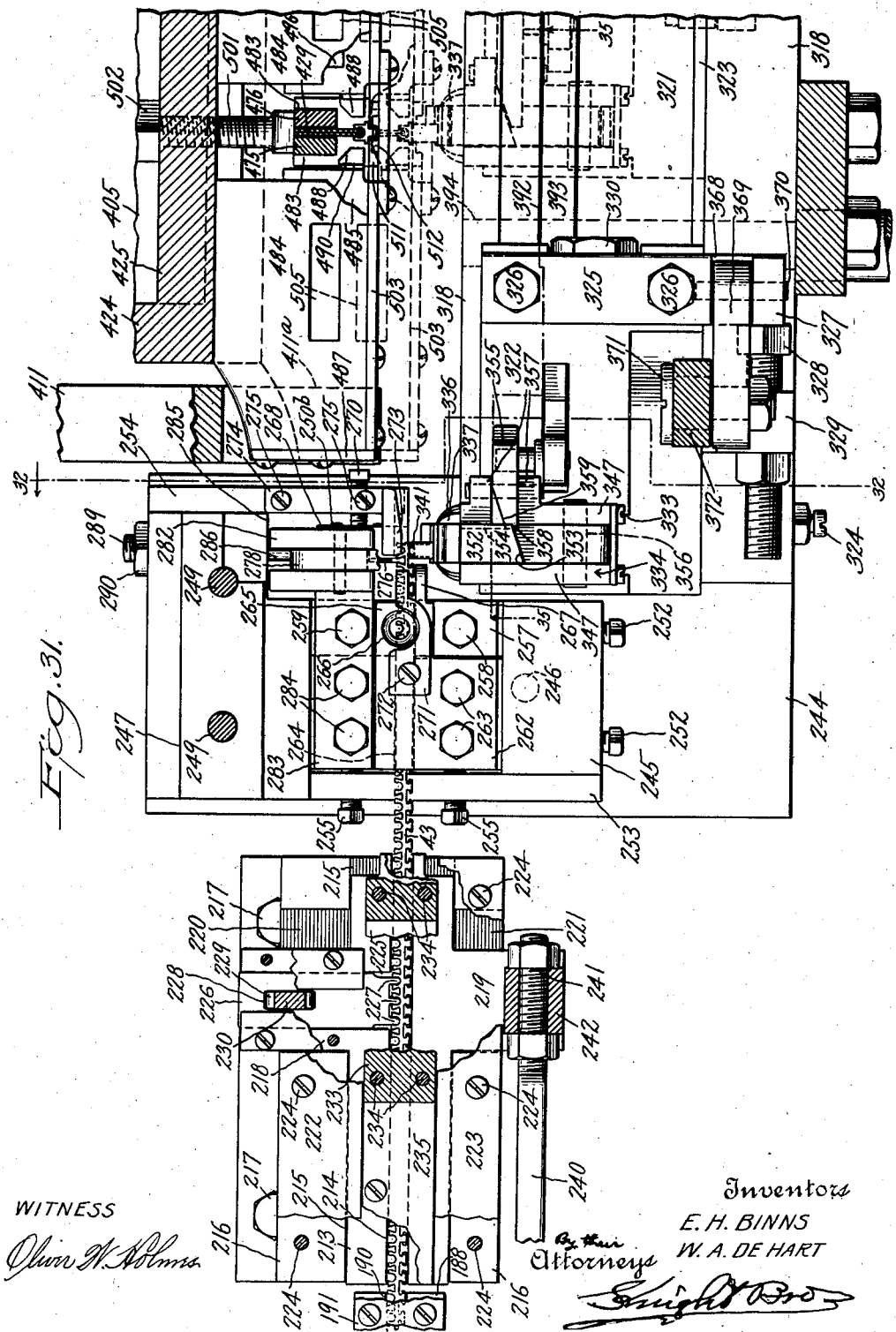

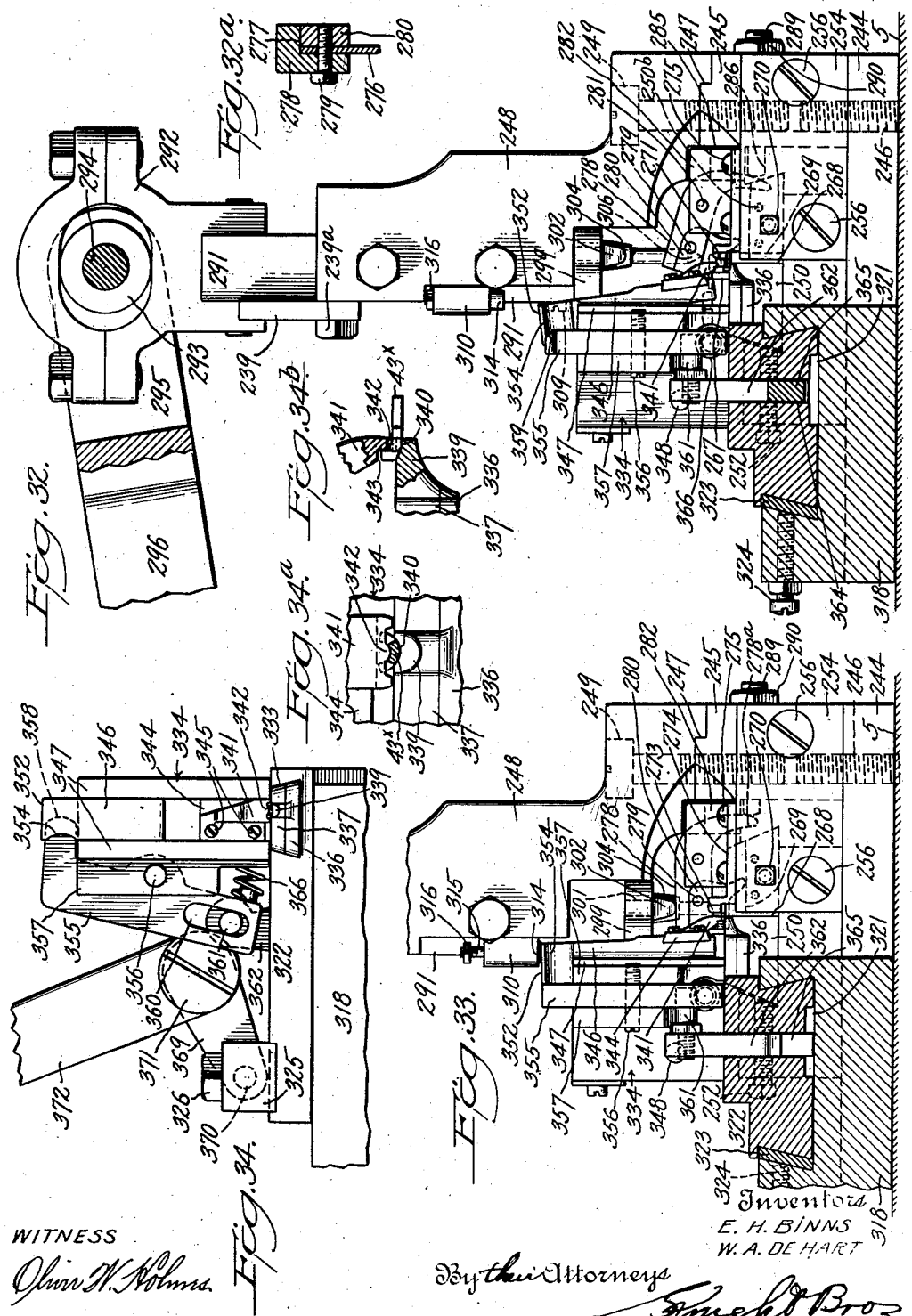

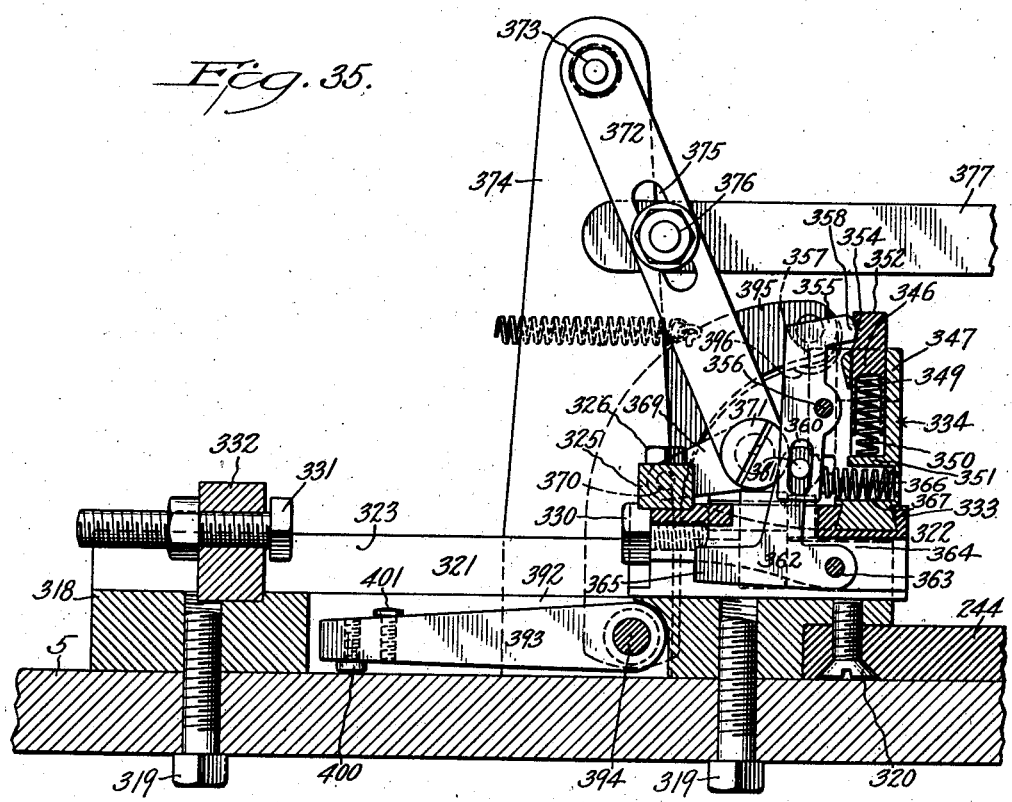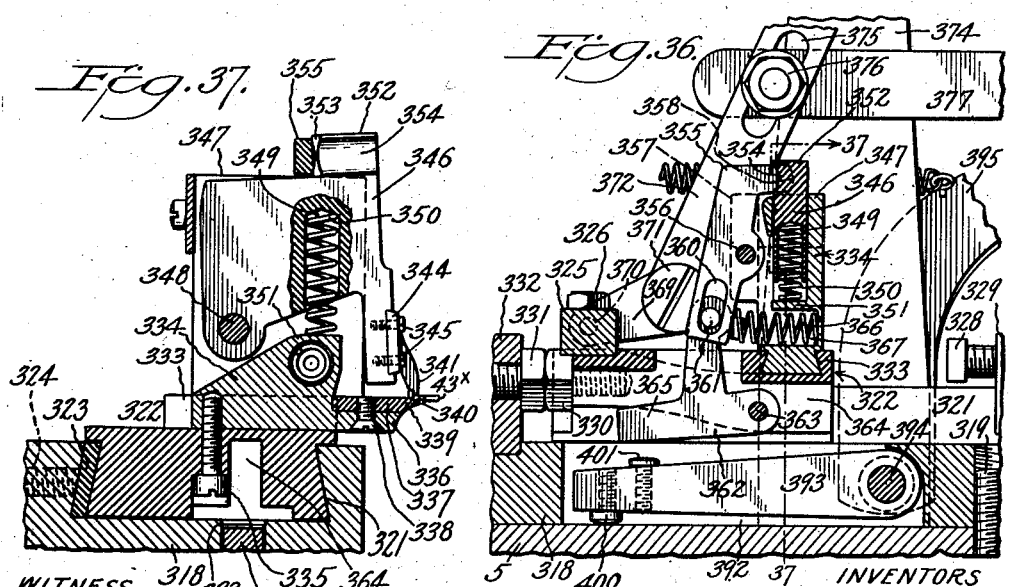

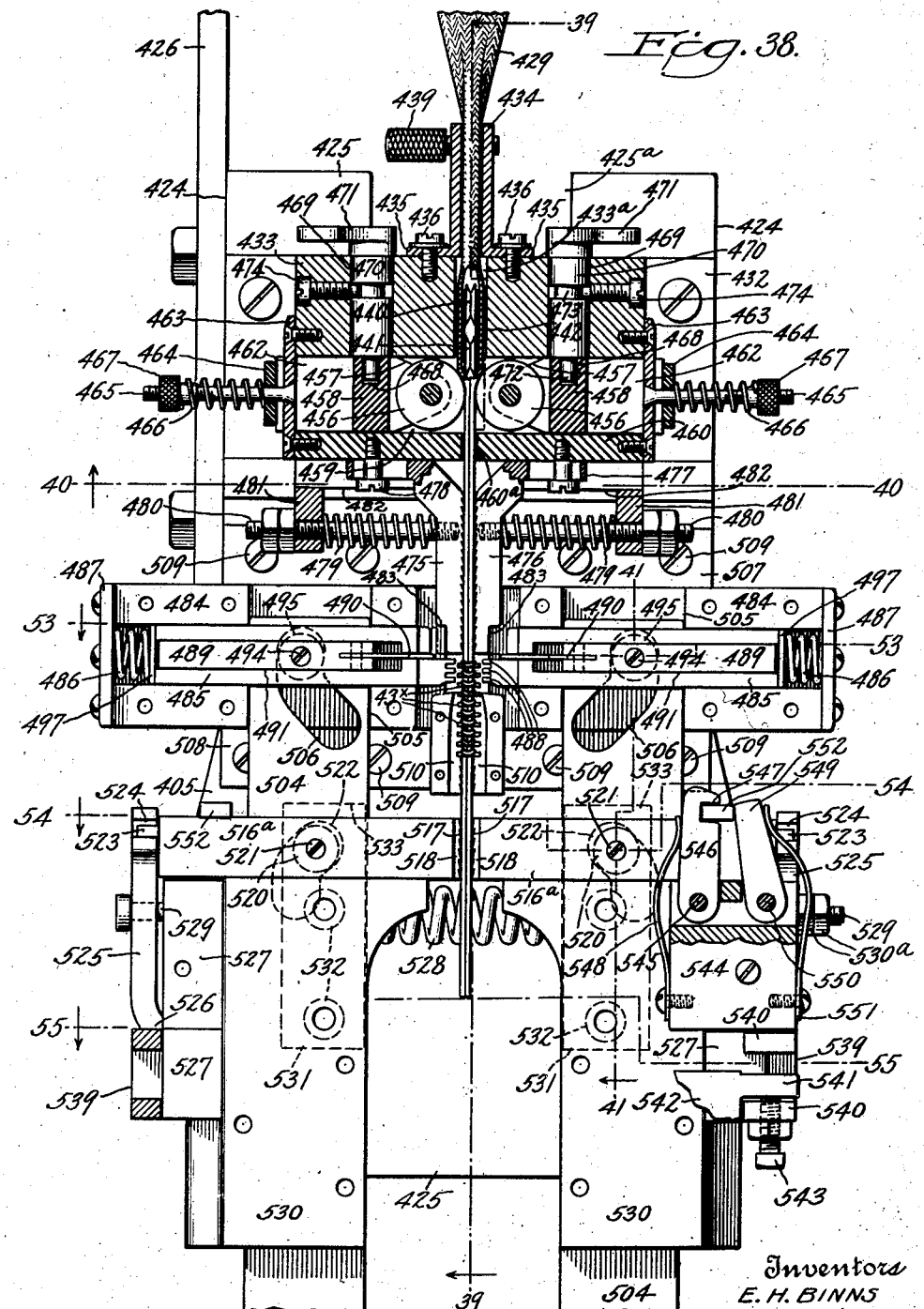

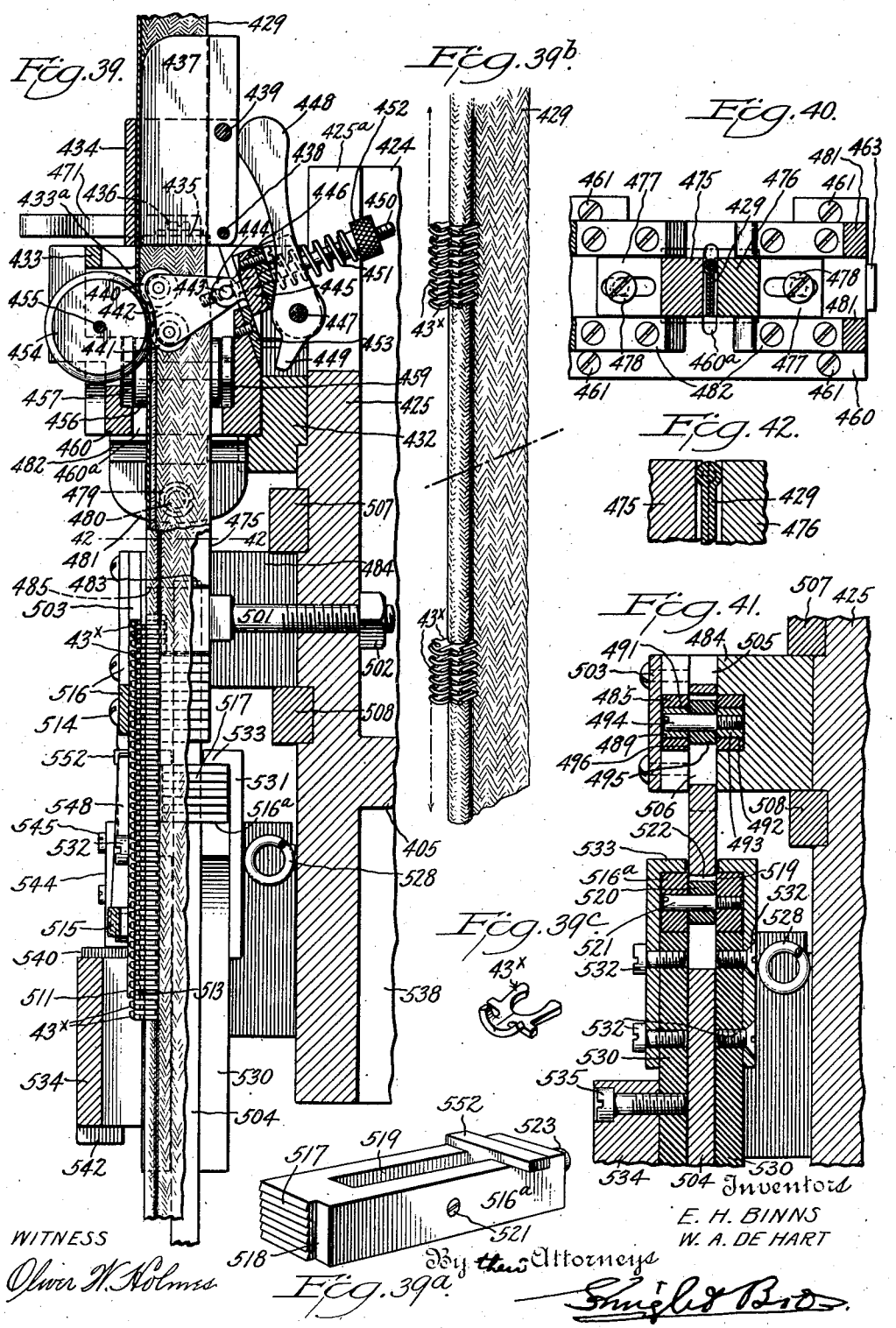

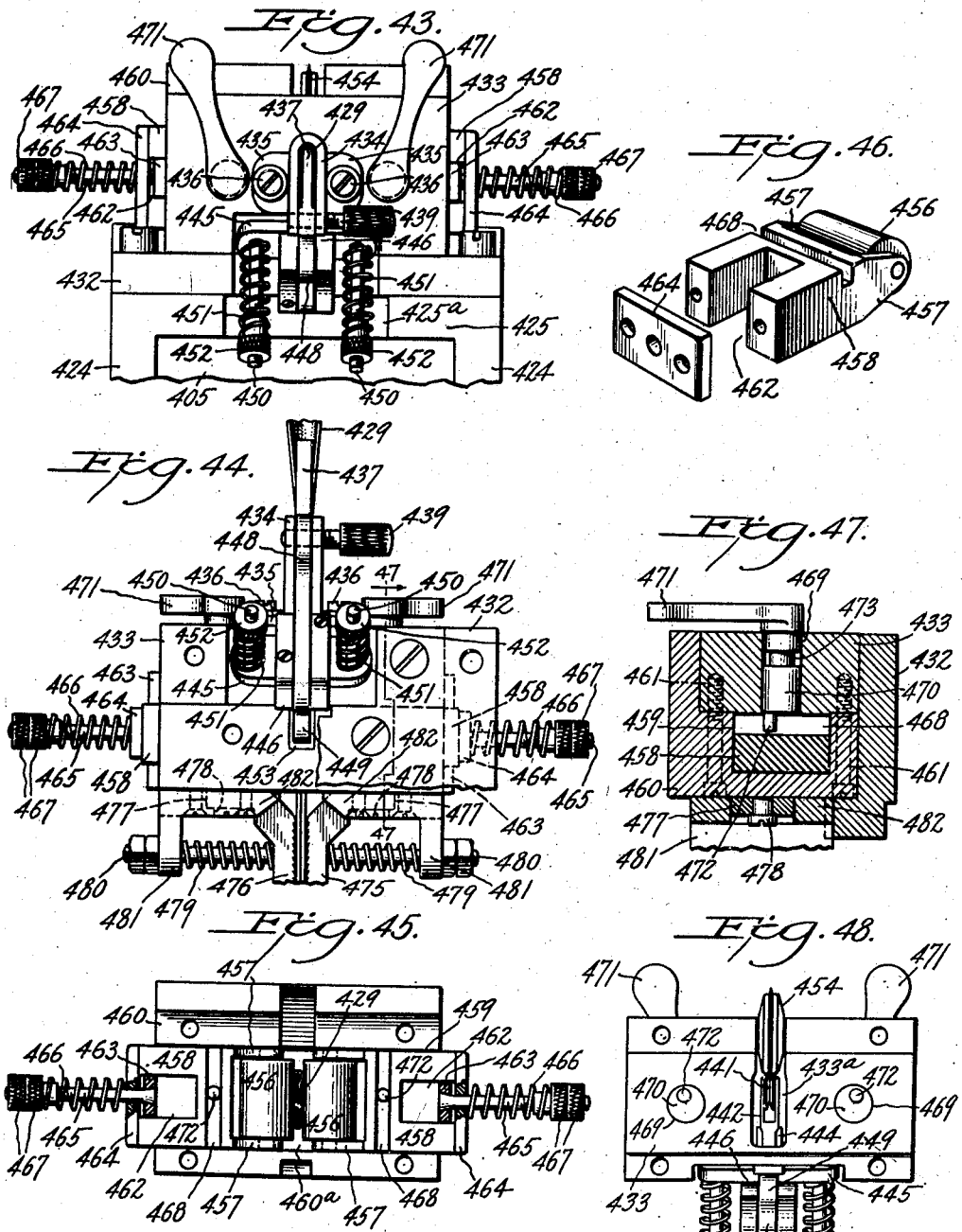

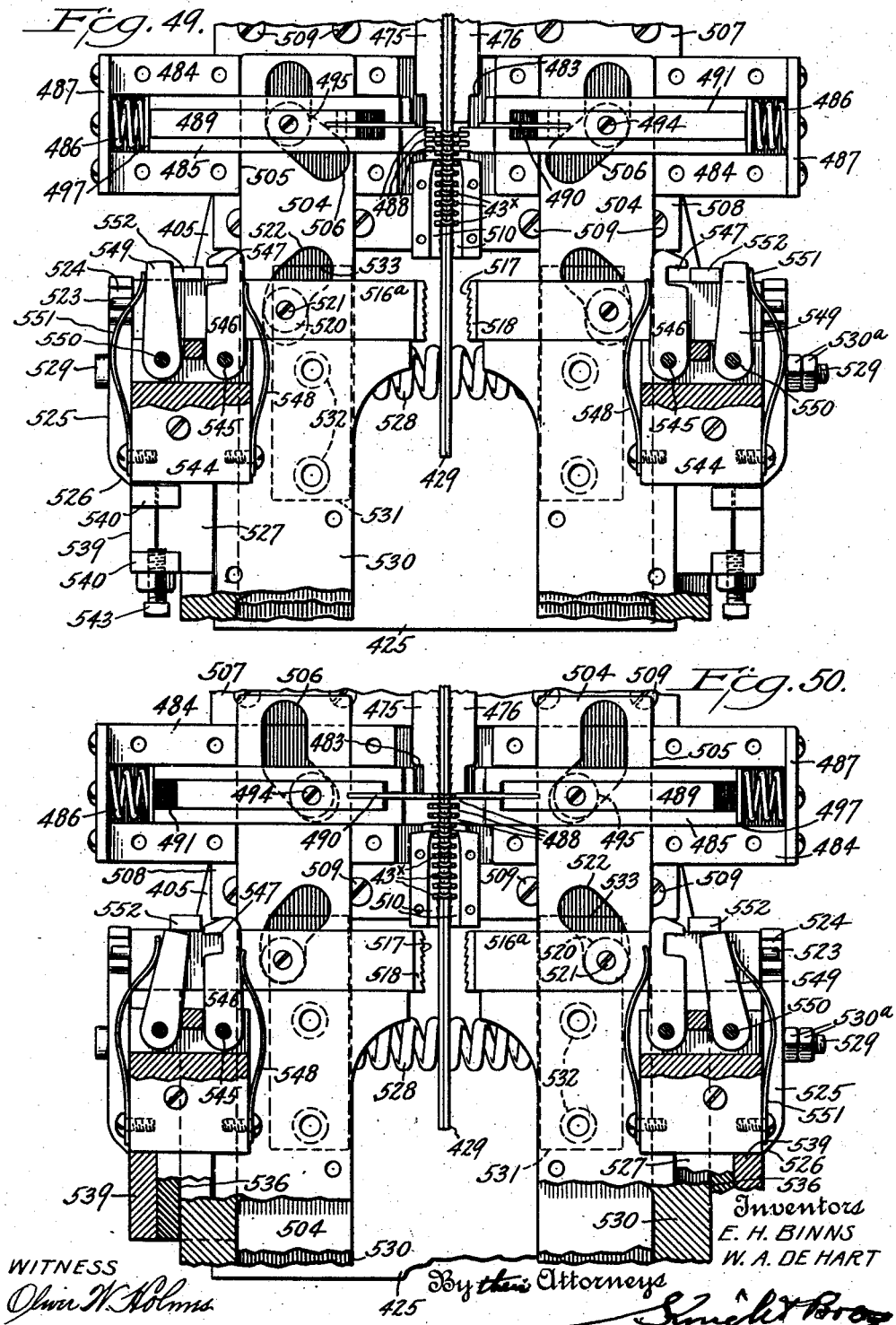

Dec. 31, 1935.  E. H. BINNS ET AL  2,026,413
METHOD AND MACHINE FOR MAKING FLEXIBLE CLOSURES
Filed Nov. 21, 1930  27 Sheets-Sheet 20
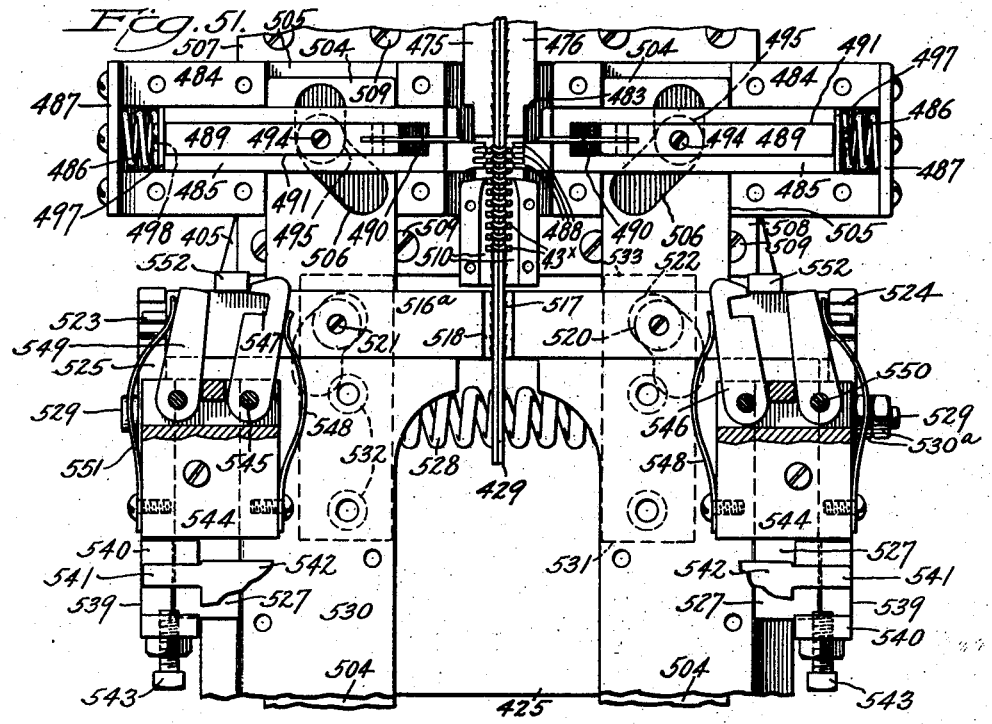
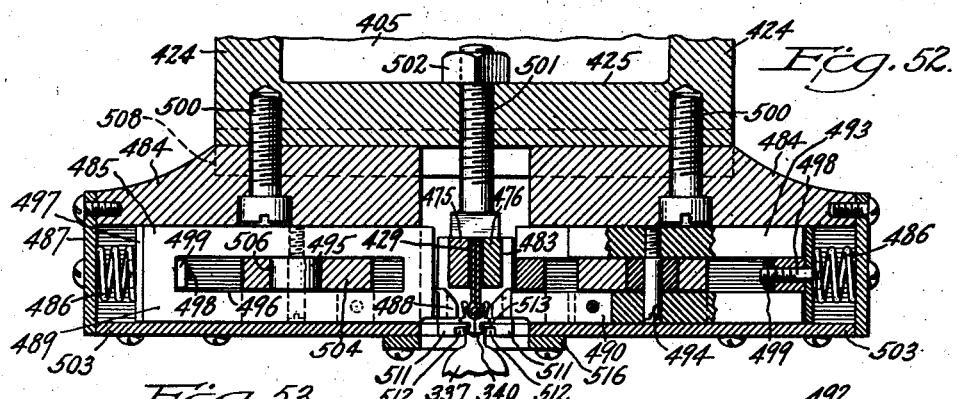
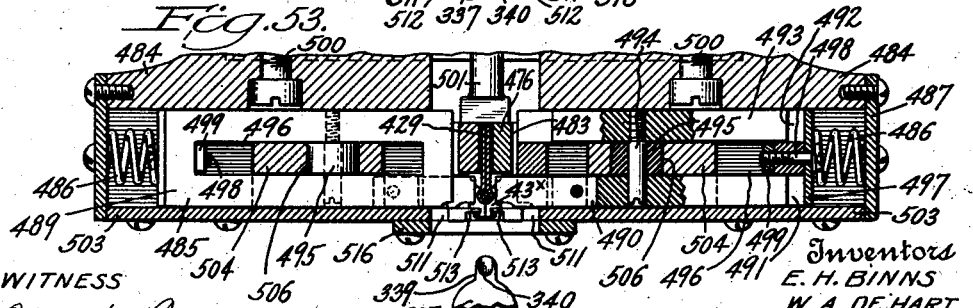

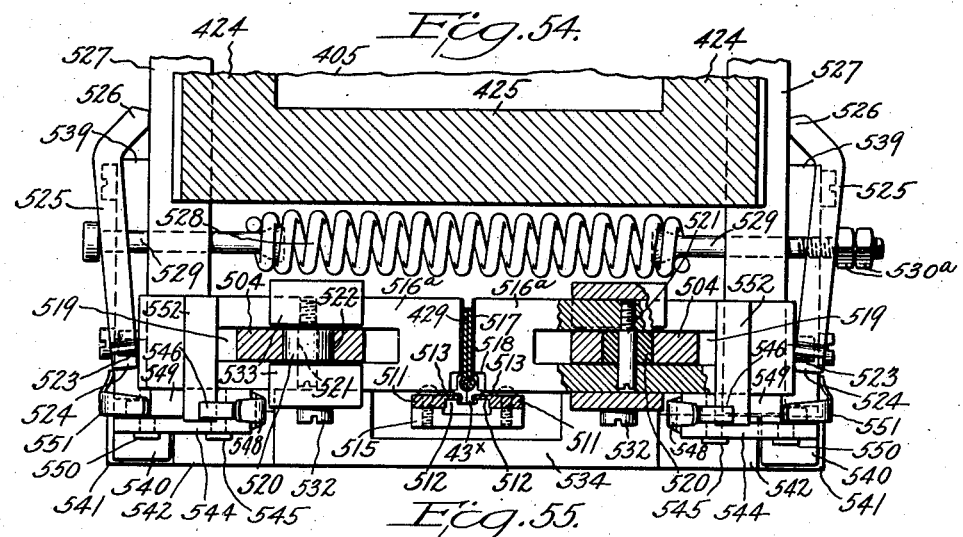
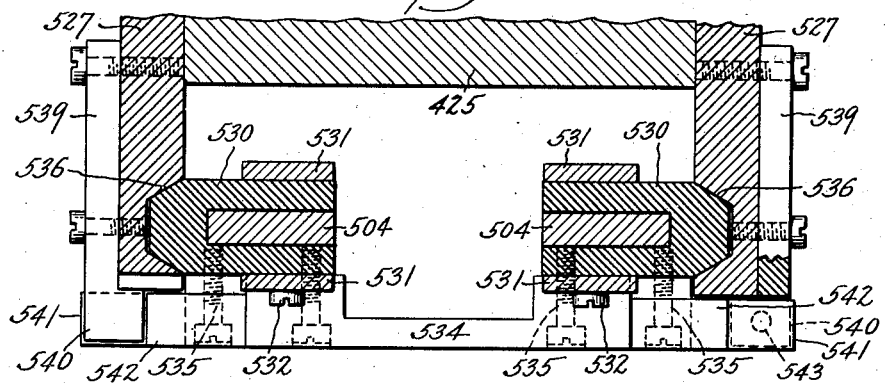
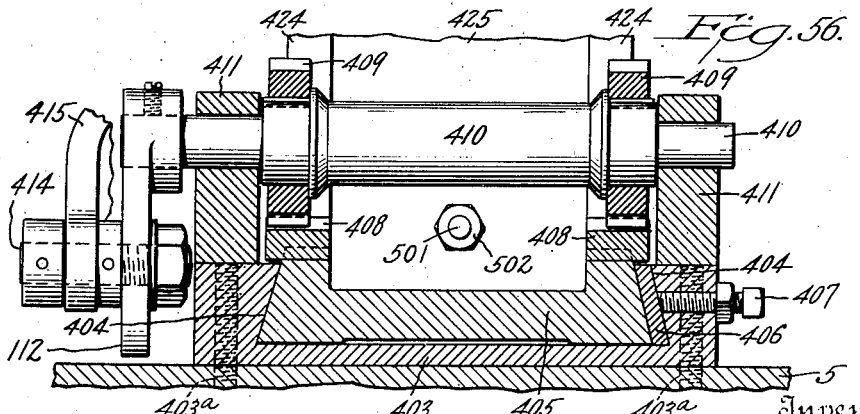

Dec. 31, 1935.     E. H. BINNS ET AL     2,026,413
METHOD AND MACHINE FOR MAKING FLEXIBLE CLOSURES
Filed Nov. 21, 1930     27 Sheets-Sheet 22
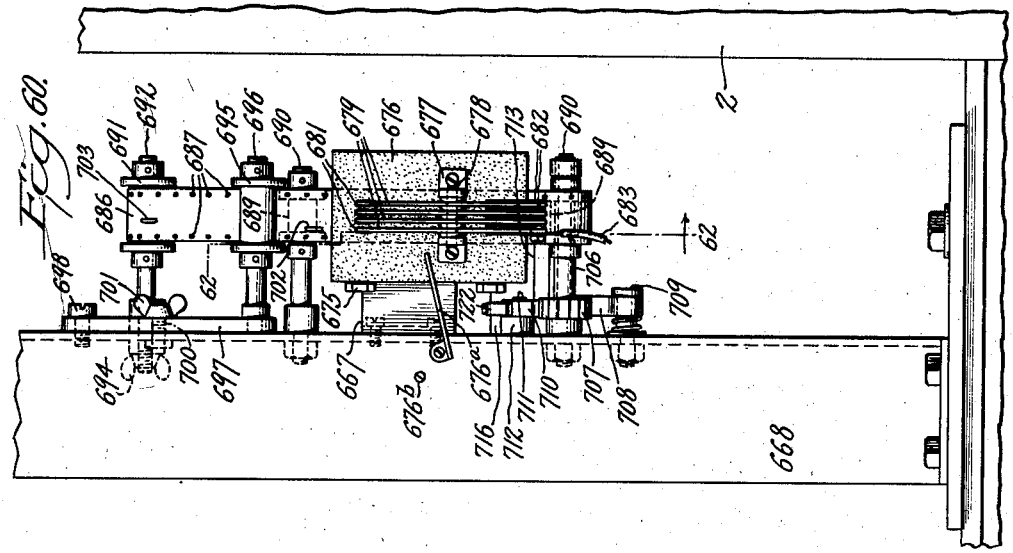
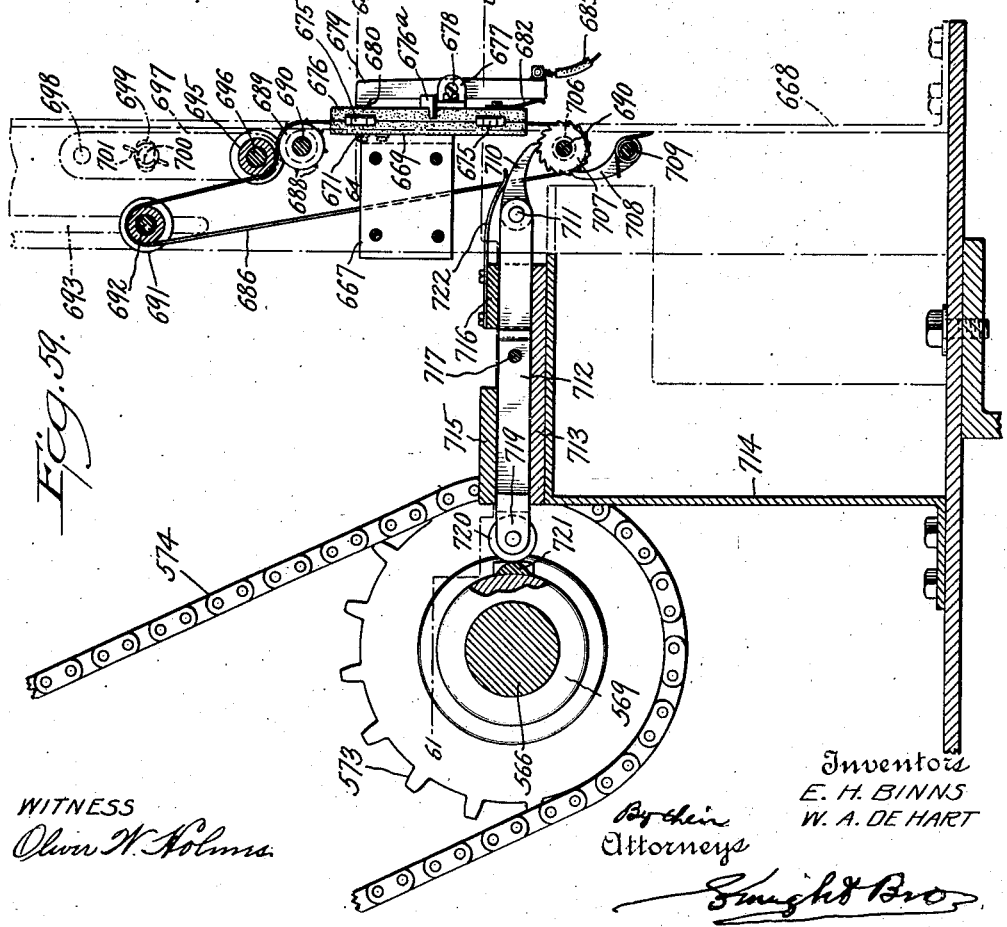
WITNESS
Inventors
E. H. BINNS
W. A. DE HART
By their Attorneys Dec. 31, 1935. E. H. BINNS ET AL 2,026,413
METHOD AND MACHINE FOR MAKING FLEXIBLE CLOSURES
Filed Nov. 21, 1930 27 Sheets-Sheet 23
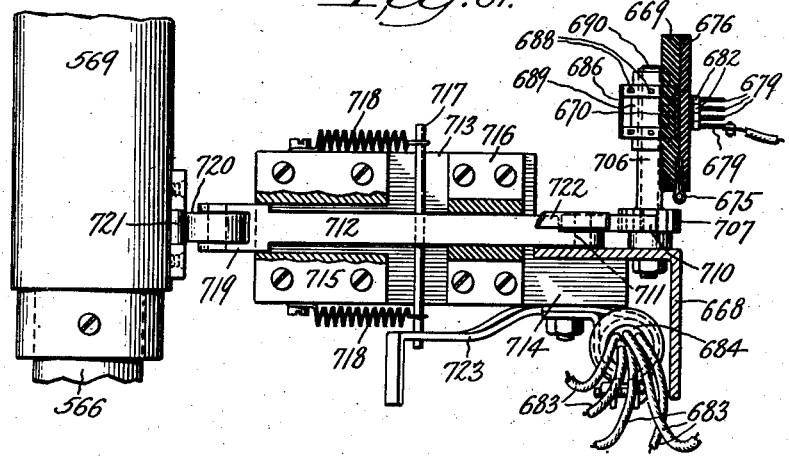
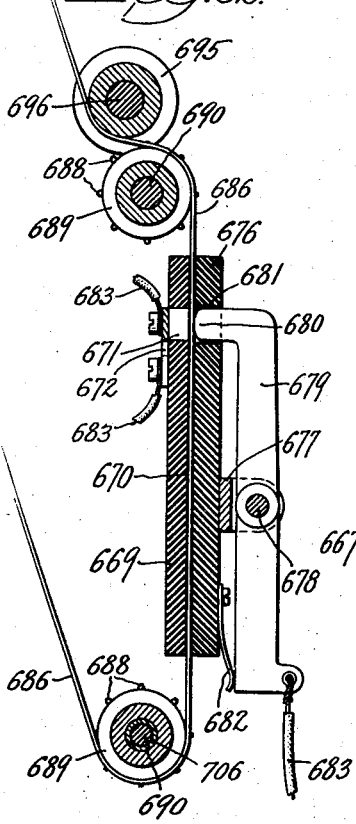
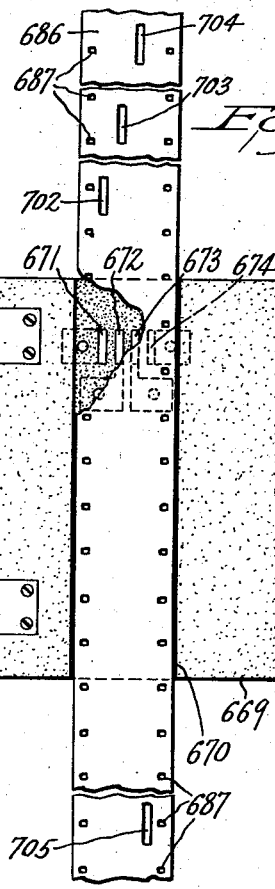
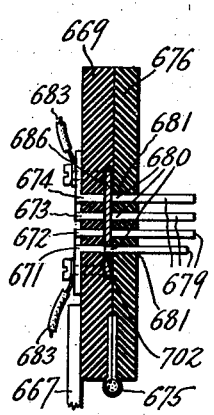
Inventors
E. H. BINNS
W. A. DE HART Dec. 31, 1935.  E. H. BINNS ET AL  2,026,413
METHOD AND MACHINE FOR MAKING FLEXIBLE CLOSURES
Filed Nov. 21, 1930  27 Sheets-Sheet 24
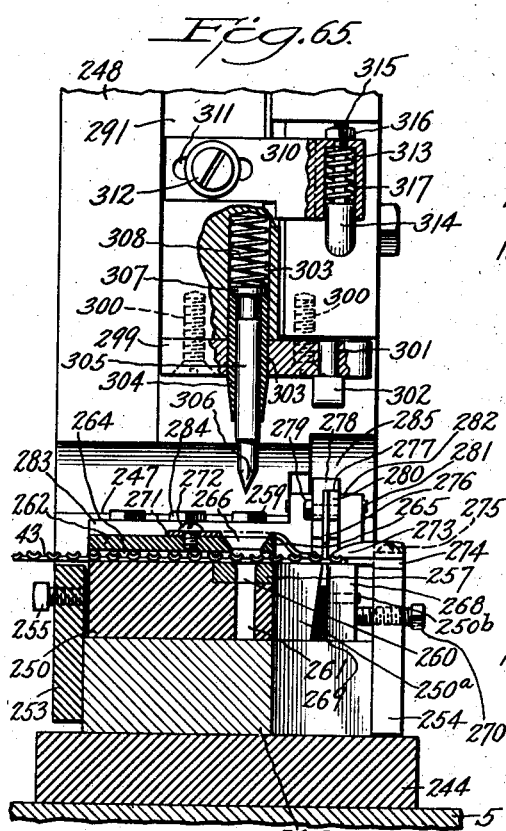
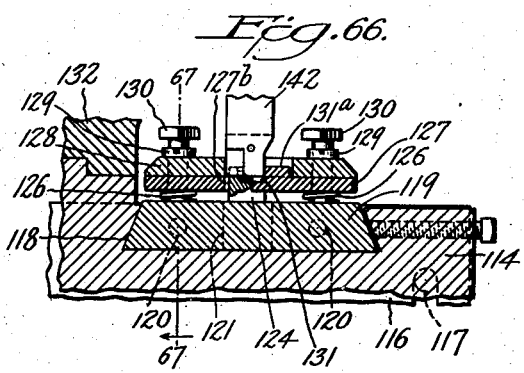
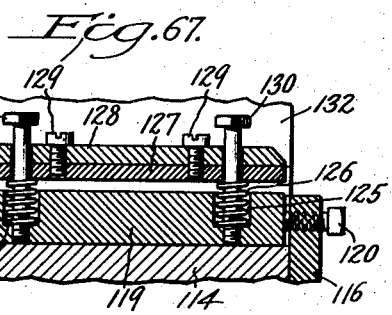
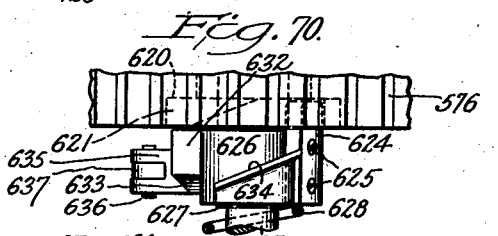
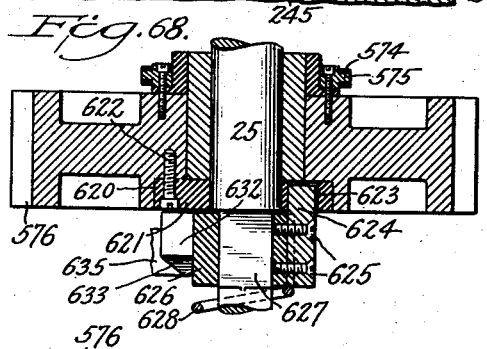
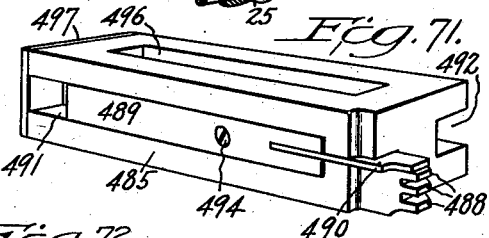
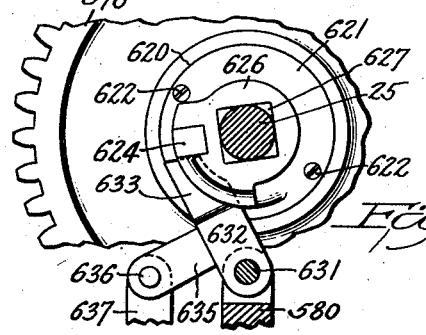
Inventors
E. H. BINNS
W. A. DE HART
By their Attorneys Dec. 31, 1935.   E. H. BINNS ET AL   2,026,413
METHOD AND MACHINE FOR MAKING FLEXIBLE CLOSURES
Filed Nov. 21, 1930   27 Sheets-Sheet 25
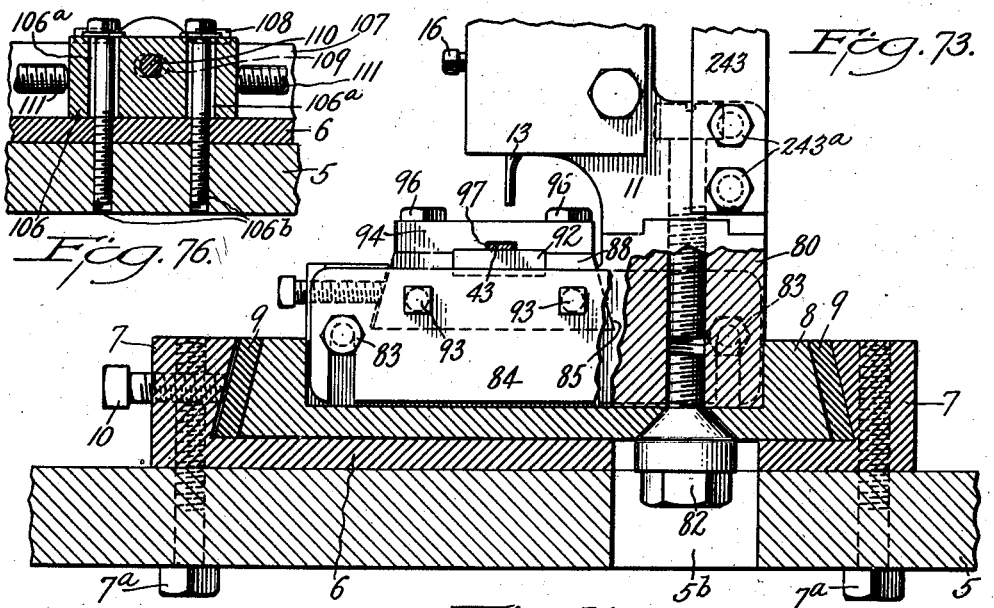
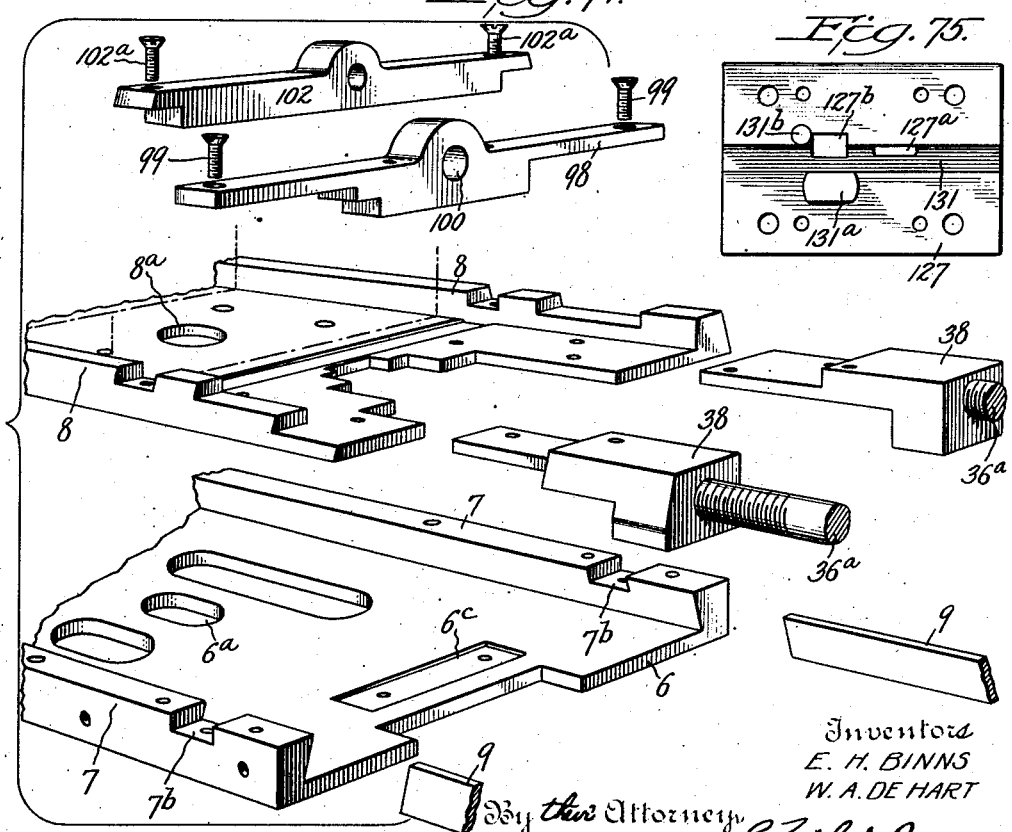

Dec. 31, 1935.  E. H. BINNS ET AL  2,026,413
METHOD AND MACHINE FOR MAKING FLEXIBLE CLOSURES
Filed Nov. 21, 1930  27 Sheets-Sheet 26
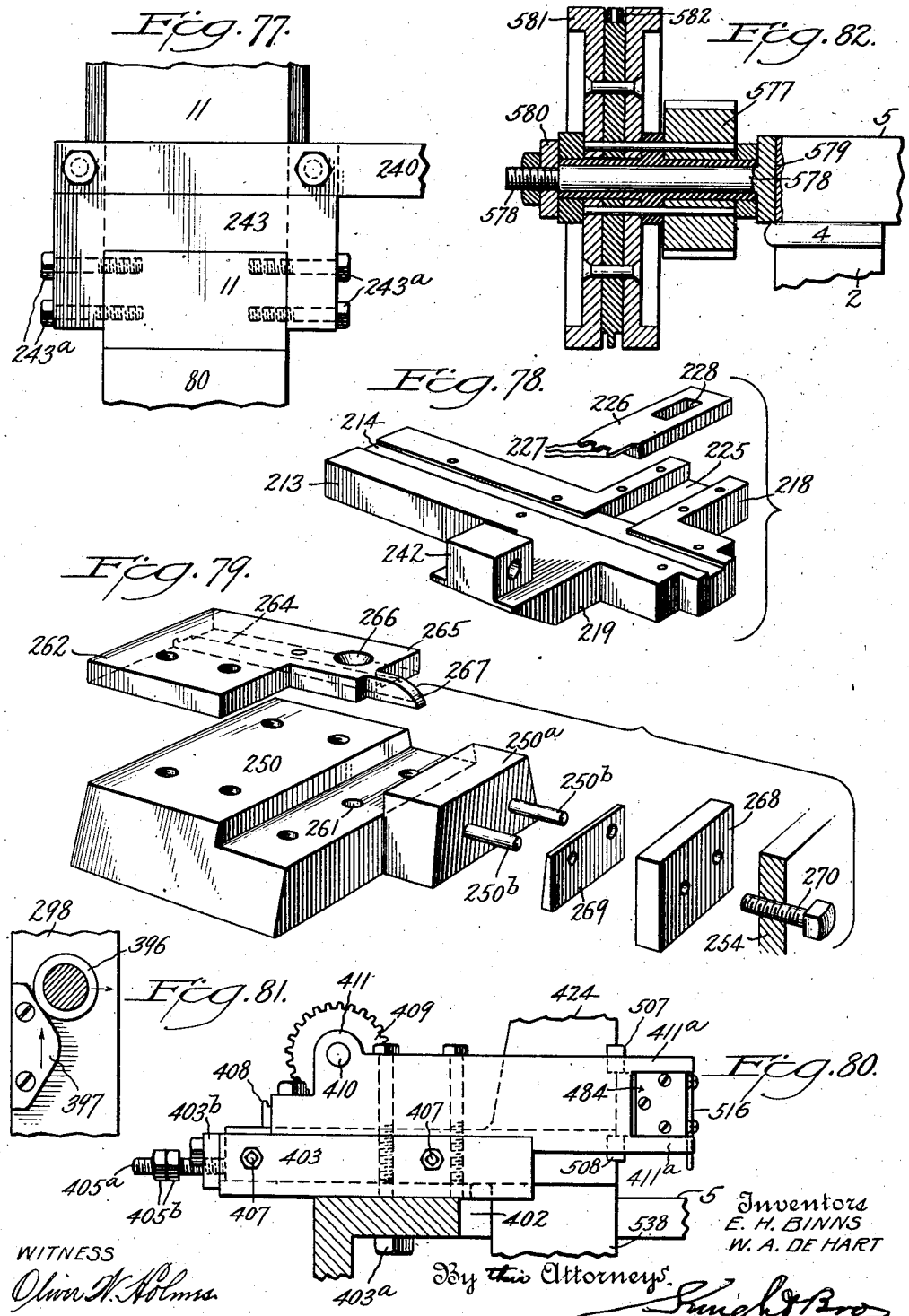
Inventors
E. H. BINNS
W. A. DE HART

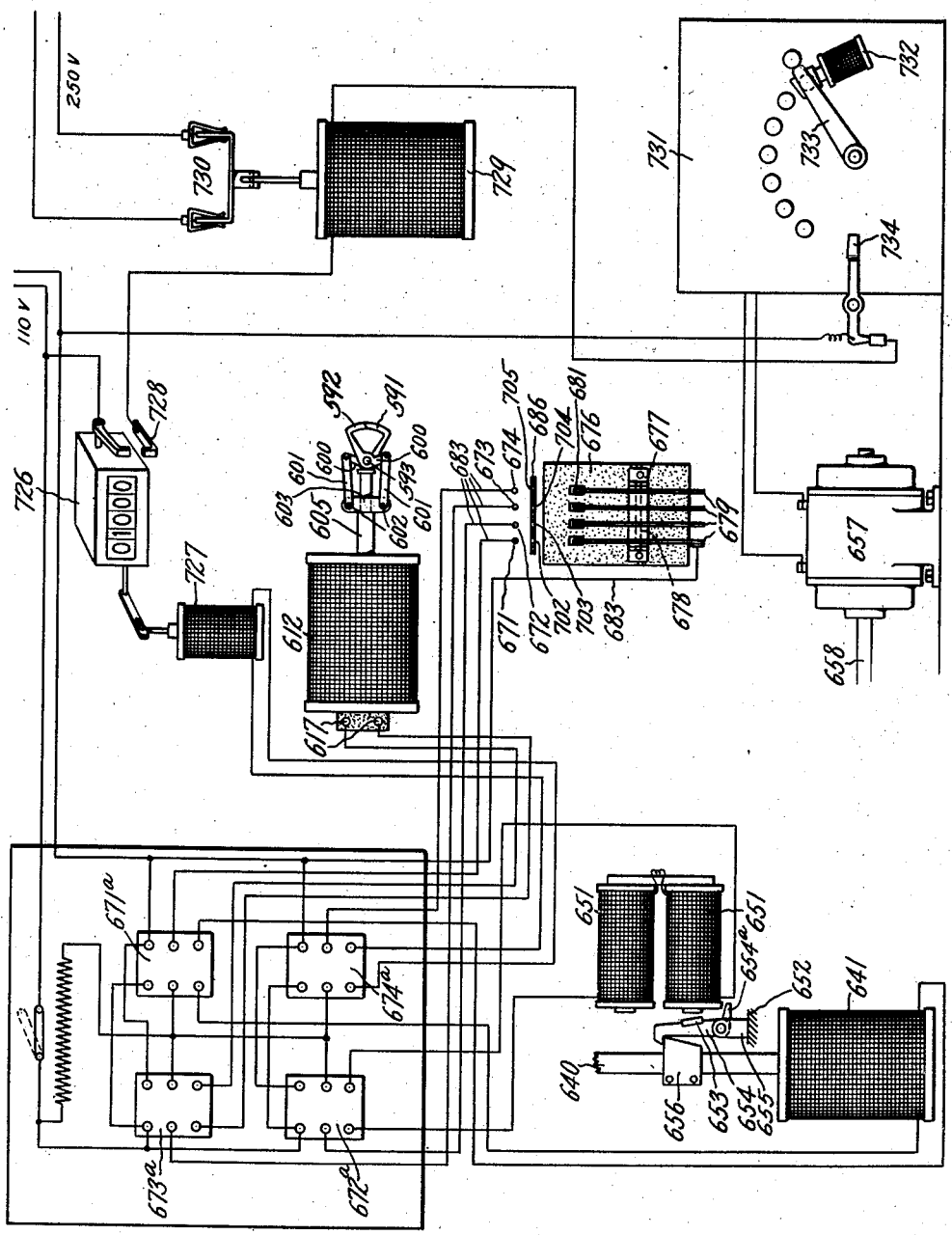

Patented Dec. 31, 1935

2,026,413

UNITED STATES PATENT OFFICE 2,026,413

METHOD AND MACHINE FOR MAKING FLEXIBLE CLOSURES

Edward H. Binns, Pittsburgh, Pa., and William A. De Hart, Teaneck, N. J., assignors, by mesne assignments, to Hookless Fastener Company, Meadville, Pa., a corporation of Pennsylvania Application November 21, 1930, Serial No. 497,174

103 Claims. (Cl. 153—1)

The present invention relates to improvements in automatic machinery and to improved methods for producing stringers of interlocking fastening devices for flexible closures of the type shown in Patents No. 1,553,499 of September 15, 1925, and No. 1,701,555 of February 12, 1929.

The improved machine comprises a plurality of punches for operating upon a blank strip of metal to form in successive stages the characteristic features of the individual interlocking fastening members, and tape forming and feeding mechanism acting upon a tape to fold it longitudinally into a two ply tape having a thickened rib or bead portion for the reception of the yoke ends of the fastening members that are clamped thereon. The folded form of the tape or stringer for the reception of the fastening members is an embodiment of the flexible closure structure covered by Patent No. 1,585,654 dated May 25, 1926.

These two sets of mechanisms,—the punch press mechanisms and the tape forming and feeding mechanisms,—are operated through a divided driving mechanism normally connected through an automatic control clutch so that both sets of mechanisms can be operated in unison for the continuous production of stringers or,— by shifting the connecting clutch,—the production of fastening members may be discontinued while the tape forming and feeding mechanism is continued in operation to supply blank parts of the formed tape between groups of fastening members. In this way the separation of groups of members upon the tape is effected, the feed of the tape being a uniform step by step operation whether fastening devices are being made and mounted upon the tape, or blank spaces between groups of members are being produced.

This arrangement of the two sets or groups of mechanisms which can operate together or with the fastener producing group disconnected is an important feature of the present invention. The importance of this divided operation of the two groups of mechanisms is due partly to the provision of an automatic control which maintains the joint operation of the mechanisms for a proper period to produce stringers with a predetermined number of fastening devices and, at the completion of a group of said devices of the desired number or length of stringers, acts through suitable means to arrest the action of the mechanisms for forming fastening members while the formation and feed of the folded beaded tape is kept up at the uniform rate of speed,— and upon the feed of a sufficient length of blank tape or stringer to again throw into action the fastener forming mechanisms to start a new group of fastening members.

Associated with the two sets of mechanisms referred to is a cut-off mechanism which is also actuated by the automatic control to cut the formed tape or stringer between groups of fastening members, to produce the desired length of stringers with the proper number of fastening members and extra blank ends of folded two ply tape.

The present invention includes, in addition to the above recited main features, improved constructions and arrangements of parts to insure accuracy and rapidity of operation of the machine in performing its work. The blank strip of metal is fed through the machine by a step by step motion induced through the operation of one of the punch presses which is mounted on a reciprocating bed and intermittently moved forward a step while the punches are in engagement with the strip and retracted to initial position while the punches are withdrawn,—the strip being held against rearward movement by suitable intermittently acting clamping means.

The improved fastener members are formed in a continuous strip or connected series by which they are fed and controlled until they are cut off as individual members. At the cut-off point each successive individual member is gripped rigidly by a carrier and conveyed to position for clamping it upon the beaded edge of the prepared folded carrier tape or stringer. The tape is drawn through the folding and forming devices by a step by step feeding mechanism mounted upon a reciprocating carriage by which the formed beaded edge of the folded tape is moved laterally into the forwardly presented open jaws of the finished fastening member supported firmly by the carrier gripper, clenching devices being thrown into action immediately thereafter for clamping the jaws of the fastener member upon the tape.

The improved machine is preferably automatic in its operation. The automatic controlling mechanism may be of any approved type but is preferably of the electrical type in which each important part of the mechanism is thrown into or out of action by the operation of an electro-magnet controlled through contact devices which are caused to function at the proper time by the mechanical operations that are controlled. The machine is driven by an electric motor receiving current through a rheostat or starting device and main supply switch as is usual; the rheostat lever being preferably under the control of a counting device of suitable construction, which, upon the completion of a count of the desired number of complete stringers produced by the machine, will actuate the rheostat lever for throwing out the motor and stopping the machine. The automatic clutch which connects the divided driving mechanisms operating the presses for producing fastener-members and the stringer forming and feeding mechanism is preferably controlled by two electromagnets, one of which releases the clutch for connecting up the divided drive mechanism while the other holds the clutch-operating devices in clutch released position until the clutch is to be thrown out to permit the stringer forming and feeding mechanism to operate alone. A third electromagnet controls the cutoff shears that sever the tape between groups of fastener members.

These several electrical controls are preferably in circuit with a group of contacts normally separated by an endless band of insulating material which is fed in a step-by-step manner one step for each revolution of the machine, said band having perforations formed in it at proper intervals to permit contact through the desired set of contact devices to operate the controlling magnets at the proper times to produce the desired results.

A still further object is to provide an improved method for forming separable fastener members wherein said members are substantially formed while connected together in a strip of metal.

In order that the invention may be fully understood it will first be described with reference to the accompanying drawings and the novelty thereafter more particularly pointed out in the annexed claims.

In said drawings:—

Figure 1 is a front elevation of the improved machine for producing stringers for flexible closures;

Figure 1a is a detail sectional view, taken on the line 1a—1a of Figure 1, showing the chip removing brush;

Figures 2 and 2a represent, taken together, a plan view of the said machine, Figure 2 representing the right hand portion of the machine, while Figure 2a represents the left hand portion of the same;

Figure 2b is a detail sectional view taken on the line 2b—2b of Figure 2;

Figure 3 is a left end elevation of the improved machine;

Figure 4 is a rear elevation of the left hand end of the machine;

Figure 5 (Sheet 21) is a partial end elevation of the right hand end of the improved machine;

Figure 6 is a vertical transverse sectional view taken on the line 6—6 of Figure 1;

Figure 7 is a partial vertical central longitudinal sectional view of the machine;

Figure 8 is a detail sectional view taken on line 8—8 of Figure 7 showing the cut-off device for severing individual fastener-members from the strip;

Figures 9 and 10 are detail perspective views of parts of said cut-off mechanism;

Figure 11 is a vertical transverse sectional view of the machine taken on the line 11—11 of Figure 1 and showing particularly the buffing mechanism;

Figure 12 is a detail sectional plan view illustrating the bed-plates of the first three punch presses and the operating mechanism for the reciprocating bed of the first punch press;

Figure 13 is a detail vertical longitudinal sectional view taken on the line 13—13 of Figure 12;

Figure 14 is a detail vertical transverse sectional view taken on the line 14—14 of Figure 12;

Figure 15 is an enlarged detail vertical longitudinal sectional view showing the first three punch presses;

Figure 16 is a detail plan view of the bed portion of press No. 1, part of the punch guiding and stripping plate being broken away to show the work;

Figure 17 is a view similar to Figure 16 showing the bed portion of press No. 2;

Figure 18 is a view similar to Figures 16 and 17 showing the bed portion of press No. 3;

Figure 19 is a detail vertical longitudinal sectional view of parts of press No. 1 indicating the relation of the punches to the metal blank strip extending over the bed-plate;

Figure 20 is a detail plan view of the blank strip upon the bed-plate of press No. 1 showing the three punches in cross-section in the blank strip;

Figure 21 is a detail vertical longitudinal sectional view of parts of press No. 2 illustrating the action of the male and female dies upon the metal blank strip;

Figure 22 is a detail plan view of the female die members of Figure 21 beneath the blank strip;

Figure 23 is a horizontal sectional view taken on the line 23—23 of Figure 21;

Figure 24 is a detail vertical transverse sectional view illustrating one pair of male and female dies of press No. 2 as shown in Figure 21;

Figure 25 is a detail sectional elevation of the other pair of male and female dies of press No. 2, shown in Figure 21;

Figure 26 is a detail vertical longitudinal sectional view illustrating parts of press No. 3 and the connected series of fastener members upon which the punch of press No. 3 imparts the final work;

Figure 27 is a detail plan view of the work upon the bed-plate of press No. 3, showing the final punch in cross-section in the work;

Figure 28 is an enlarged detail vertical transverse sectional view taken on the line 28—28 of Figure 1 and showing press No. 3;

Figure 29 is a detail perspective view of the pilot or gauge plate of press No. 3;

Figure 30 is a vertical transverse sectional view taken on the line 30—30 of Figure 7 showing parts of the auxiliary feed and press No. 4 by which the auxiliary feed is operated;

Figure 31 is a plan view, partly broken away, of the mechanism shown in Figure 7;

Figure 32 is a vertical transverse sectional view taken on the line 32—32 of Figure 31;

Figure 32a is an enlarged detail transverse sectional view of the cutoff knife for cutting off fastener members;

Figure 33 is a view similar to the main part of Figure 32 showing the closed position of the operative parts;

Figure 34 is a detail front elevation of the carrier for cutoff fastener members;

Figures 34a and 34b are enlarged detail sectional views of the gripper which grips the fastener members;

Figure 35 is a vertical sectional view taken on the line 35—35 of Figure 31;

Figure 36 is a view similar to Figure 35 showing the main parts in shifted position;

Figure 37 is a detail sectional view taken on the line 37—37 of Figure 36;

Figure 38 is a rear face view of the tape forming, feed and associated devices, part being removed and part being shown in section;

Figure 39 is a vertical sectional view taken on the line 39—39 of Figure 38;

Figure 39a is a detail perspective view of one of the tape-feeding gripper bars;

Figure 39b is a perspective view of a section of folded tape indicating two spaced groups of fastener members;

Figure 39c is an enlarged perspective view of a single detached fastener member;

Figure 40 is a detail transverse sectional view taken on line 40—40 of Figure 38;

Figure 41 is a detail vertical sectional view taken on the line 41—41 of Figure 38;

Figure 42 is a detail sectional view taken on the line 42—42 of Figure 39;

Figure 43 is a detail plan view of the upper portion of the tape folding and forming device;

Figure 44 is a rear view of the same;

Figure 45 is a plan view, partly broken away, of the spring actuated tape pressing rolls, the device being detached from the rest of the mechanism for the purpose of clearly illustrating it;

Figure 46 is a perspective view of one of said tape pressing rollers and its supporting carrier;

Figure 47 is a sectional view taken on the line 47—47 of Figure 44;

Figure 48 is an underneath plan view of the tape folding and forming mechanism in the plane of separation from the tape pressing rollers illustrated in Figure 45;

Figures 49, 50, and 51 are detail views in rear elevation showing the clencher and member spacing devices and tape-feeding devices, the parts being shown in progressive positions in the several views to illustrate the operation of said devices;

Figures 52 and 53 are horizontal sectional views taken on the line 53—53 of Figure 38 and showing two positions of the mechanism for clamping the fastener members upon the beaded edge of the folded tape;

Figure 54 is a sectional view taken on the line 54—54 of Figure 38;

Figure 55 is a detail sectional view taken on the line 55—55 of Figure 38;

Figure 56 is a detail sectional view taken on the line 56—56 of Figure 2a;

Figures 57 and 58 are respectively a vertical sectional view and a bottom plan view of the automatically controlled tape cut-off mechanism;

Figure 59 is a transverse vertical sectional view of the automatic control mechanism;

Figure 60 is a detail front elevation of the main parts of the same mechanism;

Figure 61 is a sectional view taken on the line 61—61 of Figure 59;

Figure 62 is a vertical sectional view taken on the line 62—62 of Figure 60;

Figure 63 is a detail fragmentary view illustrating the circuit controlling band of the automatic controlling mechanism;

Figure 64 is a detail sectional view taken on the line 64—64 of Figure 59;

Figure 65 is a vertical longitudinal sectional view through press No. 4 showing the strip-gauging pilot to the member cutoff and the carrier gripper;

Figure 66 is a transverse sectional view taken on the line 66—66 of Figure 17;

Figure 67 is a detail sectional view taken on the line 67—67 of Figures 17 and 66;

Figure 68 is a detail horizontal sectional view illustrating the automatic controlling clutch dividing the driving mechanisms for the punch presses and tape folding and feeding mechanism;

Figure 69 is a detail face view of said controlling clutch;

Figure 70 is a detail plan view of said clutch;

Figures 71 and 72 are detail perspective views of the mechanism for clamping fastener-members upon the beaded edge of the folded tape and for gauging the spacing between successive fastener-members upon said tape;

Figure 73 is a detail vertical transverse sectional view taken on the line 73—73 of Figures 2 and 15;

Figure 74 is a view in perspective of disassembled parts of the bed-plate and reciprocating bed of press No. 1;

Figure 75 is a detail plan view of the stripper plate of press No. 2;

Figure 76 is a detail vertical transverse sectional view taken on the line 76—76 of Figure 12;

Figure 77 is a detail rear view of part of press No. 1 showing the connection of operating bar extending to the auxiliary feed;

Figure 78 is a detail perspective view of the reciprocatory slide of the auxiliary feed;

Figure 79 is a detail enlarged perspective view of disassembled parts of press No. 4;

Figure 80 is a detail side view of an auxiliary fixed arm of the supporting frame for the reciprocating tape-former;

Figure 81 is a detail face view of the cam for operating the gripper trip of the fastener-member carrier;

Figure 82 is a detail vertical sectional view taken on the line 82—82 of Figure 2a;

Figure 83 is a diagrammatic view illustrating the electrical control of the improved machine;

In specifically describing the improved machine the mechanisms will be referred to in their natural order, starting with the punch and die mechanisms which act successively upon an intermittently fed continuous metal strip-blank to form individual interlocking closure members; the first punch press being reciprocable to also act as the main step-by-step feed for the metal strip-blank; then the mechanism for severing completely formed individual closure fastener-members from the continuous metal strip; the carrier mechanism for taking successive severed members from the cutoff mechanism and moving them to a point where they are clamped upon the beaded flexible tape or stringer; the mechanism for longitudinally folding a tape and forming it with a beaded edge and feeding the beaded folded tape and presenting it intermittently in step-by-step movements within the open jaws of fastening closure members which are clamped upon its beaded edge; means associated with the tape-forming and feeding mechanism for spacing successive closure members and for clamping them upon the beaded edge of the folded tape; power mechanism acting through an automatic clutch which divides the power between the camshaft which operates the punch and die and other mechanisms acting upon the metal strip-blank and closure members formed therefrom, and the tape-forming, feeding and member-clamping mechanisms, said divided feed being so arranged and controlled that all of the mechanisms can be caused to operate in proper unison and sequence to form closure members and clamp them upon the folded tape, or the formation of closure members may be arrested while the tape-forming and feeding mechanisms continue in operation to produce blank parts of the formed tape between groups of attached closure members; automatically controlled cutoff mechanism for severing the folded tape or stringer between groups of closure members; and finally automatic controlling mechanism by which the machine is caused to produce flexible closure stringers with the desired number of closure members and blank ends of tapes or stringers.

There are many detail devices forming parts of, or associated with, the general mechanisms referred to, all of which will be specifically described in their proper relationship with reference to the grouping of mechanisms and the accompanying drawings.

The machine embodying the present invention may be mounted upon any suitable framework. In the embodiment illustrated in the accompanying drawings the machine is mounted upon a heavy framework comprising the two end-frames or standards 1 and 2 having upon their upper ends the solid cross-bars or girders 3, 4 upon which is rigidly mounted a heavy steel table or platform 5. The table 5 is preferably of solid steel having integral downwardly presented strengthening flanges upon its sides and ends. This rigid framework is suitably braced by the shafts, supporting brackets and other rigidly attached parts hereinafter specifically referred to so that the machine parts will be substantially supported in their operative relation.

*Punch and die forming and feeding mechanisms of press No. 1*

The metal closure members are formed from a metal strip-blank by the successive action of punches and dies mounted in a series of three presses arranged upon the table or platform 5 at the right-hand or leading-in end of the machine shown in Figures 1, 2 and 5 of the drawings.

A heavy shallow steel tray 6 open at its ends and having heavy upstanding side flanges 7, is rigidly secured to the right-hand end of the table or platform 5 in the central longitudinal plane thereof, by means of heavy bolts 7a which are inserted from beneath the table or platform 5 and threaded into the tray 6 and its flanges 7 as best shown in Figure 73 on Sheet 25 of the drawings. This tray 6 affords a supporting bed for the three presses presently to be described, press No. 1 of which has imparted to it a short to and fro motion and, when the metal blank is engaged by its punches, constitutes the main feed mechanism for passing the metal strip blank in a step-by-step motion through the machine.

Press No. 1 (best shown in Figures 1, 2, 5, 12, 13, 14, 15, 73, and 74 of the drawings), has a rectangular bed-plate 8 sliding upon the base tray 6 between the undercut inner faces of flanges 7, the side edges of the bed-plate 8 being bevelled and shims 9 being mounted between the bevelled edges of bed-plate 8 and the side flanges 7. Set screws 10 are threaded through the front flange 7 and engage one of the shims 9 to accurately confine the bed-plate 8 of the press in position and at the same time allow freedom of motion for its reciprocation. The press standard 11 extends upwardly from the press block 80 mounted upon the bed-plate 8 upon which it is firmly supported, as hereinafter more fully described.

This standard 11 of press No. 1 carries a vertically reciprocating plunger 12 in the lower end of which are secured the three punch members 13, 14, and 15, said punch members being removably secured in the plunger 12 by means of set screws 16. The reciprocating plunger 12 carries at its upper end a slotted yoke 17 embracing an anti-friction roller 18 carried by pin 19 supported in the bifurcated end 20 of the press operating lever 21 which is pivoted upon the bracket 22 secured to the table 5 and engaged at its rear end 23 by a cam 24 mounted upon the main cam-shaft 25 extending from end to end along the rear edge of the table or platform 5, said cam-shaft being suitably supported and journalled in bracket-bearings 26 secured to the table or platform 5. In this operative connection between the cam 24 and reciprocating plunger 12 of press No. 1 it will be understood that the arms of the bifurcated end 20 of lever 21 are sufficiently spaced to permit the free movement of plunger 12 on roller 18 upon the reciprocation of press No. 1 in accomplishing the feed of the metal strip-blank.

Press No. 1 is given an intermittent forward feeding motion with the punches in engagement with the blank and an intermittent return movement to initial position with the punches released from the blank, said movements being accomplished by means of the rocker-arms 27 extending upwardly from and keyed to the rock-shaft 28 which is freely journalled in the bracket-bearings 29 bolted to the end of the table or platform 5, as shown in Figures 1, 2, 5, 12, and 13. This rock-shaft 28 has secured to it a downwardly projecting arm 30 to which is pivoted a rod 31 extending through a bracket 32 and supporting a coil spring 33 confined upon the rod 31 against bracket 32 by means of nuts 34 threaded upon rod 31. The rock-shaft 28 also carries an upwardly projecting rock-arm 35 which is engaged by a cam 36 mounted upon the main cam-shaft 25.

The rocker-arms 27, above referred to, are formed with bifurcated upper ends 27a which straddle two bolts 36a between pairs of oppositely presented flanged bushings 37 mounted upon said bolts 36a. The bolts 36a are threaded into blocks 38 rigidly secured to the reciprocatory bed-plate 8 from which said bolts extend horizontally above the transverse rock-shaft 28. The bolts 36a have threaded upon them adjacent to the blocks 38, the adjustable nuts 39 and at their outer ends adjustable nuts 40, coil springs 41 being confined between the nuts 39 and the annular flanges of the inner bushings 37 while coil springs 42 are confined between the nuts 40 and the outer flanged bushings 37. The arrangement of described cushioning connections between the rock-arms 27 and press No. 1 is for the purpose of affording a yielding excess of motion to the feeding action of press No. 1 to ensure accuracy in the feeding stroke and maintain the press under tension in its extended position of feed until the metal strip-blank is engaged and held by other instrumentalities presently to be referred to.

43 represents the flat metal strip blank which may be supplied to the machine from any suitable source such as a spool or reel (not shown) from which it can readily be drawn into the machine as needed.

44 is a bracket rigidly bolted to the end of table or platform 5 and formed with a horizontal slot or opening 45 for the passage of the strip-blank 43. This bracket 44 carries two horizontally extending-bracket arms 46 in the free ends of which is mounted a transverse pin 47 upon which is pivoted the bifurcated lower end of a link 48 carrying a removable wear block 49 having a slot or passageway 50 extending through it in alignment with guide opening 45 for the free passage of the metal strip-blank 43. A lower roller 51 is freely journalled upon the pin 52 mounted in bracket-arms 46 and is supported thereby with its periphery in the horizontal plane of feed of metal strip-blank 43 as it passes through feed-openings 50 and 45 above referred to. Cooperating with the lower roller 51 is an upper tension-roller 53 freely journalled upon a pin 54 carried between a pair of arms 55 pivoted at 56 upon the bracket 44 and extending horizontally to a point above the blank guiding link 48. A tension rod 57 passes freely through an opening in a bridge piece 58 connecting arms 55 and is threaded into the upper end of the guide link 48. This rod 57 carries a coil spring 59 confined between the collars 60 by a nut 61 threaded upon the upper end of rod 57. The spring 59 applies tension to the pivoted frame (arms 55 and bridge 58) carrying the roller 53 holding said roller down upon the blank 43 at the point of its support upon the lower roller 51.

Upright members 62 are secured to and project upward from the pivoted arms 55, said upright members 62 being connected at the top by a crossbar 63 (see Figures 1 and 5 of the drawings). An adjusting screw 64 is threaded through the crossbar 63 and carries at its lower end a brake block 65 which engages the periphery of the upper roller 53. A lock nut 66 upon screw 64 engages crossbar 63 and holds the brake lock in the desired adjusted relation to the roll 53. In this maner the tension roller 53 is pressed against the blank 43 by the pressure of spring 59 and the freedom of its rotation upon its axis is further restricted by the adjustment of the brake block 65.

The metal strip-blank 43 passes from the guide slots 45 in bracket 44 through a shallow guide channel 67 formed in the upper face of a heavy plate or block 68 which is rigidly secured to the upright side flanges 7 of tray 6 carried by the table or platform 5. 69 is a clamp member rigidly secured at 70 to the clamping bar 71, which bar is pivoted at its forward end 72 in the bifurcated bracket 73 which is secured by screws 74 to the upper face of the plate or block 68. The clamping bar 71 extends rearwardly and passes freely between two upright guide flanges of bracket 75 which is secured to the plate or block 68. The rear end of the clamping bar 71 carries an antifriction roller 76 which operates upon the cam 77 carried by the cam-shaft 25. A coil spring 78 connects the clamping bar 71 with a bracket 79 secured to the table or platform 5. The shape of the cam 77 as shown in Figure 5 of the drawings is such that the clamp member 69 will be held down in engagement with the metal strip-blank 43 for the greater part of a revolution of the cam-shaft, the high part of the cam 77 acting to momentarily raise the clamp from the blank while it is given a forward feeding impulse by the means hereinafter described.

Referring particularly to Figures 2, 12, 13, 14, 15, 16, 73, and 74 of the drawings, it will be observed that the reciprocatory flanged tray 8 of press No. 1 carries a heavy block 80 having a central opening 81 registering with a similar opening 8a of the bottom plate of bed-plate 8. The fixed tray 6 and the table or platform 5 have openings through them at 6a and 5a respectively which are somewhat larger than the openings 81 and 8a just referred to to ensure free discharge of chips from these latter openings in all positions of the reciprocating press No. 1.

The block 80 referred to has mounted upon it the upwardly projecting standard 11. The specific mounting of this standard in press No. 1 is similar to that of the third press (Figure 28) and is best shown in Figure 73.

The heavy press block 80 is rigidly secured in the recessed upper face of the reciprocatory bed-plate 8 by means of heavy screws 82, one of which is shown in Figure 73, Sheet 25. These screws 82 are preferably inserted from beneath, the table or platform 5 being slotted at 5b and 5c also indicated in dotted lines in Figure 12 of the drawings. The transverse faces of block 80 have threaded into them machine screws 83 which pass through the vertical slots of plates 84 and secure said plates removably to the block 80. The block 80 is formed with a deep dovetail recess 85 to receive the die plates and pillar blocks that are removably mounted therein. There are three pillar blocks indicated at 86, 87, and 88 having chip discharging openings through them leading into the opening 81 of block 80. These pillar blocks are separated by thin spacing strips 89, said strips projecting above the pillar blocks and serving also to separate the three die plates indicated at 90, 91, and 92, see Figure 15. Set screws 93 are threaded through the plates 84 and engage the faces of pillar blocks 86 and 88 for confining the pillar blocks in place and for adjusting the blocks and with them the die plates longitudinally of the machine. The die plates 90, 91, and 92 are surmounted by a cover plate 94 formed with punch receiving openings 95 directly above the openings through the die plates. This cover plate 94 as well as the die plates 90, 91, and 92 are securely fastened to the pillar blocks 86, 87, and 88 by means of vertical set screws 96 which pass through the cover and die plates and are threaded into the pillar blocks. Cover plate 94 has a guide groove 97 in its under face in the longitudinal line of punch receiving openings 95 and in the line of feed of the metal strip-blank 43 which passes between the cover plate and the die plates and is supported thereby for the action of the punches upon the blank.

It will be understood that the punch members 13, 14 and 15 are shaped to cooperate with the dies in punching parts from the metal strip-blank, the particular parts of the work performed by these punches and dies being hereinafter more fully described.

Beneath the plate or block 68 a transverse abutment bar 98 is rigidly secured in cutout notches 7b of flanges 7 of tray 6 by means of set screws 99, the central portion of said bar 98 being thickened and seated in shallow recess 6c in bottom of tray 6 where it is further secured by screw bolts 99a. Bar 98 is perforated at 100 to receive the reduced end of an abutment block 101 which is driven tightly into said perforation 100.

The reciprocatory bed-plate 8 of press No. 1 carries the transverse abutment bars 102 and 103 which are centrally perforated to receive the reduced ends of abutment blocks 104 and 105 which are driven into said perforations. These bars 102 and 103 are firmly seated in notches and recesses in the side and bottom walls of bed-plate 8 and are secured to the bed-plate by means of set screws 102a and 103a. The abutment block 104 is in line with the abutment block 101 with which it engages to limit the movement of press bed-plate 8 to the right. The abutment block 105 is formed with a transversely bevelled or inclined face that is adapted to contact with the bevelled face of an adjustable abutment block 106 which is mounted on the inner face of a transverse abutment bar 107 rigidly secured to the notched out flanges 7 of the fixed tray 6 by means of set screws 108, said bar 107 having formed in it a horizontal slot 109 to loosely receive a screw 110 that passes through said slot and is threaded into the adjustable abutment block 106, see Figure 76, Sheet 25. Abutment block 106 is formed with the slots 106a through which loosely pass the screw bolts 106b which pass through the bottom of tray 6 and are threaded into suitable openings in table 5. Oppositely arranged adjusting screws 111 are threaded through the upright flanges 7 of tray 6 and engage the ends of abutment block 106 for accurately determining the position of block 106 to cause it to arrest the feeding movement of bed-plate 8 of press No. 1. It will be understood that when block 106 is adjusted the screw bolts 106b and 110 are first loosened, then block 106 is adjusted by manipulating bolts 111, after which bolts 106b and 110 are tightened to secure block 106 in its adjusted position.

A consideration of the disassembled perspective view of Figure 74 (Sheet 25) with Figure 73 (same sheet) and Figure 12 (Sheet 8) will give a clearer understanding of press No. 1. The blocks 38 (by which the operating mechanism is connected to the reciprocating tray 8) are flanged and cut away to accurately fit the corners at the right hand end of tray 8 to which the blocks are secured by screws or rivets set in the matching perforations in the parts. The tray 8 with attached blocks 38 rests in stationary tray 6 with the top shoulders of blocks 38 operating to the right of abutment bar 98. The bottom wall of tray 8 is cut out or recessed to avoid interference with the central thickened portion of abutment bar 98.

The metal strip-blank 43 passes from press No. 1 through press No. 2 which carries two sets of male and female dies for acting upon and shaping the portions of the strip-blank that have been punched out by press No. 1.

*Forming dies—press No. 2*

Press No. 2 comprises a flanged bed 112 having outwardly flared side walls resting between the undercut side flanges 7 of the tray 6 and rigidly clamped therein by set screws 113. The flanged bed supports the closely fitting bed-block 114 which is rigidly secured therein by means of set screws 115 inserted from the bottom through the bed 112 to the block 114. Block 114 carries the removably mounted transverse plates 116 held in place by screw bolts 117 threaded into block 114 and engaging the plates 116 through vertical slots of the plates. The bed-block 114 is formed with a transverse recess 118 having undercut side walls to receive the die plate 119 secured in the desired adjusted position upon the bed-block by means of adjusting screws 120 passing through the transverse plates 116 and engaging edges of the die plate 119. The die plate 119 is formed with two cylindrical openings 121 and 122 to receive the cylindrical base blocks of the lower female die members 123 and 124 hereinafter more fully described. The die plate 119 is formed adjacent to its four corners with cylindrical recesses 125 in which are seated the coil expansion springs 126 upon which rests the stripper plate 127 having secured to it by means of machine screws 129 a cover plate 128. Headed guide rods 130 pass freely through guide openings in the stripper plate 127 and attached cover plate 128 and centrally through the coil expansion springs 126 and are threaded into and rigidly secured in the reduced holes in the bottom of recesses 125 of die plate 119.

The stripper plate 127 has a guideway 131 and aligned rectangular openings 127a and 127b to fit over the upwardly presented female die members of the die blocks 123 and 124 and the cover plate has a rectangular opening cut through it above the said openings in the stripper plate. The detail features of stripper plate 127 will be best understood by reference to Figure 75, Sheet 25, of the drawings. It will be observed that said stripper plate 127 is also formed with a rigid upwardly presented lug 131a at one side of guideway 131 and a cylindrical upstanding stud 131b at the opposite edge of guideway 131 and alongside of the die receiving opening 127b. The guide lug 131a supports the upper die member 142 against forward displacement and strain in its action upon the punched blank, while the guide stud 131b assists in maintaining the blank in accurate alignment in the guideway 131 during the action of the dies. The guideway 131 is formed in the upper surface of stripper plate 127 for the passage of the metal strip-blank 43 beneath cover plate 128 by which the blank is held for the action of the dies of press No. 2.

132 is the head or standard of press No. 2, it being mortised into the bed-block 114 and rigidly secured thereon by heavy anchoring screws (not shown) similar to screws 163 and 249, Figures 28 and 32 respectively. This head or standard 132 carries the usual vertically reciprocating plunger 134 having at its upper end a sectional slotted yoke 135 engaged by an anti-friction roller 140 upon the pin 136 mounted in the forked end of the operating lever 137 which is pivoted upon the bracket 138 secured to the table or platform 5 and is engaged at its rear end by an operating cam 139 mounted upon the cam-shaft 25. 141 and 142 are upper or male die members removably mounted in suitable sockets presented downwardly in the reciprocating plunger 134 and removably secured therein by set screws 143. Die members 141 and 142 cooperate with the dies carried by blocks 123 and 124 above referred to, and shape the punched-out parts of the metal strip-blank in the manner hereinafter more fully described. In this operation of press No. 2 it will be understood that the spring supported stripper plate 127 and attached cover plate 128 are carried downwardly by the metal strip-blank when press No. 2 operates, thereby permitting the male and female dies to properly shape the previously punched-out parts of the blank and when released from press No. 2 the springs 126 raise the attached plates 127 and 128 and strip the blank from the horns or projections of the lower die members.

*Punch press No. 3*

The metal strip-blank 43 passes from press No. 2 through press No. 3 which performs the final punching operation upon the blank. This press No. 3 comprises the flanged bed-plate 144 shaped to fit and secured between the undercut flanges 7 of tray 6 in substantially the same manner as described with reference to press No. 2, the bed-plate 144 being secured in position by set screws 145. The table or platform 5 has a discharge opening 5d and the tray 6 has a registering discharge opening 6b which register with a chip discharge opening 146 of bed-plate 144 and opening 147 of bed-block 148 which is secured to the bed-plate 144 by means of set screws 149 inserted from beneath bed-plate 144. The bed-block 148 carries transverse plates 150 removably secured by screw bolts 151 in the manner hereinbefore described with reference to the plates 116 of press No. 2. Bed-block 148 is formed with a longitudinal recess 152 having undercut walls in which rests the block 153 having flared side walls to closely fit the recess 152. Screw bolts 150a are threaded through transverse plates 150 and engage the opposite ends of block 153 to adjust its position with reference to the action of the punch of press No. 3. Screw bolts 154 threaded in block 148 engage the front bevelled face of block 153 to secure it in its adjusted place. Block 153 has a chip opening 155 discharging into opening 147. The die plate 156 is seated in the recessed upper face of the block 153 and surmounting the die plate 156 is a channeled cover plate 157 secured to block 153 by screw bolts 158. This cover plate 157 has an opening 159 to receive the punch member hereinafter referred to and a longitudinal guide channel 160 extending across said opening and the lower die plate 156, said guide being for the passage of the metal strip-blank 43 in proper relation to the punch of press No. 3. 161 is the head or standard of press No. 3 mortised at 162 to the bed-block 148 and rigidly secured to the bed-block by means of heavy screw bolts 163. This head or standard 161 has the usual vertically reciprocating plunger 164 having the sectional slotted yoke 165 at the top which is engaged by a pin 166 carried in the bifurcated forward end 167 of lever 168 which is pivoted upon a bracket 169 secured to the table or platform 5. The lever 168 is engaged at its rear end by a cam 170 upon cam-shaft 25.

The reciprocating plunger 164 carries the removable punch 171 secured in the usual manner by set screw 172, the punch 171 being presented in proper vertical alignment with the opening in the lower die plate 156. 173, shown particularly in Figures 18, (Sheet 9) and 28 and 29 (Sheet 11) of the drawings, is a gauge or pilot formed on its inner reduced end with prongs or fingers 174 which are adapted when pressed inwardly toward the metal strip-blank 43 to engage three successive recesses cut in the forward edge of the blank and by such engagement accurately position the blank for the final action of the punch 171. This gauge or pilot 173 operates upon the forwardly presented guide plate or table 175 which is recessed to fit over the forward shoulder of bed-block 148 to which it is secured by set screws 175a; said gauge 173 being presented in the forwardly open recess 176 of cover plate 157, and having a lower cutout portion 174a (Figure 29) fitting over the die plate 156. This pilot or gauge plate 173 is confined by means of guide plates 177 and is formed with a vertical rectangular slot 178 with which engages the lower shaped end 179 of the vertical lever 180 pivotally mounted at 181 upon a bracket 182 secured to the face of the upright head or standard 161. This lever 180 has pivoted to it a yoke 183 secured to the end of a rod 184 which passes through a suitable opening in head or standard 161 and supports a coil expansion spring 185 which is confined between the standard 161 and a nut 186 on rod 184. The action of this spring 185 upon lever 180 is to hold the pilot or gauge 173 in its forward or inactive position. The upper end of lever 180 is bevelled to engage a tappet 187 secured to the reciprocating plunger 164. It will be clear from this description that when the plunger 164 operates, the pilot or gauge 173 will first move into engagement with the recessed forward edge of the blank to accurately position it, and immediately thereafter the punch 171 will punch out the final part of the blank.

*Connected view of actions of punches and dies of presses Nos. 1, 2, and 3 in forming metal closure members*

The action of the several punches and dies carried by presses Nos 1, 2 and 3 will be best understood by reference to the detail enlarged views of Figures 19 to 27 on Sheet 10 of the drawings. Figures 19 and 20 show the action of the three punches 13, 14, and 15 of press No. 1. A plan view of the shapes of the die openings in die plates 90, 91 and 92 to receive punches 13, 14, and 15 is indicated in Figure 20. These three punches being mounted upon the common reciprocating plunger 12 will act simultaneously upon the metal strip-blank 43, but, because of their spaced relation, upon successive portions of the blank. Punch 13 forms perforations 43a, punch 14 forms recesses 43b and punch 15 cuts the notches 43c in the inner edge of blank 43 to open up the previously formed perforations 43a to form the oppositely presented prongs 43d which eventually are shaped into the final bifurcated hook of the fastening members.

Figures 21 to 25 illustrate the action of press No. 2. Press No. 2 carries two sets of shaping dies, one set comprising the lower female member 123 having spaced horns to project through two adjacent openings 43a of the blank, and an upper male die member 141 which is a simple scoring blade adapted to strike the blank between two perforations 43a and impart a transverse score or shallow cut 43e centrally between prongs 43d. This is for the purpose of assisting in shaping the final bifurcated hook and arched neck of the fastening member, the completion of this shaping operation being performed by the second set of dies 124 and 142. The lower female die member 124 has wings engaging the rear face of the blank adjacent to openings 43a upon opposite sides of a scored portion of the blank and a U-shaped head to receive the pronged head of the blank, the upper cooperating male die member 142 having a central rounded blade 142a designed to press the pronged head down into the recessed portion of the lower die member to properly curve the prongs 43d into the bifurcated hook and to shape the neck of the hook into the arched rounded neck portion. The blade portion 142a is preferably made as a removable section of the upper die member 142, it being inserted in a longitudinal slot or kerf in the end of the die member and removably secured therein by means of a pin or rivet 142b shown in Figure 25. After shaping the bifurcated hooks by press No. 2 the strip-blank or attached series of partly formed fastening members, passes to press No. 3 which carries a single punch 171 which intermittently acts to cut the dovetail recesses 43f in the forward edge of the blank between adjacent recesses 43b. Figure 27 shows a plan view of lower die openings to receive punch 171. This completes the shaping of the metal members with the exception of the riding lugs hereinafter referred to which are formed by cutting the remaining narrow strip of the blank between the formed heads and clamping jaws.

A continuous strip of connected properly shaped fastening members passes from press No. 3 through a longitudinal guide which supports the strip under the action of the buffing devices and auxiliary feed mechanism from the latter of which it is passed to the final press No. 4 by which the individual fastening-members are severed from the strip and delivered to the carrier which carries them away from the cut-off mechanism and supports them for mounting upon the flexible stringer or tape.

Buffing mechanism

This longitudinal guide leading from press No. 3 as just referred to, best shown in Figures 1, 2a, and 11, comprises a lower rigid bar 188 mounted upon the table 5 by means of supporting blocks 189 and formed in its upper face with a guide groove or channel 190 of approximate L-shape to receive the strip of connected formed fastener-members, and an upper covering plate 191 secured to the lower bar 188.

This horizontal guide 188—191 is vertically recessed at 192 to receive the peripheries of two buffing wheels 193, each of which is mounted upon a short shaft 194 freely journaled in the spaced bearings 195 of the H-shaped rocking frame 196 journalled at its lower end upon the pivots 197 and 198 carried by the bracket-frames 199 and 200 which depend from and are rigidly secured to the under face of the table or platform 5. The bracket 200 is centrally located between the two brackets 199 and forms a common support for the adjacent arms of the two H-shaped rocking frames 196. Each of the buffer carrying shafts 194 has secured to it between the bearings 195 a belt pulley 201, over which runs a driven belt 202 passing from the driven pulley 203 carried by the main power shaft 204 which will be hereinafter more fully described. Each of the belts 202 is engaged by any suitable form of belt tightener such as indicated at 205.

206 is a bracket secured to the table or platform 5 (in rear of the buffing wheels 193) to which bracket is pivoted at 207 the upwardly extending rock-arm 208 supporting in its upper bifurcated end an anti-friction roller 209 that operates in peripheral engagement with a cam 210 upon the cam-shaft 25. This rocker-arm 208 has adustable link connections 211 with the inner bearings 195 of both buffing wheels 193. A coil spring 212 connects each of the H-shaped rocking frames 196 with the flange of the table or platform 5 for holding the buffing wheels 193 in their rearward position away from the metal strip-blank in its channelled guide and the anti-friction roller 209 in close contact with the actuating cam 210. The high portion of the cam 210 moves the buffing wheels into engagement with the exposed parts of the formed strip of fastener-members while the strip is at rest and moves the buffing wheels away from the strip for each feeding stroke. The action of the buffing wheels may be maintained during a longer or shorter portion of the time of rest of the blank according to the buffing requirements.

Auxiliary feed

The work passes from the channelled guide bar 188 to an auxiliary feed device clearly shown in Figures 30, 31 (Sheets 11 and 12) and Figure 78 (Sheet 26), and comprising a reciprocatory slide plate 213 formed in its upper surface with the blank guiding channel 214, and mounted to reciprocate in the channel 215 formed in the upper face of a flanged block 216 secured to the table or platform 5 by means of screw bolts 217. The slide plate 213 is formed with laterally projecting wings 218 and 219 which rest in lateral projections 220 and 221 of the guide channel 215, the slide plate 213 with its lateral projections 218 and 219 being of approximate Greek cross shape in plan, as clearly shown in Figure 78 of the drawings. Plates 222 and 223 are secured to the flanged block 216 by screws 224, said plates overhanging the slide plate 213 for confining it upon the block 216. The lateral wing 218 of the cross-shaped slide plate is formed in its upper face with a lateral guide groove or recess 225 in which operates a slide plate 226 formed on its inner end with three prongs or fingers 227 which are designed to engage three adjacent recesses in the forward edge of the metal strip-blank, or connected series of nearly complete fastener-members, and thereby clamp or grip the blank to the auxiliary feed slide. This slide plate or gripper 226 is formed with a vertical rectangular slot 228 in which engages the lower rounded end 229 of an operating lever 230 which is formed with an integral ear 231 operating in the bifurcated upper end 232 of the upright or standard 233 secured to the slide plate 213 by means of screw bolts 234, a cover plate 235 being mounted upon slide 213 beneath the standard 233, said cover plate extending over the guide channel 214. The upper end of the operating lever 230 is slotted at 236 to receive the elongated roller 237 mounted upon pin 238 carried by bracket arm 239 which is mounted upon and vertically reciprocated by the plunger member of press No. 4 which will presently be described.

This auxiliary feed has an operating rod 240 adjustably connected at 241 with a lug 242 projecting from slide 213. Said operating rod 240 extends to the right of the machine to a point in rear of reciprocating press No. 1 to which it attached as shown particularly in Figures 73 and 77 of Sheets 25 and 26 of the drawings. A block 243 is fitted upon and secured to the upright or standard 11 of press No. 1, bolts 243a passing through the block into the standard. Bar 240 is bolted at 240a to block 243. By this means the auxiliary feed is operated by and simultaneously with the feeding motion of press No. 1 which has been already described. Immediately prior to the movement of the auxiliary feed through the connections referred to, the lever 230 is actuated to move the slide plate or gripper 226 into engagement with the metal strip-blank to feed the blank one step in the machine. The cooperation of the main feed of press No. 1 and the auxiliary feed which is coupled thereto results in uniform feeding of the blank and avoids all possible irregularities such as would sometimes be caused by burrs formed upon the blank by the punching operations.

Fastener-member cut-off press

The work next passes to press No. 4 which cuts the individual completely formed fastener-members from the continuous strip. This press No. 4 is particularly illustrated in Figures 7, 8, 9, 10 (Sheet 6), 31 (Sheet 12), 32, 33 (Sheet 13), 65 (Sheet 24) and 79 (Sheet 26) of the drawings. Press No. 4 is mounted upon a plate 244 secured to the table or platform 5 by means of screw bolts 246 inserted from beneath and extended up into the press base member 245. The upper face of base member 245 has mortised 'o it at 247, the upright head or standard 248, the two parts of the press being firmly secured together by screw bolts 249. Base member 245 has formed in it a longitudinal dovetail recess to receive the correspondingly dovetailed block 250, said block being secured in the desired adjusted posi'ion by means of screw bolts 252 and plates 253 and 254, said plate 253 carrying screw bolts 255 which engage the end of block 250. The plates 253 and 254 are secured to base member 245 by means of screws 256. It will be observed that the plate 254 extends only part way across one end of the base member 245 (see particularly Figure 33 of the drawings). The block 250 is formed with a central transverse groove or recess to receive a hardened metal plate 257 (shown in detail in Figure 10) which is secured in place by screw bolts 258 and 259. This hardened plate 257 has a central opening 260 to receive the tapered end of a pilot member presently to be described, said opening 260 registering with a central opening 261 formed through block 250. 262 is a cover plate secured to the face of block 250 by screw bolts 263. This cover plate 262 extends part way over the surface of block 250 and is formed in its under face with a guide groove or channel 264 for the passage of the work. An angular extension 265 of the cover plate is formed with a countersunk hole 266 presented above the work and regis'ering vertically with the guide opening 260 of the hardened plate 257. This hole 266 is for the reception of the pilot member to be described. The cover plate is formed with a further extension in the form of a horn or arm 267 which projects parallel with the guide groove or channel 264 to confine the work against rearward displacement upon the extension 250a of block 250 during the cutting operation. This extension 250a is produced by cutting away the block 250 in the rear of delivery end of press No. 4, this cut-away being for the purpose of affording proper room for the operation of the fastener-member-carrier hereinafter described. The extreme edge of extension 250a is slightly undercut or inwardly bevelled from top to bottom as shown particularly in Figure 65, Sheet 24 of the drawings. The upper edge of this undercut wall is one of two slightly spaced parallel edges of the bottom or stationary member of the cut-off device. The cooperating parallel edge of the lower cut-off member is formed on a hardened metal plate 268 which is secured adjacent to the undercut face of extension 250a with a slight space at the upper or cutting edges of the two members, said space being maintained by means of a wedge shaped shim or spacing member 269; the plate 268 and shim member 269 being mounted upon parallel pins 250b projecting from extension 250a and securely held in position by a screw bolt 270, shown in Figure 65 being threaded through and supported by plate 254 with its inner end impinging upon or pushing against plate 268 and binding it in operative posi'ion. The spacing member 269 is somewhat narrower than extension 250a and plate 268 to provide a groove below the cutting edges of these members within which the cut-off knife of peculiar shape can operate. 271 is a curved leaf spring secured to cover plate 262 by screw 272, said spring curving around the guide hole 266 in which the pilo' member operates and its free end being bent to engage the upper surface of the work parallel with the horn 267 and terminating close to the path of the cut-off knife. The work is further held at the moment a fastener-member is cut off by means of an overhanging finger 273 which has upon its under face a guide channel or groove in which projects the U-shaped clamping end of the tooth or fastening-member while it is being cut off from the strip. This overhanging guide finger 273 is integral with a supporting plate 274 which is secured by two screws 275 to the upper edge of pla'e 254 above referred to.

The movable cutting knife, shown clearly in Figures 8, 9, 32, and 33 comprises a cutting blade proper indicated at 276 mounted in the recess 277 of a supporting rock-arm 278 and firmly clamped therein by a screw bolt 279 engaging a similarly shaped filling plate 280. The knife carrying rock-arm 278 is journalled at 281 between the integrally connected face plates 282 formed as flanges projecting from a base plate 283. Base plate 283 is securely mounted in the upper face of block 250 alongside the cover plate 264 by means of screw bolts 284 and the bolt 259 above referred to which also extends through the hardened plate 257. The knife-supporting face plates 282 extend into the recess or cutout 285 formed partly in the base 245 and partly in the head or standard 248, see Figures 32 and 33. This mounting of the movable knife on its carrying frame presents a downwardly extending heel 276a which projects into the groove or channel between the cutting edges of the lower knife member comprising extension 250a and block 268. This heel 276a ensures the accurate registry of the blade 276 with the grooved lower cutting member. The knife carrying rock-arm 278 has a downwardly curved heel 278a with which engages the small plunger 286 which operates in a cylindrical cavity 287 in the base member 245 and supports a surrounding expansion spring 288 which is adjustably confined by a threaded tubular nut 289 screwed into the outer threaded end of the cylindrical cavity 287 into engagement with the plunger rod and spring and held in the desired adjusted position by the external lock nut 290 as shown in Fig. 8. The action of the spring plunger 286 upon the heel of the knife carrying rock frame is to yieldingly maintain the knife in elevated position above the path of the work.

The head or standard 248 supports a vertically reciprocating plunger 291 carrying at its upper end a sectional slotted yoke 292 engaged by an anti-friction roller 293 carried upon a pin 294 mounted in the bifurcated end 295 of operating lever 296 which is pivoted upon the bifurcated bracket 297 secured to the top of the table or platform 5 and is engaged at its rear end by a cam 298 on the main cam-shaft 25.

This vertically reciprocating plunger 291 (Figure 7) has the bracket arm 239 secured to it by means of a screw bolt 239a, said bracket having been heretofore referred to as the operating means for the lever 230 of the auxiliary feed mechanism. This reciprocating plunger 291 of press No. 4 has secured to its lower end a plate 299 secured by screws 300, see Figure 65, Sheet 24 of the drawings. This plate 299 is perforated at 301 to receive the stem of a tappet 302, the stem of said member having a driven fit with the perforation 301. The tappet member 302 is presented directly above knife-carrying rock-arm 278 so that upon the descent of plunger 291 tappet 302 will engage rock-arm 278 and cause the knife to operate. The raised position of the plunger and knife is shown in Figure 32 while the position immediately after cutting is illustrated in Figure 33.

A vertical cylindrical socket 303 extends up through plate 299 into plunger 291 and mounted in this socket is a tubular bushing 304 supporting a pilot member 305 which has a tapered active lower end 306 and a confining disk or head 307 at its upper end, an expansion spiral spring 308 being confined in socket 303 by the head 307, while the whole device is removably held in the socket of the plunger by means of a screw 309 which passes through the face of the plunger 291 and engages the tubular bushing 304. This pilot member 305 is supported directly above and in axial alignment with the opening 260 and hole 266 of the parts above referred to in which position it is ready upon the descent of the plunger to engage between the jaws of one of the forwardly presented U-shaped clamps of an attached fastening-member. This engagement of the pilot with a fastening-member while it is still part of the continuous strip of formed members will position the strip with great accuracy to place the final fastening-member in exact relation to the plane of cut-off for the action of the cutting-off devices.

The plunger 291 also carries a transverse plate or bar 310 slotted at 311 and secured to the plunger by set screw 312 passing through slot 311. This plate or bar 310 has a vertical cylindrical socket 313 adjacent its free end in which is mounted a spring plunger 314 having a stem 315 extending through the upper wall of the socket 313 and confined by a nut 316 threaded upon the stem, a spiral spring 317 being held between the plunger and the upper end of the cylindrical socket. This spring plunger 314 acting as a spring tappet is for the purpose of operating the gripper of the fastener-member-carrier which will presently be described.

*Fastener-member-carrier*

As each fastener-member is presented in position to be cut off as above explained, a carrier member is moved into position to grasp the projecting fastener-member and firmly support it while it is cut off, and then moved away with it to the next station. This carrier comprises a suitable track-bar supporting the carriage with a member gripper and proper control and operating devices which will now be described with particular reference to Figures 2a (Sheet 3), 6 (Sheet 5), 31 (Sheet 12), 32, 33, 34, 34a, 34b, (Sheet 13), 35, 36, and 37 (Sheet 14).

318 is a heavy plate or bar, in effect a track-bar which extends longitudinally of the machine and is rigidly mounted upon the table or platform 5 by means of screw bolts 319 passing up from beneath the table into the track-bar. This track-bar 318 also overlaps at one end the bed-plate 244 upon which press No. 4 is mounted, track-bar 318 being cut-out to fit over bed-plate 244 and being further secured in this position by machine screws 320 which are inserted from beneath the bed-plate 244, Figure 35. Track-bar 318 is formed with a deep longitudinal recess of dovetail cross-section to form trackway 321 for the reciprocating carriage 322 which has flared side edges to correspond with the shape of the trackway in the bar 318. A shim 323 is placed between one edge of the carriage 322 and the rear guidewall of trackway 321, said shim being engaged by screw bolts 324 to hold the parts in desired adjusted position.

The carriage 322 has secured to it at one end a transverse bar 325 secured by screw bolts 326 and with its rear end projecting beyond the carriage to form a stop at 327 which at the inner limit of the carriage stroke engages the head of a stop screw bolt 328 adjustably mounted in a lug 329 projecting upwardly from the rear portion of track-bar 318, Figure 31. A stop 330 in the form of a screw bolt is mounted in the end of carriage 322 in position to engage a similar screw bolt stop 331 which is adjustably threaded in a cross-bar 332 extending across and secured to the track-bar 318. The stop 330, 331 is the limit of the outward movement of the carrier.

Carriage 322 is formed with a transverse dovetail groove 333 in which is seated a block 334 having a base shaped to fit groove 333 and rigidly secured to the carriage by means of screw bolts indicated at 335. This block or auxiliary part of the carriage has a forwardly projecting integral shoulder 336 to which is secured a similarly shaped hardened metal plate 337 by means of machine screw 338. 336 and 337 are in the form of an anvil projecting forwardly from the carriage 322, 334, adjacent to its inner end, the extreme projection or nose 339 is formed with a shallow curved recess 340 ending at its inner edge in an abrupt curve said recess being an exact counterpart of the outer face of the rounded arched neck and bifurcated hook of the fastener, as shown in Figures 34a and 34b, Sheet 13 of the drawings. This grooved nose of the anvil just described constitutes the lower fixed member of a gripper which grips the yoke ends of individual fastener-members at the moment they are cut off and conveys them to the point where they are clamped to the tape or stringer.

The upper member or jaw of this gripper consists of a downwardly presented finger 341 having shallow grooves extending from front to back to form a central tip 342 shaped to engage the scored upwardly presented surface of the arched neck of the fastener-member that is clamped against the lower gripper nose 339. Upper gripper-member or finger 341 is also formed with a recess 343 to fit over the upwardly presented prongs of the bifurcated hook of the fastener-member when it is gripped. The gripper-finger 341 is formed upon a small base plate 344 which is secured by screws 345 to the forward edge of a gripper-carrying plate 346 which is mounted between two guiding upstanding plates 347 which are parts of the block 334 of the carriage. This gripper-carrying plate 346 is pivotally mounted upon a pin 348 extending through its rear lower corner and secured in the upstanding guide plates 347. A vertical cylindrical recess or pocket 349 receives a coil expansion spring 350 which rests at its lower end upon a shoulder 351 of the recessed block 334. This spring tends to normally hold the carrier gripper open, that is, with the upper gripper member 341 raised away from the lower gripper nose 339.

The pivoted gripper carrying plate 346 has an upwardly projecting lug 352 which is rearwardly bevelled at 353 and transversely grooved at 354 for the engagement of a locking lever 355 which is pivoted at 356 upon a pin passing through spaced guide flanges 357 which are integral with one of the plates 347. This locking lever 355 is formed with a rounded nose 358 designed to engage the shallow groove or recess 354 of gripper-carrying plate 346 to frictionally hold the same in open position, and, when the gripper is closed, to move into engagement with bevelled face 353 to lock the gripper in closed position upon a fastener-member. The face of the locking lever 355 which engages the bevel 353 of the gripper plate is also bevelled as indicated at 359 with the result that the coaction of the two bevelled faces 353 and 359 will exert a strong locking pressure upon the gripper jaws and said pressure being exerted by an arrangement of spring actuated levers presently to be explained will be a constantly exerted pressure to ensure a firm grip upon a fastener-member.

The locking lever 355 has a short longitudinal slot 360 with which engages a pin or lug 361 carried by a bell-crank lever 362 which is pivoted at 363 in a longitudinal channel 364 of carriage-block 322. Bell-crank lever 362 has an arm 365 by which the gripper-lock is released as hereinafter explained. The coil spring 366 seated in cylindrical cavity 367 in auxiliary block 334 engages the heel of lock lever 355 adjacent to its point of engagement with lateral lug 361. This spring 366 maintains the locking lever under spring pressure constantly to lock the gripper-carrying plate in either open or closed position.

The transverse bar 325 of the carriage 322 is notched at 368 to receive the end of a short link 369 which is pivotally anchored in notch 368 by means of a pivot pin 370. This link 369 is connected by a pivot bolt 371 to the lower end of a lever 372 pivotally mounted at its upper end 373 upon an upright bracket-arm 374 which is bolted rigidly to the track-bar 318. This lever 372 is formed with a longitudinal slot 375 in which is adjustably mounted a pivot bolt 376 carried by the long rod or bar 377 which extends over to the right hand end of the machine as shown in Figures 1 and 2 where its threaded end 378 is adjustably connected with a link 379 pivotally connected at 380 to the upper end of a rock-arm 381 projecting from an integral bearing hub 382 suitably journalled upon a bearing sleeve upon rock-shaft 28. The hub 382 carries a second integral rock-arm 383 carrying at its upper end an anti-friction roller 384 operating in a groove cam 385 carried by the main cam-shaft 25. By this last described mechanism the fastener-member carrier is intermittently reciprocated upon its track for taking a fastener-member from the cut-off position to the station where it is clamped upon the tape or stringer.

Operating between press No. 1 and press No. 2 is an intermittently operating brush 386 designed to brush off any chips or scraps that might possibly pass from the punch mechanism of press No. 1 and interfere with the accuracy of subsequent operations upon the metal strip-blank. This brush 386 is carried on an angular bracket-arm 387 pivoted at 388 to plate 389 secured to the rod or bar 377. 390 is a tray or chute suitably secured at 391 to tray flange 7 and extending beneath the work and brush 386 to collect any chips and convey them from the machine. See Figures 1 and 1a on Sheet 1 of the drawings.

Returning to the consideration of the control of the gripper of the fastener-member-carrier it will be observed that track-bar 318 is formed with a longitudinal slot 392 in which operates a controlling lever 393 mounted upon a rock-shaft 394 which is journalled in and extends rearwardly through a part of the track-bar 318. At the rear end of this rock-shaft 394 a rock-arm 395 projects upwardly and carries an anti-friction roller 396 which is presented in operative relation to cam-block 397 which is carried by the cam 298 on cam-shaft 25 as above described, see Figure 2a (Sheet 3) and Figure 81 (Sheet 26) of the drawings. A coil spring 398 connects the rock-arm 395 to the bracket-arm 399 projecting from one of the bearing brackets 26, said spring 398 yieldingly holding the arm 395 in the path of the cam-block 397 and the lever 393 in the bottom of the groove 392. Lever 393 carries adjacent to its free end an adjustable stop 400 in the form of a screw bolt which engages the bottom of the groove, and also a second adjustable stop bolt 401 presented upwardly in position to engage the arm 365 of bell-crank lever 362. It will be observed that bell-crank lever 362 is arranged in the same vertical plane as the tripping lever 393 and that when the carriage is moved to its extreme left in position to present a fastener member to the tape or stringer, the arm 365 of bell-crank lever 362 will at that time be presented directly above adjustable stop 401 of the trip-lever 393, as shown in Figure 36, (Sheet 14) of the drawings. In this position, with proper relation to the tape or stringer mechanism and the fastener-member clamping devices, the cam-block 397 acts to raise trip lever 393 to open the member carrying gripper and release the member as it is fastened to the tape or stringer.

*Stringer forming mechanism*

Mechanism for folding a tape into a two-ply stringer having a four-ply thickened or beaded edge, (said closure stringer being covered by Patent No. 1,585,654 dated May 25, 1926), is arranged at the delivery end of the machine in front of and opposite the delivery position of the fastener-member-carrier. This mechanism will now be described with particular reference to Figures 6 (Sheet 5), 7 (Sheet 6), 38 (Sheet 15), 39, 39a, 39b, 39c, 40, 41, 42 (Sheet 16), 43, 44, 45, 46, 47, 48 (Sheet 17), 56 (Sheet 20) and 80 (Sheet 26).

The table or platform 5 is cut out at 402 to form a well in front of the track-bar 318 of the fastener-member-carrier. A heavy horizontal bed-plate 403 is rigidly secured by screw bolts 403a to the table or platform 5 in front of the cut-out well or opening 402. This bed-plate 403 is provided with flanges having under cut surfaces 404 constituting a guide track for the horizontal base portion 405 of a reciprocatory frame which carries the tape-forming, feeding and other associated mechanisms. This portion 405 of said frame is dovetail in cross section to operate within the guide surfaces 404, a shim or wearplate 406 being adjustably held between one of the guide surfaces 404 and the member 405 by means of screw bolts 407, Figure 56. This horizontal or base portion 405 of the frame has secured to it two rack bars 408 which are in constant mesh with gear wheels 409 fixed upon a shaft 410 journalled in the side brackets 411 attached to the bed-plate 403. The bracket 411 at one side is integral with a plate which extends rearwardly upon bed-plate 403 and terminates in the spaced guide arms 411a which embrace one of the oppositely projecting horizontal guideway members 484 hereinafter referred to. The shaft 410 is extended beyond the bearing at one end to receive a rock-arm 412 which is fixed to the shaft and is longitudinally slotted at 413 to receive the adjustable pivot bolt 414 carried in the forward end of a rod or pitman 415 extending rearwardly and pivotally connected at 416 to the upper end of a rock-arm 417 formed integrally with a hub 418 freely journalled upon a short shaft 419 carried in the brackets 420 secured to the table or platform 5. This hub member 418 also has formed integral with it a rearwardly projecting rock-arm 421 carrying in its end an anti-friction roller 422 operating in the box cam 423 carried by the main cam-shaft 25. This described mechanism causes the base frame 405 supporting the tape-folding and associated devices to be intermittently moved inwardly and outwardly toward and away from the fastener-member-carrier.

The bed-plate 403 has secured to its forward end a stop bar 403b which is centrally perforated for the free passage of a screw stop bolt 405a which projects forwardly from the reciprocatory frame base 405 and carries the adjustable stop and lock nuts 405b. By these means the reciprocations of the frame carrying the tape folding and associated devices can be adjusted.

The horizontal base portion 405 of the described frame has formed integral with it the upright side frames or standards 424 united by a heavy back web or plate 425, parts 405, 424, and 425 constituting a rigidly braced heavy frame for supporting the mechanisms which will now be described, see Figures 6, 39, and 56 of the drawings. This frame reciprocates upon the bed 403 above referred to.

As hereinafter more fully pointed out, the reriprocatory frame 405, 424, 425, has rigidly secured to it the oppositely projecting guideway members 484, which, in addition to their functions later to be pointed out, serve the important purpose of supporting said reciprocatory frame at its rear or inner corners. The guide member 484 nearest press No. 4 slides in the guide fingers 411a of the supporting bed 403, while the opposite guide member 484 is embraced by the heavy guide yoke 403x projecting from the supporting block 403y rigidly bolted to the table or platform 5 at the end of cut-out 402.

Mounted upon one of the standards 424 is an upright arm 426 supporting in its upper end a bolt 427 on which is journalled a spool or reel 428 upon which is wound a supply of suitable tape or webbing 429 from which the stringers or carriers of the flexible closures are made. The spool or reel 428 is engaged by a brake member 430 pressed against the spool or reel by spiral springs 431 confined upon the bolt 427.

The web or plate 425 is cut away or slotted at 425a and mounted upon the plate 425, beneath the slot 425a is a bracket plate 432 carrying a metal block 433 which is suitably shaped and cut away to receive the operating parts now to be described. Block 433 is surmounted by a vertically projecting U-shaped tape former 434 having perforated ears 435 through which attaching screws 436 pass to secure it in position on top of the block 433. This tape former leads to a vertical channel or opening 433a extending through the block 433. Cooperating with the U-shaped former 434 is a blade 437 which fits within the U-shaped member 434 and is of sufficiently reduced dimensions to provide a U-shaped guideway between members 434 and 437 through which the tape or web 429 is drawn and by which the tape is gradually formed into a two-ply stringer or carrier. This blade member 437 is pivotally mounted at 438 in the open throat of former 434 and is held in upright spaced relation to the U-shaped former by means of thumb screw 439 which passes through registering openings in the walls of members 434 and 437. By removing the thumb screw 439 the blade 437 can be moved outwardly on its pivot 438 into position to facilitate the ready insertion of the tape or web through the former 434.

Immediately below the lower end of the tape-forming blade 437 the once folded tape is engaged by cooperating male and female bead forming rollers, see Figure 39, Sheet 16 of the drawings. A pair of relatively small peripherally grooved rollers 440 and 441 are freely journalled in a forked triangular carrying frame 442 which is presented in tape-guiding channel 433a above referred to; said frame 442 being pivoted at 443 upon the inwardly presented ears or lugs 444 of a floating plate 445 which has secured to its outer face a U-shaped bracket 446 to which is pivoted at 447, a cam lever 448 having a heel 449. Rods or bolts 450 anchored in the block 433 project through openings in the ends of plate 445 which guides thereon, said rods supporting coil springs 451 confined by adjustable thumb nuts 452 threaded upon the rods or bolts. The plate 445 rests upon the edge of plate 453 which is secured to an inclined face or surface of block 433 adjacent to channel 433a. The heel 449 of the cam lever 448 is designed to engage an inclined wearplate 453 and by its action move the plate 445 carrying member 442 and rollers 440 and 441 outwardly away from the opposite cooperating fixed roller 454 journalled at 455 in a slot or recess formed in the block 433. The frame 442 carrying the peripherally grooved rollers 440 and 441 presents these rollers on the inside of the fold of the tape or web as it passes below the former 434, 437. The roller 454 has a sharp convex periphery which engages the outer face of an apex of the fold of the tape or web just opposite the first roller 440 and reverses the crown of the fold into the V-shaped periphery of roller 440 having the effect of producing a double or M-shaped fold, which is continued and creased in this form by the cooperation of the lower roller 441.

Immediately below the folding rollers 440, 441, and 454 the once folded tape, having the thickened or twice folded beaded edge, passes into the grip or bite of two oppositely arranged cooperating pressure rollers 456, each of which is freely journalled between the ears 457 of a sliding block 458 operating in a transverse channel 459 of block 460 which is secured beneath the block 423 by means of screw bolts 461. This block 460 has a guide slot 460a extending through it and forming an extension of the guideway 433a of block 433, the rollers 456 being arranged to engage the folded and beaded tape or web in line with said guideway. The outer ends of block 458 are recessed at 462 to fit over and guide upon plates 463 which are secured to blocks 433 and 460 and extend across the channel 459. A centrally perforated plate 464 is secured to the outer end of block 458 outside of the guide plate 463, a guide rod 465 being seated in the plate 463 and extended through the central opening of plate 464 and supporting the coil spring 466 which is engaged by a thumb nut 467 threaded on the outer end of guide rod 465. This arrangement is duplicated on both sides of the channel or passageway for the folded tape or web, the springs 466 pressing the rollers 456 tightly together upon the folded tape or web and effectively compressing the four-ply twice folded beaded or thickened edge of the tape or web.

The roller carrying blocks 458 are also formed with transverse grooves 468 in their upper faces. In the vertical plane of these grooves 468, the block 433 is provided with cylindrical sockets 469 in which are journalled the cylindrical heads 470 having upon their outer ends the operating levers 471 and upon their inner ends the eccentric lugs or pins 472 which engage in the transverse grooves 468 of blocks 458. These heads 470 are formed with annular grooves 473 in which engage the reduced inner ends of screw bolts 474 threaded in suitable openings in the block 433. These screw bolts 474 lock the rotary heads 470 in place while permitting them to rotate. It will be understood that by actuating the hand levers 471 the blocks 458 can be moved outwardly to separate the rollers 456. A half revolution of the heads 470 will place the eccentric lugs or pins 472 in position to hold the rollers in separated released position against the action of their springs.

475 and 476 are cooperating downwardly extending tape-guiding plates formed with ribbed inner faces to prevent backward movement of the folded tape. In addition to the transverse ribs or downwardly inclining teeth, plates 475 and 476 are vertically grooved or channelled on their inner faces adjacent the front edge to accommodate the four-ply beaded or thickened edge of the folded tape or web as shown in Figures 40 and 42. These plates 475 and 476 are formed integral with horizontal slotted ears 477 through which extend machine screws 478 which are threaded into the bottom of block 460. These plates 475 and 476 are slidably mounted in the manner described and are engaged by pressure springs 479 encircling screw rods 480 mounted in the plates 475 and 476 and passing freely through flanges 481 of bracket members 482 secured to the bottom of block 460 and assisting in guiding the ears 477 of plates 475 and 476. The screw rods 480 are engaged outside of flanges 481 by threaded nuts which can be adjusted to limit the approach of plates 475 and 476 together upon the folded tape or web and therefore limit the pressure of said plates upon the tape or web.

The lower ends of plates 475 and 476 are cut back or reduced in thickness as shown at 483 in Figure 38 of the drawings to receive the ends of the plungers carrying the clenching devices which compress the yokes of the fastener-members upon the beaded or thickened edge of the tape or web.

*Mechanism for mounting fastener-members upon the beaded folded tapes or stringers*

Upon each side of the path of the folded tape or web is mounted a horizontal guideway member 484 in which operates a reciprocating plunger 485, engaged at the rear by coil spring 486 confined by a plate 487 secured to the guideway 484. Each of the plungers 485 is formed on its inner end with three spaced lugs 488, the two plungers being designed to fit over and engage the yoke ends of attached spaced fastening-members.

Each plunger 485 also carries an inner auxiliary plunger indicated at 489 which carries at its inner end a clenching blade or tool 490. This auxiliary plunger 489 carrying the clenching tool 490, operates in a guideway 491 of the main plunger body 485 and upon the opposite side of the plunger 485 is a corresponding slot or guideway 492 in which operates a guide block 493 connected with the auxiliary plunger 489 by means of a screw bolt 494 which supports between auxiliary plunger 489 and guide block 493 an antifriction roller 495, see Figures 52 and 53, Sheet 19 of the drawings. This roller 495 is presented in the same vertical plane as the central longitudinal guideway or slot 496 of the main plunger 485.

The rear end of each plunger 485 is covered by a rectangular plate 497 secured by means of a screw bolt 498 passing through the plate 497 and an integral web portion of the plunger 485, the bolt being secured by a nut 499 on its inner end. This plate 497 affords a proper seat for the engagement of spring 486 above referred to.

The opposite guideways 484 are rigidly secured to the back face of the vertical web or plate 425 by means of screw bolts 500. Centrally between these bolts 500 is a headed bolt 501 threaded through the web 425 and secured by a nut 502, this bolt 501 being supported with its head in rear of the lower cut away portions of the tape engaging plates 475 and 476 and acting as an anvil or back support for said plates during the operation of clenching fastener-members upon the exposed beaded or thickened edge of the folded tape or web. 503 are face plates secured to the guide blocks 484 and holding in place therein the plungers 485.

Cam-bars 504 extend vertically through the guide slots 496 of plungers 485 and through the vertical guideways 505 of guides 484, said cam-bars 504 being formed near their upper ends with cam-slots 506 which embrace and operate upon the anti-friction rollers 495 of auxiliary plungers 489, for actuating the main plungers 485 and auxiliary plungers 489.

The guideway members 484 are rigidly mounted upon the base of the web or plate 425 between two bars 507 and 508 set in grooves in the plate 425 and secured by means of machine screws 509.

The lower ends of the tape-guiding members 475, 476 are of the same depth from front to rear as the main portion of these guides, the longitudinal cut-out at 510 being deeper to receive the fastener-members which are clamped upon the beaded edge of the tape or web within the cut-out portion of said guides 475, 476.

Arranged below the lower ends of members 475, 476 are two closely aligned guide plates 511 formed with deep longitudinal guide grooves 512 in which the prongs of the fastener-members project and thin spaced flanges 513 which engage the narrow neck portions of the fastener-member as the fastener-members clamped upon the folded tape or stringer pass downwardly. These guide plates 511 are supported at their upper ends upon the lower ends of members 475 and 476 by means of machine screws 514 and are connected at their lower ends by a bridge plate 515 which maintains them in proper parallel relation. A U-shaped plate 516 is connected to the inner ends of guideways 484 and overlaps the face plates 503 and the connecting overlapping upper ends of guide plates 511, said plate 516 thereby firmly connecting and bracing these parts of the structure.

*Tape-feeding mechanism*

The tape or web is drawn through the folding and fastener-member applying devices by a step-by-step feeding mechanism which engages the folded beaded tape immediately below the point of application of the fastener-members and directly in rear of the guide plates 511 which engage and guide the series of fastening-members that have been clamped upon the beaded edge of the folded tape. This feeding mechanism includes cooperating gripper-members operated by the vertically reciprocating cam-bars 504 above referred to.

The cooperating gripper bars are clearly shown at 516a in Figures 38 (Sheet 15), 39, 39a, 41 (Sheet 16), 49, 50 (Sheet 18), 51 (Sheet 19), and 54 (Sheet 20) of the drawings. Each gripper-member 516a is formed with an inner transversely grooved gripper face 517 and a vertical recess or cut-out 518 to accommodate the fastener-members upon the beaded edge of the tape. The longitudinal slots 519 in bars 516a permit the passage of the cam-bars 504, each of said slots housing an anti-friction roller 520 freely journalled upon a transverse bolt or pin 521 and said anti-friction roller 520 being also seated in a cam slot 522 of a cam-bar 504. A stud 523 projects from the outer end of each gripper bar 516a in engagement with the slotted upper end 524 of a lever 525 which is formed with an inwardly turned fulcrum nose 526 resting in engagement with the block 527. There are two of these levers 525, one on each side of the gripper mechanism and they are connected by a heavy coil contractile spring 528 acting through headed rods 529 passing through openings in levers 525 and one of said rods being provided with screw nuts 530a engaging the threaded ends of said rod whereby the tension of spring 528 can be adjusted.

Each of the cam-bars 504 is enclosed for a part of its length including the slot 519 by a bearing block 530 shown particularly in Figures 38, 39, 41, and 55. The bearing block 530 is confined upon the cam-bar 504 by means of plates 531 secured to the opposite faces of bearing block 530 by means of machine screws 532 and having integral inturned flanges 533 which extend over the upper corners of one of the gripper bars 516a and confine said gripper bar upon the upper edges of bearing block 530. From this construction it will be understood that the cam-bar 504 will slide freely through the bearing block 530 within the limits of the engagement of the ends of slot 522 with the anti-friction roller 520, the gripper bar 516a moving transversely with reference to cam-bar 504 when this relative movement takes place. The two bearings blocks 530 are connected in proper spaced relation by means of a bridging bracket 534 secured by means of screw bolts 535. These bearing blocks 530 are shaped on the outer vertical edges to fit groove trackways 536 formed on the inner faces of plates 527 rigidly secured to the depending side flanges 538 of the movable frame of tape former. A stop plate 539 is secured to the plate 527 and formed with a forwardly presented recessed end having spaced stop lugs 540 between which operates a stop lug 541 carried by bracket 542 secured to the bridge piece 534 above referred to, see Figures 6 and 7 of the drawings. The lower stop lug 540 at each side has threaded through it an adjustable stop screw 543 for determining the lower limit of the movement of bridging piece 534 and the parts connected therewith.

544 is a block rigidly mounted in the recessed face of plate 527. This block 544 has pivotally mounted at 545 a latching dog 546 having a laterally presented notch 547 at its upper end engaged by a leaf spring 548 secure to the block 544; said block 544 also carries a keeper dog 549 pivoted at 550 opposite the latching dog 546, and engaged by a leaf spring 551 attached to block 544. This latch block 544 is grooved or recessed to receive dogs 546 and 549 and to permit them to operate. Each of the gripper bars 516a is provided on its upper face near its outer end with a rigidly attached strip 552 which projects toward the rear to form a stud designed to be engaged by the latching dog 546 and the keeper dog 549. It will be understood that a latching device such as described is provided at each side, one for each of the gripper bars 516a. The purpose of these latching devices is to hold the gripper bars against vertical displacement while the cam-bars 504 are moving vertically through the gripper bars so as to ensure the movement of the gripper bars either inwardly into gripping position with the folded tape or outwardly to release their grip upon the tape, it being essential in initiating either of these movements that the engagement or disengagement of the grippers must be effected before the grippers are moved vertically.

The lower end of each cam-bar 504 has attached to it a connecting yoke 553 which is pivotally connected at 554 with a pitman 555 adjustably connected at its lower end with a yoke 556 journalled upon the reduced end 557 of a short axle 558 which is carried in the notch or recess 559 adjacent to the upper end of a vertically sliding bar 560. A thumb screw 561 is threaded through the bar 560 into the axle 558 for retaining it rigidly in place. The open end of recess 559 is normally closed by a spring pressed gate 562. In this way the axle 558 is rigidly mounted upon the bar 560. There are two pitmen 555, one projecting downwardly from each of the cam-bars 504 and these pitmen are journalled upon the opposite reduced ends of the short axle 558. The bar 560 reciprocates freely in the vertical guideway 563 of arm 564 having a hub 565 which is rigidly mounted upon a fixed shaft-like support 566 mounted horizontally in the bracket-bearings 567 and 568. Freely journalled upon the dead shaft 566 adjacent to the guide arm 564 is a rotary tubular shaft 569 upon which is secured box cam 570 engaging an anti-friction roller 571 journalled on stud 572 projecting from the face of the vertically reciprocating bar 560. Rotary tubular shaft 569 also carries a driving sprocket wheel 573 over which operates a sprocket chain 574 extending from and driven by a sprocket 575 fixed to the inner face of a large gear wheel 576 which is freely journalled upon the end of the main cam-shaft 25 alongside of one of the bearings 26. This large gear wheel 576 carries one of a pair of clutch members for locking the gear to the cam-shaft when it is desired to rotate the cam-shaft; said gear 576 being, however, normally free to rotate on the cam-shaft and form an element of the drive from the power shaft to the feed mechanism for the tape-folding and feeding and associated devices. This large gear 576 meshes with and is driven by a smaller gear 577 freely journalled upon a stub shaft 578 secured to the machine frame by the bracket plate 579 and braced at its outer end by the bracket 580. The small gear 577 is firmly secured to and rotates with a large combined fly-wheel and driving sprocket 581, also journalled upon stub shaft 578, which in the form shown has a circle of sprocket teeth set centrally in its periphery over which operates a sprocket chain 582 which operates around and is driven by a sprocket wheel 583 mounted upon a shaft 584 suitably journalled in bracket-bearings 585 and 586. This shaft 584 carries at its inner end a gear wheel 587 meshing with and driven by a smaller gear wheel 588 keyed to the main power shaft 204 above referred to.

Operation of cam-bars upon the fastener-mounting plungers and the tape-feed grippers A comparison of Figures 38, 49, 50, and 51, illustrating the slotted cam-bars and mechanism actuated by them in various positions, will lead to a clear understanding of this part of the machine.

It will be observed from the illustrations in the figures of the drawings mentioned, that the cam slots 506 which operate the fastener-member applying plungers are so arranged in the cam-bars 504 that the upward movement of the cam-bars causes the plungers 485 and 489 to move inwardly for performing their functions and the downward movement of the cam-bars withdraws these plungers into their inactive position. The cam slots 522, lower down upon the cam-bars 504, are arranged in exactly the reverse positions so that the initial upward movement of the cam-bars moves the gripper bars 516a outwardly into released position to permit the raising of the gripper bars upon the tapes or stringers for a new grip, while the initial downward movement of the cam-bars moves the gripper bars inwardly to grip the folded tape or stringer preparatory to feeding it a step downwardly.

In Figure 49 the cam-bars 504 are shown on their upward move, the feed gripping bars 516a having been drawn apart to release the tape and the fastener-member mounting plungers 485, 489 being partly moved inwardly, the reciprocating frame which supports the tape folding and associated members being at the moment moving toward its inner position to place the beaded edge of the folded tape in the open jaws of the fastener-member that is held by the carrier gripper 339, 341 to receive the tape, as shown in Figure 52, Sheet 19 of the drawings. In Figure 50 the upward movement of the cam-bars is being completed, the fastener-member being in the act of being clenched by the plungers 489. The completion of the clenching operation upon a fastener-member is shown in Figure 53, Sheet 19 of the drawings. It will be noted that in Figure 49 the projecting ends of the strips 552 of gripper bars 516a have moved out of engagement with the latching dogs 546 and have pressed back the keeper dogs 549 so that the gripper bars 516a can move upwardly with cam-bars 504 as they have started to do in the position shown in Figure 50. In Figure 51 the cam-bars 504 have started to move downwardly, the fastener-member applying plungers 485, 489 having been partly withdrawn and moved outwardly, while the gripper bars 516a have started to move inwardly to grip the folded tape. In Figure 38 the change of position of the parts is shown complete in that the plungers 485, 489 are completely moved outwardly and the gripper bars 516a are in their inner position gripped upon the tape and latched to the carrier frame in which the cam-bars are mounted by reason of the strip members 552 having moved into engagement with the latching dogs 546. In this position the cam-bars 504 are moved down to a complete feeding stroke, the grippers 516a carrying the folded beaded tape with an applied fastener-member one step downwardly to present a new beaded section of the tape in the proper horizontal plane for receiving the next succeeding fastener-member. As this tape feeding operation is completed the frame or carriage which supports the tape mechanism and associated devices is moved forwardly away from the path of the fastener-member-carrier which is immediately afterward returned to the member cutting-off position for gripping another fastener-member.

Stringer cut-off mechanism

The tape or stringer with fastening-members clamped to its beaded or thickened edge passes from the intermittent feed mechanism into a rectangular funnel shaped guide 589, the throat of which is contracted into a rectangular guide tube 590 which terminates just above a pair of cut-off shears which will now be described with particular reference to Figures 6 and 7 (Sheets 5 and 6 respectively), and 57 and 58 (Sheet 21) of the drawings. The shears proper comprise two cutter-blades 591, 592 pivotally mounted upon a bolt 593 which extends downwardly through a bracket plate 594 which is supported upon a machine end frame beneath the table 5. A spacing collar 595 is mounted upon the bolt 593 between the bracket plate 594 and the cutter blades 591 and 592, the blades being supported thereon by means of a nut 596 threaded upon the reduced end of bolt 593. The headed end of bolt 593 confines a coil expansion spring 597 against bracket 594 for yieldingly pressing cutter blades 591 and 592 together. The guide funnel 589 with tubular extension 590 is supported by bracket plate 598 secured to the plate 594 by set screw 599. The cutter blades 591 and 592 have outwardly extending bell-crank arm 600 to which are pivotally connected the links 601 in turn pivoted at 602 to the yoke 603 mounted upon a reduced end 604 of a solenoid core or bar 605, said reduced end having sliding bearing in a bushing 606 carried by bearing block 607 depending from the bracket plate 594. A spiral expansion spring 608 also surrounds the reduced portion 604 of the core or bar 605 and is confined thereon against the bearing block 607 by means of a head or disk 609 secured to the end of bar 604. This disk or head 609 engages the rounded heels 610 of the cutters 591, 592. A cushioning washer 611 is mounted upon reduced end 604 between yoke 603 and bearing block 607. A solenoid magnet 612 is mounted in a suitable frame 613 of which bracket arms 614 are secured to the under surface of plate 594. This magnet 612 has a central cylindrical chamber 615 in which is mounted a fixed core 616 toward and away from which reciprocates the movable core 605. The fixed core 616 serves as a stop for the inward movement of the movable core 605 when it performs the cutting operation. The circuit through solenoid 612 is controlled through the terminals 617 (shown in Figure 83, Sheet 27 of the drawings), by the automatic initiative control mechanism hereinafter described, it being understood that in the operation of the machine it is intended to feed the folded beaded tape for a required length and apply a predetermined number of fastener-members thereon and follow these measured operations by the action of the cut-off shears which sever the completed stringers in the desired lengths. As the lengths of stringers are severed by the shears they drop into an inclined chute 618 mounted upon the bracket-arm 619 and extended to one side to deliver the completed stringers into a convenient receptacle.

Cam-shaft driving mechanism

Referring to Figures 3 and 4 (Sheet 4) and 68, 69, and 70 (Sheet 24) of the drawings, it will be observed that the gear 576 is formed in its outer face with a shallow cylindrical recess 620 in which is seated a hardened metal disk 621 secured by screws 622, said disk being formed with an axial opening 623 in which engages the heavy dog 624 secured by screws 625 to a collar 626 which slides upon a squared portion 627 of the cam-shaft 25. When collar 626 is in its inner position against disk 621 as shown in Figures 4 (Sheet 4) and 68, (Sheet 24) of the drawings, the gear 576 is clutched upon the cam-shaft for driving it. The outer end of cam-shaft 25 carries a stout coil-spring 628 confined against the collar 626 by the collar 629 fastened to the shaft by screw 630. The action of the spring 628 is to move the dog 624 into clutching engagement and hold it in this operative position until it is positively disengaged by the clutch controlling devices which will now be described.

Pivotally mounted at 631 upon a part of the bracket plate 580 is a clutch controlling lever 632 having a bevelled blade 633 which when moved inwardly toward the shaft 25 will be presented in the path of the inclined cam face 634 formed in the dog supporting collar 626. When lever 632 engages collar 626 while the shaft 25 and gear 576 are rotating in clutched condition, the collar 626 will be forced outwardly against the action of spring 628 and thereby release the cam-shaft while the gear 576 continues to rotate.

The clutch operating lever 632 is formed with a bell-crank arm 635 to which is pivoted at 636 a link 637 pivoted at 638 to a head 639 secured to the upper end of a vertically movable controlling rod 640 which extends downwardly and terminates as a movable core in a solenoid magnet 641 mounted in the frame 642 suitably secured to bracket plate 643 extending from the base frame of the machine. This controlling rod 640 passes through a perforated bracket arm 644 projecting from and secured to the bracket 580 of the machine frame. An expansion coil spring 645 is confined upon rod 640 between the bracket 644 and the head 639 to give a spring tendency to throw the clutch controlling lever 632 upwardly and hold it in that position with the clutch disengaged. This rod 640 is moved downwardly against the action of spring 645 when it is desired to cause the clutch dog 624 to move inwardly into clutched position.

The rod 640 can be moved either automatically by an electric control acting through the solenoid 641 (see control circuit Figure 83, Sheet 27 of the drawings), in the manner that will be hereinafter explained, or mechanically through the hand operated lever 646, secured to a rod or shaft 647 which is journalled in the machine frame and carries upon its outer end a rock-arm 648 having a loose joint pivotal connection 649 at its end with a block 650 adjustably secured to the rod 640. By moving the hand lever 646 rod 640 can be pulled downwardly to permit the clutch 623, 624 to move into action for causing the rotation of the cam-shaft 25.

In the electrical automatic operation of the clutch (see Figures 3 and 4, Sheet 4, and Figure 83, Sheet 27 of the drawings), an auxiliary electromagnet 651 mounted upon a bracket plate 652 extending from the solenoid frame 642 acts upon a keeper plate 653 of a hook lever 654 pivoted in the bracket 655 in position to normally engage a tappet block 656 which is adjustably mounted upon the controlling rod 640. The face of tappet block presented toward the hook lever 654 is bevelled slightly to freely pass the hook end of the lever when it is moved downwardly from its upper position. In this construction it will be understood that when an electric impulse is passed through the solenoid magnet 641 through the automatic initiative control hereinafter explained, the rod 640 will be drawn downwardly, permitting the clutch on the cam-shaft to move into clutched position, and the tappet 656 will move down past the hook lever 654 and be engaged thereby to latch the clutch controlling rod 640 in its lower position. It should be mentioned that the hook lever 654 is provided with a heel 654a carrying a leaf spring 654b which engages the bracket plate 652 to give the lever 654 a spring tendency away from the magnet 651 toward the tappet block 656 with which it latches.

The machine is preferably driven by an electric motor indicated at 657 firmly secured to the base of the machine frame, see Figures 1 and 83 (Sheets 1 and 27 respectively) of the drawings. The motor-shaft 658 is aligned with the main power shaft 204 above referred to, the adjacent ends of these shafts carrying the driving and driven clutch members 659, 660 of any approved construction. The details of this main clutch are not illustrated in the drawings, but a sliding clutch actuating collar 661 is shown upon shaft 204 connected through arm 662 with the driven or movable clutch member 660. Collar 661 is operated by rock-arm 663 extending up from the rock-shaft 664 journalled in bearing brackets 665 and carrying at its opposite end a long manually operated clutch-operating lever 666 which is placed in convenient position for the operator.

*Automatic initiative controlling mechanism*

In addition to the electromagnetic operation of the cut-off shears and the clutch of the cam-shaft through electromagnets 612, 641, and 651, there is an electrically operated counter mechanism 726, Figure 83 (Sheet 27) of the drawings, which determines the number of completed articles produced by the machine and, upon the arrival of the predetermined quantity, shuts off the operation of the machine preferably by throwing out the main circuit switch. This counter mechanism may be of any approved form, but is preferably of the construction set forth in Patent No. 1,685,481 dated September 25, 1928. The operation of this counter-mechanism is by electrical impulses, imparted through a suitable current reducing relay initiated by one of a plurality of controlling switches which are automatically actuated by the operation of the machine.

Mounted on the bracket 667 secured to the upright angle bar 668 of the machine frame is an insulated plate 669 formed in its inner face with a shallow longitudinal groove or channel 670. Embedded in the bottom of this channel 670 are four contact members 671, 672, 673, and 674, (or more if desired for additional controls) which are connected respectively through suitable insulated wires and current reducing relays 671a, 672a, 673a, 674a with the clutch-solenoid 641, clutch electromagnet 651, the shear solenoid 612 and the operating magnet 727 of the mechanical counter 726, see Figure 83, Sheet 27 of the drawings. Hinged at 675 to the insulated plate 669 is an insulated cover plate 676 carrying on its outer face the bracket 677 in which is mounted a pivot shaft 678 supporting the spaced electrically connected contact levers 679 which are formed with inwardly presented noses 680 which project through elongated slots 681 in vertical alignment respectively with the several contacts 671 to 674. Leaf springs 682 are secured to the block 676 and engage the heels of contact levers 679, one spring being for each lever. A latch 676a pivoted upon upright 668 engages cover plate 676 and holds it closed. When it is desired to swing the plate 676 into open position, latch 676a is moved back against stop screw 676b, see Figures 1 (Sheet 1) and 60 (Sheet 22) of the drawings. The circuit wire 683 connects with one of the levers 679 and through the supporting pivot 678 electrically connects the whole series of contact levers, with the four relays 671a, 672a, 673a and 674a, as shown in Figure 83, Sheet 27 of the drawings.

The circuit wires from the several contacts 671 to 674 and from the contact levers 679 are formed into a cable indicated at 684 which passes to a convenient part of the machine frame where it enters a box 685 designed to support the proper relays of well-known construction from which wires lead through the several controlling magnets above referred to.

Passing down through the shallow channel 670 of the insulated plate 669 and beneath cover plate 676 is an endless band 686 of suitable insulating material which normally separates the noses of levers 679 from the contacts 671 and 674. This band 686 may conveniently assume the form of a ribbon or web of fireproof and insulating material such as used for a film in a moving picture machine in which case the band has a series of accurately spaced sprocket perforations 687 operating over the sprocket pins 688 of the spools 689 freely journalled upon pins 690, one spool 689 being mounted above and another spool 689 being mounted below the insulated plate 669 and 676 between which the controlling film 686 passes. The band 686 being endless passes from the lower spool 689 up over a guide spool 691 journalled on a pin 692 which is adjustably mounted in the vertical slot 693 of the upright angle bar 668, said journal pin being secured in the desired adjusted position by means of a thumb nut 694 threaded upon the inner end of pin 692. The endless band 686 passes from the spool 691 down around the first named sprocket spool 689, the band being also engaged, between spools 691 and 689, by a flanged tightener spool 695 mounted upon a pin 696 carried in the end of an arm 697 pivoted at 698 in the upright angle bar 668 and formed with a transverse slot 699 which receives a bolt 700 upon which is threaded a thumb nut 701,—the bolt passing through an opening in upright 668 and the slot in the tightener arm 697.

This endless controlling band 686 is formed at proper predetermined intervals with slits or openings indicated at 702, 703, 704 and 705 which it will be observed are respectively in the same longitudinal zones as the contacts 671, etc., so that, upon the arrival of a perforation in the band between a contact and a contact lever, an electric impulse will be sent through the circuit thus closed for effecting the desired action depending upon the magnet circuit affected. Bearing in mind that these contacts 671 to 674 lead to the several controlling magnets, it will be understood that the arrangement of the controlling perforations 702 to 705 in the controlling band will depend upon the result desired. This will be more fully explained in connection with the description of the operation of the machine, but in passing it may be noted that closing the circuit through contact 671 throws in the clutch upon the cam-shaft 25 to cause the cam-shaft to rotate, with the result that fastener-members are produced by the presses Nos. 1, 2, 3, and 4 and passed to the point of attaching them to the beaded edge of the tape or stringer; an electric impulse through contact 672 releases the latch lever 654 to throw out the clutch on the cam-shaft with the result that the cam-shaft will stop rotating and no more fastener-members will be made until it is again started, during which period of idleness of the cam-shaft, the rest of the machine will continue to operate with the result that an excess or blank part of the folded tape or stringer will be produced after the completion of the mounting of a group or series of fastener-members; and when an electric impulse is passed through contact 673 the cut-off shears will be operated for severing the web a spaced length after the completion of a group of fastener-members; while the final contact 674 sends an impulse to the magnet 727 of the mechanical counter at the completion of each stringer, so that said counter will be able to ultimately stop the complete machine by throwing out the main circuit switch when the required number of stringers of the desired length and number of fastener-members has been delivered.

In the plan of operation of the machine shown diagrammatically in Figure 83 (Sheet 27) of the drawings, the mechanical counter 726 closes the electric controlling circuit at 728 which energizes magnet 729 which pulls open the main circuit switch 730 which cuts off the current to the motor 657 through rheostat 731 and thereby stops the machine. As the current is cut off from rheostat 731 the deenergizing of the magnet 732 of the rheostat releases the rheostat arm 733 to permit its usual spring (not shown) to move it to neutral position, where it engages contact lever 734 and breaks the control circuit in which are included the electromagnets and the relays hereinbefore referred to.

It will be understood that the controlling insulated endless band 686 must be driven in a step-by-step manner, one step for each revolution of the machine. This is accomplished by providing the lower sprocket spool 689 with a sleeve 706 carrying a ratchet wheel 707 which is normally engaged by a retaining spring-pressed dog or pawl 708 pivoted to upright 668 upon stud 709. This ratchet wheel 707 is also engaged and driven by a pawl or dog 710 pivoted at 711 to a reciprocating bar 712 mounted upon a plate 713 surmounting a bracket 714 of the machine frame. This bar 712 is confined by the guide brackets 715 and 716 secured to the plate 713 in spaced relation to permit the projection laterally from both sides of bar 712 of a rod 717, which rod is engaged at its ends by coil springs 718 attached to the sides of bracket 715. The springs 718 yieldingly hold the pawl-carrying bar 712 toward the left or away from the ratchet wheel 707, said bar 712 having a bifurcated end 719 in which is freely journalled an anti-friction roller 720 supported in the path of a cam member 721 fastened to the periphery of the rotary sleeve 569 so that once for each revolution of the sleeve the bar 712 carrying pawl 710 will receive an impulse and move the endless band 686 upon the sprocket spools 689 one step, which, as a matter of preference, is the distance between two fastening-members on the beaded tape. The pawl or dog 710 is yieldingly held in engagement with the ratchet wheel 707 by means of a leaf spring 722 fastened to the bracket guide 716. As shown in Figures 2a (Sheet 3), 3 (Sheet 4) and 61 (Sheet 23) of the drawings, a latching bar 723 having notch 724 is pivoted at 725 to upright frame piece 668 in position to engage rod 717 and hold bar 712 in its retracted position when it is desired to arrest the operation of the automatic initiative control.

In several of the figures of the drawings showing the flexible web or stringer the same has been indicated by the reference numeral 429 whatever stage the webbing may be in and the completed fastener-members after being cut from the continuous strip are indicated by the reference numeral 43x, whether said members are in the grippers of the carrier or are clamped in final position upon the beaded edge of the tape or stringer 429.

The machine has been designed to produce stringers for flexible closures having the essential features of patents hereinbefore referred to, but it should be understood that many features of the improved automatic machine may be employed for producing other forms of stringers for flexible closures.

General operation

The operation of the various mechanisms combined in the improved machine to produce the desired results have been individually explained in connection with the foregoing structural description so that a brief reference only will be made to the general operation of the machine.

It will be clear from the foregoing description that the several presses operate successively upon a continuous metal strip-blank which is fed in a step-by-step manner, one step of the width of a fastener-member for each revolution of the machine.

While the successive presses are acting upon the metal blank to produce fastener-members of the form above described, the tape-forming mechanism is at the same time acting upon a continuous web of tape which is doubled into two-ply and formed at its folded longitudinal edge with a four-ply beaded or thickened portion.

When the feed of the metal strip-blank is taking place by the action of press No. 1, assisted by the auxiliary feed as has been explained, all the other presses are raised and out of contact with the work.

Immediately following the feed of the strip-blank by press No. 1 and the auxiliary feed, press No. 2 comes into action, does its work, and remains in engagement with the work until after press No. 1 has released its hold upon the work and returned to its initial position. Press No. 2 and the preliminary clamp and guiding rolls cooperate in holding the strip-blank against movement while the press No. 1 releases the strip and returns to its initial position preparatory to another feeding stroke. The clamp is normally in engagement with the metal strip-blank and is disengaged therefrom only while press No. 1 is feeding the blank.

Completed metal fastener-members are taken from press No. 4 and moved over to position to be clamped upon the beaded edge of the formed tape or stringer. The fastener-member-carrier returns to take a fastener-member just as the feed of the metal strip-blank is completed, and just prior to said carrier reaching its position to receive a new member, press No. 4 starts to operate; its first operation being to cause its pilot member to engage a perforation of the metal strip to accurately position the fastener-member that is to be cut off, then to actuate the gripper of the carrier to cause it to grab and firmly hold the projected fastener-member, and finally to cut off the grabbed fastener-member and cause the release of the auxiliary feed from the metal strip. These last two actions of cut-off and releasing the auxiliary feed take place about the same time.

The carrier with the gripped fastener-member moves away from press No. 4 into position for clamping the member upon the tape, and when it reaches this position in the vertical transverse plane of the beaded tape, the carriage which supports the tape folding mechanism is given a quick movement toward the fastener-member which is rigidly supported by the gripper with its open yoke presented forwardly. This movement carries the beaded edge of the folded tape into the open yoke of the fastener-member and, as the movement is completed, the clencher bars clamp the yoke of the fastener-member upon the beaded edge of the tape or stringer.

These operations are repeated once for each revolution of the machine, the successive fastener-members being properly spaced upon the beaded tape or stringer by the mechanism described including the step-by-step feed mechanism. The required number of fastener-members having been applied to the tape or stringer, the mechanism for forming the fastener-members is thrown out of action by the initiative automatic control above described acting to throw out the clutch upon the cam-shaft,—the feed of the tape continuing while the production and mounting of the fastener-members is discontinued,— there will be a blank portion of tape succeeding a group of fastener-members. When this blank part of the tape is of the desired predetermined length, the cam-shaft is again automatically thrown into action to continue production and mounting of the fastener-members, this resumption of operation of the cam-shaft being effective through the initiative control in the manner already explained. Following the continued mounting of fastener-members upon the tape the tape cut-off is actuated at the proper moment to sever a blank portion of tape midway between two groups of fastener-members and a severed complete stringer is discharged by the chute 618. This production of stringers that are uniform in length, number of fastener-members and their blank ends is continued automatically by the machine until, as above explained with reference to Figure 83 (Sheet 27) of the drawings, the mechanical counter 726 has recorded the required number of completed stringers when, through the electrical controls explained, it will automatically shut off the operation of the machine.

We claim:—

1. In a machine for making separable fastener stringers, the combination with means for forming a beaded carrier or stringer, of means associated therewith for clamping fastener-members thereon.

2. In a machine for making separable fastener stringers, the combination with means for forming a two-ply beaded carrier or stringer, of means associated therewith for clamping fastener-members thereon.

3. In a machine for making separable fastener stringers, the combination with means for forming a continuous beaded carrier or stringer, of means associated therewith for clamping fastener-members thereon.

4. In a machine for making separable fastener stringers, the combination with means for forming a continuous beaded carrier or stringer, of means associated therewith for intermittently clamping fastener-members thereon, and means also associated therewith for severing sections of the stringer.

5. In a machine for making separable fastener stringers, the combination with means for forming a continuous beaded carrier or stringer, and means for intermittently feeding said carrier or stringer, of means associated with said forming and feeding means for intermittently clamping fastener-members thereon.

6. In a machine for making separable fastener stringers, the combination with means for forming a beaded carrier or stringer, of means associated with said carrier forming and fastener member forming means for forming fastener-members, and means for clamping fastener-members upon the beaded carrier or stringer.

7. In a machine for making separable fastener stringers, the combination with means for supporting a carrier or stringer, of means for forming an integrally connected series of partially finished fastener-members including means for forming separate mounting yokes extending transversely of the series, means for feeding said fastener-members, means for separating from the series and completing individual fastener-members, means for supporting completed individual fastener-members, and means for clamping fastener-members upon said carrier or stringer.

8. In a machine for making separable fastener stringers, the combination with means for forming a beaded carrier or stringer, and means for feeding said carrier or stringer, of means associated with said carrier forming and feeding means for forming a connected series of partially finished fastener-members, means for separating from the series and completing individual fastener-members, and means for clamping fastener-members upon the beaded carrier or stringer.

9. In a machine for making separable fastener stringers, the combination with means for forming a beaded carrier or stringer, and means for feeding said carrier or stringer, of means associated with said carrier forming and feeding means for forming a connected series of fastener-members, means for severing individual members from said connected series, and means for clamping fastener-members upon the beaded carrier or stringer.

10. In a machine for making separable fastener stringers, the combination with means for forming a beaded carrier or stringer, of means associated therewith for forming a connected series of fastener-members having oppositely presented fastening hooks and U-shaped mounting yokes, means for severing individual members from the connected series, and means for clamping the U-shaped yokes of fastener-members upon the beaded carrier or stringer.

11. In a machine for making separable fastener stringers, the combination of means for folding a ribbon of flexible material into a two-ply carrier or stringer having a thickened folded edge, with means for clamping individual interlocking elements at uniform intervals upon the thickened folded edge.

12. In a machine for making separable fastener stringers, the combination of means for folding a ribbon of flexible material into a two-ply carrier or stringer having a thickened folded edge, with means for forming individual interlocking elements, and means for clamping the individual interlocking elements at uniform intervals upon the thickened folded edge.

13. In a machine for making separable fastener stringers, the combination of means for folding a ribbon of flexible material into a two-ply carrier or stringer having a thickened folded edge, and means for imparting a step-by-step feed to said carrier or stringer, with means for forming a connected series of fastener-members, means for severing individual members from said connected series, means supporting individual fastener-members while they are applied to the carrier or stringer, and means for clamping fastener-members upon the thickened folded edge of the carrier or stringer.

14. In a machine for making separable fastener stringers, the combination with means for folding a ribbon of flexible material into a two-ply carrier or stringer having a four-ply folded edge, with means for clamping individual interlocking elements at uniform intervals upon the four-ply folded edge.

15. In a machine for making separable fastener stringers, the combination with means for folding a ribbon of flexible material into a two-ply carrier or stringer having a four-ply folded edge, with means for forming individual interlocking elements having U-shaped mounting jaws or yokes, and means for clamping the jaws or yokes of said interlocking elements at uniform intervals upon the four-ply folded edge.

16. Means for forming fastener-elements having tape receiving jaws, and means for firmly supporting individual fastener-elements, in combination with a carriage movable toward and away from said element supporting means, means for feeding a tape upon said carriage transversely of said element supporting means, means for forming a bead upon a tape, and means for clamping the individual fastener-elements upon the beaded edge of a tape.

17. Means for forming fastener-elements having tape receiving jaws, and means for firmly supporting individual fastener-elements, in combination with a carriage movable toward and away from said element supporting means, tape feeding means upon said carriage for feeding a tape transversely of said element supporting means, means for forming a bead upon a tape, means for clamping individual fastener-elements upon the beaded edge of a tape, and means for uniformly spacing the fastener-elements upon a tape.

18. Means for forming fastener-elements having tape receiving jaws, and means for supporting individual fastener-elements, in combination with a carriage movable toward and away from said element supporting means, means upon said carriage for supporting and feeding a tape transversely of said element-supporting means, means for longitudinally folding a tape and forming a bead upon its folded edge, and means for clamping individual fastener-elements upon the folded beaded edge of a tape.

19. The combination of means for supporting a fastener-element, with a tape carriage movable toward and away from said supporting means, tape folding mechanism mounted upon said carriage, mechanism to feed a tape at an angle to the movement of said carriage, and means for securing fastener-elements upon a tape.

20. The combination of means for supporting a fastener-element, with a tape carriage movable toward and away from said supporting means, means mounted upon said carriage for forming a fastener retaining bead upon a tape, mechanism to feed a tape at an angle to the movement of said carriage, and means for securing fastener-elements upon a tape.

21. The combination of means for supporting a fastener-element, with a tape carriage movable toward and away from said supporting means, tape folding and bead forming mechanism mounted upon said carriage, mechanism to feed the tape at an angle to the movement of said carriage, and means for securing fastener-elements upon a tape.

22. The combination of means for supporting a fastener-element, with a tape carriage movable toward and away from said supporting means, tape folding and bead forming mechanism mounted upon said carriage, mechanism to feed the tape at an angle to the movement of said carriage, and means for clamping individual fastener-elements upon the folded beaded edge of a tape.

23. The combination of means for forming a connected series of fastener-members, means for severing individual members from said connected series, and means for supporting an individual fastener-element, with a tape carriage movable toward and away from said supporting means, means mounted upon said carriage for forming a folded plural ply fastener-retaining bead upon a tape, mechanism to feed a tape upon said carriage, and means for securing fastener elements upon a tape.

24. The combination of means for forming a connected series of fastener-members, means for severing individual members from said connected series, and means for supporting an individual fastener-element, with a tape carriage movable toward and away from said supporting means, means mounted upon said carriage for forming a folded plural ply fastener-retaining bead upon a tape, mechanism to feed a tape upon said carriage, means for securing fastener elements upon a tape, and mechanism for cutting off lengths from a tape.

25. The combination of means for intermittently feeding a flat blank strip, means acting upon said strip for forming a succession of fastener-elements including means for forming separate mounting yokes in the plane of said strip, means for severing successive fastener-elements from said strip, means movable toward and away from said fastener-elements adapted to grip a fastener-element and move it away, tape-supporting mechanism adapted to intermittently move a carrier tape toward a separately supported fastener-element, and means for clamping fastener-elements upon a carrier tape.

26. The combination of means for intermittently feeding a flat blank strip, means acting upon said strip for forming a succession of connected fastener-elements having oppositely presented hooks including means for forming separate mounting yokes from said strip, means for severing successive fastener-elements from said strip, a travelling gripper movable toward and away from said fastener-elements adapted to grip a fastener-element and move it away from the strip as it is severed therefrom, tape-supporting mechanism adapted to intermittently move a carrier tape toward and into the mounting yoke of a separately supported fastener-element, means for clamping fastener-elements upon the carrier tape, and means for intermittently feeding the carrier tape.

27. The combination of means for intermittently feeding a flat blank strip, means acting upon said strip for forming a succession of connected fastener-elements including means for forming separate mounting yokes of the material of said strip, means for severing successive fastener-elements from said strip, a travelling gripper adapted to grip a fastener-element and move it away from the strip as it is severed therefrom, and tape-supporting mechanism adapted to intermittently move a carrier tape toward a separately supported fastener-element, and means for clamping the fastener-element upon the carrier tape.

28. The combination of means for supporting and feeding a flat blank strip, means acting upon said blank strip for forming a succession of connected fastener-elements having U-shaped clamping jaws formed of the material of said strip, means for severing successive fastener-elements from said strip, and means for supporting indivdual fastener-elements while they are applied to a carrier tape, with a carriage reciprocating in the plane of the blank strip, means for feeding the carrier tape upon said carriage transversely of the blank strip, and means upon said carriage for clamping a fastener-element upon the carrier tape when the tape is moved by its carriage into the U-shaped jaws of a fastener-element.

29. In a machine of the character described, the combination with means for forming a two-ply flexible carrier or stringer with a thickened edge, and means uniformly feeding said flexible carrier or stringer, of means clamping fastener-members in spaced relation upon the thickened edge of said carrier or stringer, means supplying fastener-members to said clamping means, and means automatically arresting the supply of fastener-members to said clamping means without interfering with the uniform feed of said carrier or stringer.

30. In a machine of the character described, the combination with means forming a beaded carrier or stringer and means uniformly feeding said carrier or stringer, of means clamping fastener-members in spaced relation upon said carrier or stringer, means supplying fastener-members to said clamping means, and means automatically arresting the supply of fastener-members to said clamping means without interfering with the uniform feed of said carrier or stringer.

31. In a machine of the character described, the combination with means uniformly feeding a flexible carrier or stringer, and means for clamping fastener-members upon said carrier or stringer, of means for forming fastener-members, means conveying fastener-members into position to be clamped upon said carrier or stringer, and means for arresting said fastener forming means and said conveying means without interrupting the feed of the carrier or stringer.

32. In a machine of the character described, the combination with means for forming a flexible carrier or stringer, means uniformly feeding said flexible carrier or stringer, and means for clamping fastener-members upon said carrier or stringer, of means for forming a connected series of fastener-members, means for severing individual members from the connected series, means for conveying fastener-members into position to be clamped upon said carrier or stringer, and means for arresting said forming, severing and conveying means without interrupting the feed of the carrier or stringer.

33. In a machine of the character described, the combination with feeding means for a flexible carrier or stringer, means for conveying fastener-members, means for clamping fastener-members upon said carrier or stringer, power driven mechanism for operating said carrier feeding means and said fastener conveying means, and an automatically controlled clutch between said power mechanism and said fastener conveying means, whereby the supply of fastener-members can be arrested and the feed of the carrier or stringer continued to produce blank portions thereon.

34. In a machine of the character described, the combination with feeding means for a flexible carrier or stringer, means for forming fastener-members, means for conveying fastener-members, and means for clamping fastener-members upon said carrier or stringer, of power driven mechanism for operating said carrier feeding means, said fastener forming means and said fastener conveying means, and an automatically controlled clutch between said power mechanism and said fastener forming and conveying means, whereby the supply of fastener-members can be arrested and the feed of the carrier or stringer continued to produce blank portions thereon.

35. In a machine of the character described, the combination with means for forming a flexible carrier or stringer, feeding means for said flexible carrier or stringer, means for forming fastener-members, means for conveying individual fastener-members, and means for clamping fastener-members upon said carrier or stringer, of power driven mechanism for operating said carrier forming and feeding means and said fastener forming and conveying means, and an automatically controlled clutch between said power mechanism and said fastener forming and conveying means, whereby the supply of fastener-members can be arrested and the forming and feeding of the carrier or stringer continued to produce blank portions thereon.

36. In a machine of the character described, the combination with feeding means for a flexible carrier or stringer, means for forming fastener-members, means for conveying individual fastener-members, means for clamping fastener-members upon said carrier or stringer, power driven mechanism for operating said carrier feeding means and said fastener forming and conveying means, and an automatically controlled clutch between said power mechanism and said fastener forming and conveying means, whereby the supply of fastener-members can be arrested and the feed of the carrier or stringer continued to produce blank portions thereon.

37. In a machine for making separable fastener stringers, the combination with means for forming a continuous connected strip of fastener-members, including means for forming laterally and oppositely projecting fastener hooks and separate pairs of U-shaped clamping jaws, means for severing individual fastener-members from the strip, means for presenting individual severed members with their U-shaped jaws in stringer-receiving position, means for moving a carrier or stringer into said U-shaped jaws, and means for clamping said jaws upon the carrier or stringer.

38. In a machine for making separable fastener stringers, the combination with means for moving a metal strip-blank step-by-step lengthwise, means for shaping said blank into a connected series of fastener-members arranged transversely of the blank, including means for forming separate pairs of U-shaped jaws along one edge and fastening hooks along the opposite edge of the blank, means for severing individual fastener-members from the strip, means for conveying individual members from said strip and presenting their U-shaped jaws in stringer receiving position, means for moving a carrier or stringer into said U-shaped jaws, and means for clamping said jaws upon the carrier or stringer.

39. In a machine for making separable fastener stringers, the combination with means for feeding a flat metal strip-blank, of means acting upon said blank to form a succession of connected interlocking elements for slide fasteners, and means for severing the connections between individual interlocking elements and forming from the severed parts of said connections integral riding lugs upon the separated interlocking elements.

40. In a machine for making separable fastener stringers, the combination with means for feeding a flat metal strip-blank, of means acting upon said blank to form a succession of connected side by side interlocking elements for slide fasteners having oppositely presented mounting jaws and fastener-members, and means for separating individual fastener-elements and forming thereon integral riding lugs.

41. In a machine of the character described, the combination with means for intermittently feeding a metal strip-blank, of means acting upon said blank to form a succession of connected fastener-elements, buffing means operating intermittently upon the connected series of fastener-elements, and means for severing the connections between individual fastener-elements.

42. In a machine of the character described, the combination with means for intermittently feeding a metal strip-blank, of means acting upon said blank to form a succession of connected fastener-elements, a pivotally mounted frame movable toward and away from said blank, buffing wheels journalled in said frame, driving means for said buffing wheels, means rocking said frame, and means for severing the connections between individual fastener-elements.

43. In a machine of the character described, the combination with means for intermittently feeding a metal strip-blank, of means acting upon said blank to form a succession of connected fastener-elements having mounting jaws, a carrier having an element gripper, buffing means operating intermittently upon the connected series of fastener-elements, means for severing the connections between individual fastener-elements, means supporting a flexible carrier tape movable toward said element gripper, and means for clamping elements upon said carrier tape.

44. In a machine of the character described, the combination with means for feeding a connected series of fastener-elements, of an element cut-off, an element gripper, a pilot member adapted to accurately position a fastener-element with reference to the cut-off and gripper, and means for actuating said pilot member, said gripper, and said cut-off to effect the gripping of a cut-off element.

45. In a machine of the character described, the combination with means for feeding a connected series of fastener-elements, of an element cut-off, an element gripper, a pilot member adapted to accurately position a fastener-element with reference to the cut-off and gripper, and common operating means for successively actuating said pilot member, said gripper and said cut-off to effect the gripping of a cut-off element.

46. In a machine of the character described, the combination with means for feeding a connected series of fastener-elements, of an element cut-off mechanism, an element gripper mechanism, a pilot member adapted to accurately position a fastener-element with reference to the cut-off and gripper mechanisms, and a reciprocating plunger adapted to operate said pilot member and said gripper and cut-off mechanisms.

47. In a machine of the character described, the combination with means for feeding a connected series of fastener-elements, of an element cut-off mechanism, an element gripper mechanism, a pilot member adapted to accurately position a fastener-element with reference to the cut-off and gripper mechanisms, and a reciprocating plunger adapted to successively operate said pilot member, said gripper mechanism and said cut-off mechanism.

48. In a machine of the character described, the combination with means for feeding a connected series of fastener-elements, of an element cut-off mechanism, an element gripper mechanism, an operating plunger carrying tappets adapted to actuate said gripper and cut-off mechanisms, and a pilot member mounted upon said plunger and adapted to engage the connected series of fastener-elements when the plunger moves to operate the gripper and cut-off mechanisms.

49. In a machine of the character described, the combination with means for feeding fastener-elements, of a carriage having a lower fixed gripper member, a movable upper gripper member, and a latching device arranged to latch the movable gripper member in closed position.

50. In a machine of the character described, the combination with means for feeding fastener-elements, of a carriage having a lower fixed gripper member, a movable upper gripper member, a spring normally holding the movable gripper member open, and a latching device arranged to latch the movable gripper member against motion.

51. In a machine of the character described, the combination with means for feeding fastener-elements, of a carriage having a lower fixed gripper member, a movable upper gripper member, a spring acting upon said movable gripper member, and a spring actuated latching device arranged to latch the movable gripper member in either open or closed position.

52. In a machine of the character described, the combination with means for feeding fastener-elements, of a carriage having a lower fixed gripper member formed with a recessed face to receive a fastener-element, and a movable gripper member pivoted upon the carriage adjacent to said fixed member and formed with a projecting nose shaped to fit over a fastener-element and clamp it against said recessed face of the fixed gripper member.

53. In a machine of the character described, the combination with means for feeding fastener-elements, of a carriage having a lower fixed gripper member formed with a recessed face to receive a fastener-element, a movable gripper member pivoted upon the carriage adjacent to said fixed member and formed with a projecting nose shaped to fit over a fastener-element and clamp it against said recessed face of the fixed gripper member, and a spring latch controlling said movable gripper member.

54. In a machine of the character described, the combination with means for feeding fastener-elements, of a carriage having a lower fixed gripper member formed with a recessed face to receive a fastener-element, a movable gripper member pivoted upon the carriage adjacent to said fixed member and formed with a projecting nose shaped to fit over a fastener-element and clamp it against said recessed face of the fixed gripper member, a spring acting upon said movable gripper member, and a latch controlling said movable gripper member.

55. In a machine of the character described, the combination with means for feeding fastener-elements, of a carriage having a lower fixed gripper member, an upper movable gripper member pivoted upon the carriage and movable toward and away from said fixed gripper member, a latching lever pivoted upon said carriage adjacent to said movable gripper member, said latching lever being movable transversely of the plane of movement of said movable gripper member and adapted to frictionally engage a face of said gripper member to yieldingly hold the gripper open or to engage a rear edge of the movable gripper member to firmly lock the gripper closed upon a fastener-element.

56. In a machine of the character described, the combination with means for feeding fastener-elements, of a carriage having a fixed gripper member, a movable gripper member pivoted upon the carriage and movable toward and away from said fixed gripper member, a latching lever pivoted upon said carriage and movable into engagement with said movable gripper member to firmly lock the gripper closed upon a fastener-element, and a timed tripping device to disengage said latch from said movable gripper member for releasing it.

57. In a machine of the character described, the combination with means for feeding fastener-elements, of a carriage having a fixed gripper member and a movable gripper member, a gripper latching lever pivoted upon said carriage adjacent to said movable gripper member, a trip lever upon the carriage controlling said latching lever, and a power operated device periodically thrown into engagement with said trip lever.

58. In a machine of the character described, the combination with means for feeding a series of connected fastener-elements, of the fixed and movable cut-off members in the path of said fastener elements, said movable cut-off member being spring supported in its inactive or retracted position, a gripper carriage having the cooperating fixed gripper member and movable gripper member, said movable gripper member being spring supported in its open position, and an operating plunger adapted to act upon said movable gripper member and said movable cut-off member to grip an element severed from the series.

59. In a machine of the character described, the combination with means for feeding a series of connected fastener-elements, of fixed and movable cut-off members in the path of said fastener-elements, said movable cut-off member being spring supported, a gripper carriage having a fixed gripper member and a movable gripper member, said movable gripper member being spring supported, an operating plunger carrying tappets adapted to act successively upon said movable gripper member and said movable cut-off member to grip an element severed from the series, and a pilot member mounted upon said operating plunger and adapted to engage the connected fastener-elements and accurately position an element with reference to the cut-off and gripper members.

60. In a machine of the character described, the combination with means for feeding a connected strip of fastener-elements including a pronged plate adapted to be moved into and out of engagement with said strip, of an element cut-off mechanism, an element gripper mechanism, an operating plunger for actuating said gripper and cut-off mechanisms, a pilot member operated by said plunger adapted to accurately position a fastener-element with reference to the cut-off and gripper mechanisms, and means actuated by said plunger for disengaging said pronged feed plate from said strip of elements when the pilot member is in action, and move said pronged feed plate into engagement with said strip when the pilot member is withdrawn.

61. In a machine for making separable fastener stringers, the combination with means for feeding a ribbon or tape, of means acting upon said ribbon or tape to form thereon a thickened bead, and means for securing individual interlocking elements at uniform intervals upon said thickened bead.

62. In a machine of the character described, the combination with means for supporting and feeding a ribbon or tape, of means acting upon said ribbon or tape to longitudinally fold a four-ply thickened bead thereon, and means for securing fastener-elements upon said thickened bead.

63. In a machine of the character described, the combination with means for supporting and feeding a ribbon or tape, of means acting upon said ribbon or tape to longitudinally fold a four-ply thickened bead thereon, means for securing fastener-elements upon said thickened bead, and mechanism for cutting off lengths of said beaded ribbon or tape.

64. In a machine of the character described, the combination with means for longitudinally folding a ribbon or tape, of a pair of cooperating bead forming members respectively grooved and ribbed to act upon the inner and outer faces of the fold of a ribbon or tape to reverse the crown of the fold and produce a thickened folded bead and means for securing fastener elements upon said bead.

65. In a machine of the character described, the combination with means for longitudinally folding a ribbon or tape, a pair of rollers formed with concave peripheries freely journalled upon a support projecting between the two-plies of the folded ribbon or tape, and a roller having a convex periphery mounted outside of and adjacent to the fold of the ribbon or tape and adapted to press the crown of the fold into the concave peripheries of said first-named pair of rollers, for reversing the crown of the fold and producing an integral thickened bead or folded edge upon the ribbon or tape, means for forming fastener-elements with open mounting jaws, means for presenting the thickened or beaded edge of the folded tape in the open jaws of said fastener-elements, and means for clamping the jaws of said elements upon the tape.

66. In a machine of the character described, the combination with means for longitudinally folding and beading a ribbon or tape, of intermittently acting feeding mechanism comprising tape engaging gripper bars movable toward each other to grip the tape and away from each other to release the tape, and a pair of actuating cam-bars having pin and slot engagement with said gripper bars, said cam-bars having limited relative movements upon said gripper bars for moving them into and out of engagement with the folded ribbon or tape, and further movements with the gripper bars to effect the feed of the tape.

67. In a machine of the character described, the combination with means for longitudinally folding and beading a ribbon or tape, of intermittently acting feeding mechanism comprising tape engaging gripper bars movable toward each other to grip the tape and away from each other to release the tape, means for forming fastener-elements having mounting yokes, means for presenting the beaded edge of the tape in the yokes of said elements, plungers carrying clenching devices adapted to clamp the yokes of elements upon the tape, and a pair of actuating cam-bars having pin and slot engagement with said gripper bars, and pin and slot engagement with the clencher carrying plungers, said cam-bars having a limited relative movement upon said gripper bars and said plungers for moving them into and out of engagement with the tape, and movements with the gripper bars to cause the feed of the tape when the gripper bars are gripped thereon and to retract the gripper bars for a new grip upon the tape when the gripper bars are free from the tape.

68. In a machine of the character described, the combination with means for longitudinally folding and beading a ribbon or tape, of intermittently acting feeding mechanism comprising tape engaging gripper bars movable toward each other to grip the tape and away from each other to release the tape, plungers carrying clenching devices adapted to clamp fastener-elements upon the tape, a pair of actuating cam-bars having pin and slot engagement with said gripper bars, and pin and slot engagement with said clencher carrying plungers, said cam-bars having a limited relative movement upon said gripper bars and clencher carrying plungers for moving them into and out of engagement with the tape, and automatic latches carried by said cam-bars and engaging parts upon said gripper bars to cause the gripper bars to travel with the cam-bars.

69. In a machine of the character described, the combination with means for longitudinally folding and beading a ribbon or tape, of a pair of tape feeding gripper bars, a pair of operating cam-bars formed with oppositely arranged cam slots in which engage anti-friction rollers journalled upon said gripper bars, and automatic latches carried by said cam-bars and engaging parts upon said gripper bars, said latches causing the gripper bars to travel with the cam-bars when they are in engagement and allowing relative motion when they are disengaged.

70. In a machine of the character described, the combination with means for longitudinally folding and beading a ribbon or tape, of a pair of tape feeding gripper bars, spring mechanism operating upon said gripper bars, a pair of operating cam-bars formed with oppositely arranged cam slots in which engage anti-friction rollers journalled upon said gripper bars, automatic latches carried by said cam-bars and engaging lugs upon said gripper bars, said latches causing the gripper bars to travel with the cam-bars when they are in engagement, and means for operating said cam-bars.

71. In a machine of the character described, the combination with means for longitudinally folding a ribbon or tape, of means for feeding said tape through the folding means, spring actuated plungers operating transversely of the path of the folded tape, each of said plungers being formed at its inner end with spaced lugs adapted to fit over and gauge previously attached fastener-elements, means for clamping fastener units upon the folded edge of the tape in proper spaced relation to the previously attached units, and means for operating said plungers.

72. In a machine of the character described, the combination with means for longitudinally folding a ribbon or tape, of means for feeding said tape through the folding means, spring actuated plungers operating transversely of the path of the folded tape, each of said plungers carrying clenching blades projecting inwardly and adapted to clamp fastener units upon the folded edge of the tape, and means for operating said plungers.

73. In a machine of the character described, the combination with means for longitudinally folding and beading a ribbon or tape, of means for feeding said tape through the folding and beading means, guideways extending transversely of the path of the folded tape, spring actuated plungers operating in said guideways, each of said plungers being formed at its inner end with spaced lugs adapted to fit over and gauge previously attached fastener-elements, auxiliary plungers mounted upon said main plungers, clenching tools projecting inwardly from said auxiliary plungers and adapted to clamp fastener-elements upon the beaded folded edge of the tape in proper spaced relation to the previously attached units, and means for operating said plungers.

74. In a machine of the character described, the combination with means for producing a flexible carrier tape or stringer, means for feeding said stringer, and means for presenting fastener-elements in position to be clamped upon the stringer, of slotted main plungers operating transversely of the path of the stringer toward and away from each other, each main plunger being formed at its inner end with spaced gauging lugs to fit over previously attached fastener-elements, auxiliary plungers sliding in guidways of said main plungers, clenching tools mounted upon said auxiliary plungers adapted to clamp fastener-elements upon said flexible stringer, a pair of operating cam-bars formed with oppositely arranged cam slots, the said cam-bars extending through said slotted main plungers, and anti-friction rollers journalled upon said auxiliary plungers and engaging the cam slots of said cam-bars.

75. In a machine of the character described, the combination with means for producing a flexible carrier tape or stringer, means for feeding said stringer, and means for presenting fastener-elements in position to be clamped upon the stringer, of vertically slotted guideways extending transversely of the path of the stringer, longitudinally slotted main plungers operating in said guideways toward and away from each other, each main plunger being formed at its inner end with spaced gauging lugs to fit over previously attached fastener-elements, auxiliary plungers mounted on said main plungers and having limited sliding movement thereon, clenching tools upon said auxiliary plungers adapted to clamp fastener-elements upon said flexible stringer, a pair of operating cam-bars formed with oppositely arranged cam slots, the said cam-bars extending through the guide slots of said guideways and said main plungers, and anti-friction rollers journalled upon said auxiliary plungers and engaging the cam slots of said cam-bars.

76. In a machine of the character described, the combination with means for producing a flexible carrier tape or stringer, means for feeding said stringer, and means for presenting fastener-elements in position to be clamped upon the stringer, of slotted guideways extending transversely of the path of the stringer, longitudinally slotted and channeled main plungers operating in said guideways toward and away from each other, springs engaging said main plungers and yieldingly urging them inwardly, each main plunger being formed at its inner end with spaced gauging lugs to fit over previously attached fastener-elements, auxiliary plungers mounted in the longitudinal channelled guideways of said main plungers and having limited sliding movement therein, clenching tools upon said auxiliary plungers adapted to clamp fastener-elements upon said flexible stringer, a pair of operating cam-bars formed with oppositely arranged cam slots, the said cam-bars extending through the guide slots of said guideways and said main plungers, anti-friction rollers journalled upon said auxiliary plungers and engaging the cam slots of said cam-bars, and means for reciprocating said cam-bars.

77. In a machine of the character described, the combination with mechanism for producing fastener-elements, mechanism for presenting fastener-elements in position for mounting upon flexible stringers, mechanism for producing flexible stringers, and mechanism for clamping fastener-elements upon flexible stringers, of means actuated by the operation of said machine for automatically controlling the operation of said mechanisms.

78. In a machine of the character described, the combination with mechanism for producing fastener-elements, mechanism for presenting fastener-elements in position for mounting upon flexible stringers, mechanism for producing a continuous flexible stringer, mechanism for clamping fastener-elements upon flexible stringers, and mechanism for cutting off lengths of said stringer, of means actuated by the operation of said machine for automatically controlling the operation of said mechanisms.

79. In a machine of the character described, the combination of means for producing fastener-elements, means for producing flexible stringers and mounting said fastener-elements thereon, and a divided power driving mechanism including a clutch, a magnetic control for said power mechanism, a second magnetic control for said clutch, and automatic means operated by the machine for throwing said controls into action.

80. In a machine of the character described, the combination with a power shaft, a cam shaft driven from said power shaft, a clutch arranged between said power shaft and said cam shaft, mechanism operated by said cam shaft for producing fastener-elements, mechanisms operated by said power shaft for producing flexible stringers and mounting fastener-elements upon said stringers, a counter controlled throw-out mechanism for said power shaft, and machine operated automatic controls for said clutch.

81. In a machine of the character described, the combination with a power shaft, a cam shaft driven from said power shaft, an automatic clutch arranged between said power shaft and said cam shaft, mechanisms operated by said cam shaft for producing fastener-elements and conveying them to a position for mounting upon a stringer, mechanisms operated by said power shaft for producing a continuous flexible stringer, feeding said stringer and mounting fastener-elements upon said stringer, automatic intermittently acting mechanism for cutting off sections of said continuous stringer having mounted fastener-elements, a counter operated by the machine, throw-out mechanism for said power shaft actuated by said counter, and machine operated automatic controls for said clutch.

82. In a machine of the character described, the combination with a power shaft, a cam shaft driven from said power shaft, an automatic clutch arranged between said power shaft and said cam shaft, mechanism operated by said cam shaft for producing fastener-elements and conveying them into position for mounting upon the flexible stringer, mechanisms operated by said power shaft for producing a continuous flexible stringer, feeding said stringer and mounting fastener-elements upon said stringer, electro-magnetically operated shears for cutting off sections of said stringer carrying mounted fastener-elements, a counter operated by a regularly acting part of the machine, electro-magnetic throw-out mechanism for said power shaft under the control of said counter, electro-magnetic controls for said clutch, and automatic circuit controlling mechanism operated by the machine and in circuit with the shears magnet and the clutch magnetic controls.

83. In a machine of the class described, the combination with means for feeding a continuous flexible stringer and means for applying fastener elements along the edge of said stringer in closely spaced relation, of means for periodically increasing the spacing to group the elements on the stringer, and electrical devices for controlling said last named means including circuit control mechanism operated by the machine.

84. In a machine of the class described, the combination with intermittently operating stepwise feeding means for feeding a continuous flexible stringer, and means for applying fastener elements along the edge of said stringer in closely spaced relation, of means for periodically increasing the amount of stringer feed between successive elements on said stringer to group the elements on the stringer, and electrical devices for controlling said last named means including circuit control mechanism operated by the machine.

85. In a machine of the class described, the combination with means for feeding a continuous flexible stringer, and means for applying fastener elements along the edge of said stringer in closely spaced relation, of means for periodically interrupting the operation of said applying means without interrupting the operation of said feeding means, and electrical devices for controlling said interrupting means including circuit control mechanism operated by the machine.

86. In a machine of the class described, the combination with means for feeding a continuous flexible stringer and means for applying fastener elements along the edge of said stringer in closely spaced relation, of propelling means for said applying means including a clutch, a solenoid for disengaging said clutch, an electrical circuit including said solenoid and a source of electrical energy, and means for controlling said circuit responsive to a predetermined number of operations of said machine for disengaging said clutch and thereby periodically increasing the spacing between elements to group the elements on the stringer.

87. In a machine of the class described, the combination with means for feeding a continuous flexible stringer and means for applying fastener elements along the edge of said stringer in grouped relation, of cut-off shears operated automatically by the machine for severing said stringer between groups of elements.

88. In a machine of the class described, the combination with means for feeding a continuous flexible stringer, means for feeding fastener elements each having spaced apart jaws at one end, and means for placing said jaws astride the edge of said stringer, reciproacting clenching tools operable on opposite sides of said stringer to clench said jaws on the edge of said stringer, and reciprocable gauging lugs adapted to engage over previous attached fastener elements whereby the element being clenched on is properly spaced from the attached elements.

89. The method of forming separable fastener members of the type having separated U-shape clamping jaws at one end, interlocking means at the other end, and riding lugs projecting laterally from the member between said interlocking means and jaws, which comprises feeding a flat metal strip, blanking out from said strip a succession of fastener elements with the mounting jaws and interlocking end at least partially formed, said fastener members being integrally connected side by side by portions of said flat strip, and cutting said members apart at said integral connections and leaving enough of said integral connections to form said riding lugs.

90. The method of forming separable fastener members of the kind having separated compressible jaws at one end and interlocking devices at the other end, which comprises feeding a flat strip of metal equal in width to the overall length of said fastener members, cutting out portions of said strip at the sides of said fastener members and between the jaw portions, leaving a portion of the strip connecting said fastener members in side by side relation, and finally severing the strip between said fastener members.

91. In a machine for making separable fastener stringers, the combination with means for forming a beaded fabric tape and for temporarily holding the bead formation on said tape, of means for supplying fastener members and means for clamping said fastener members around said beaded edge, whereby said bead is held permanently to form.

92. In a machine for making separable fastener stringers, the combination with means for guiding a flat tape, folding devices for folding a portion of said flat tape to form a beaded edge and for temporarily holding the tape in such folded shape, means for supplying fastener members to said beaded edge, and means for clamping said members around said edge whereby the same is held permanently in folded shape.

93. In a machine for making separable fastener stringers, the combination of means for folding a ribbon of flexible material into a two-ply carrier or stringer, with means for clamping individual interlocking elements to the folded edge at uniform intervals.

94. In a machine for making separable fastener stringers, the combination of means for folding a ribbon of flexible material into a beaded two-ply carrier or stringer, with means for clamping individual interlocking elements to the folded edge at uniform intervals.

95. In a machine for making separable fastener stringers, the combination with means for longitudinally folding a ribbon or tape, of means acting upon said folded ribbon or tape to form a thickened folded bead, and means for attaching individual interlocking elements at uniform intervals upon said bead.

96. A ribbon-like strip of thin sheet material having sections cut out along one edge to form mounting jaws of slide fastener members, and sections cut out along the other edge to form spaced portions, said mounting jaws being wholly disposed in the plane of the original flat strip, said spaced portions each being formed to provide the interlocking means of a slide fastener member, said members so formed being integrally connected by severable portions of the strip.

97. A single piece of material presenting in plan view a plurality of Y-shaped outlines representing the Y-shaped external contours of integrally connected slide fastener members each member having spaced apart jaws at one end and an interlocking projection and recess at the other end.

98. The method of forming slide fastener members of the class described which consists of operating on a single piece of material to form a plurality of integrally connected elements presenting in plan view a plurality of Y-shaped outlines each representing the Y-shaped external outline of a slide fastener member with spaced apart jaws on one end of each element and interlocking means on the other end, and separating one element from another to form individual slide fastener members.

99. The method of forming slide fastener members of the class described which consists of cutting away portions from a flat piece of material leaving an integrally connected series of elements each having substantially the Y-shaped external outline of a slide fastener member with spaced apart jaws at one end, forming interlocking means on each element at the other end while the elements are connected, and finally separating one member from another.

100. The method of forming slide fastener members of the class described which consists of cutting away portions from a flat elongated strip of material to leave an integrally connected series of elements having substantially the Y-shaped external outline of slide fastener elements extending transversely of the strip, forming interlocking means on said elements while connected in the strip and finally separating one member from another.

101. The method of forming slide fastener members of the class described which consists of forming a plurality of connected fastener members presenting in plan view a plurality of Y-shaped outlines each representing the Y-shaped external outline of a slide fastener member, with spaced apart jaws on one end of each member and interlocking means on the other end, with the major portion of the exterior edges of said members exposed, operating on said exterior edges for smoothing the same, and then separating one member from another to form individual slide fastener members.

102. The method of forming separable fastener members of the kind having separated compressible jaws at one end and interlocking devices at the other end, which comprises feeding a flat strip of metal equal in width to the overall length of said fastener members, cutting out portions of said strip at the sides of said fastener members and between the jaw portions, leaving a portion of the strip connecting said fastener members in side by side relation, and leaving the major portion of the exterior edges of said fastener members exposed, operating on said exposed edges for smoothing the same, and finally severing the strip between said fastener members.

103. In a machine for making separable fastener stringers, the combination with means for supporting a carrier or stringer, of means for forming an integrally connected series of partially finished fastener members including means for forming separate mounting yokes, means for feeding said fastener members, means for separating from the series and completing individual fastener members, means for supporting completed individual fastener members, and means for clamping fastener members upon said carrier or stringer.

EDWARD H. BINNS.
WILLIAM A. DE HART.